(12) United States Patent
Kinoshita et al.

(10) Patent No.: US 9,335,071 B2
(45) Date of Patent: May 10, 2016

(54) AIR CONDITIONING APPARATUS

(75) Inventors: Hidehiko Kinoshita, Sakai (JP); Tsuyoshi Yamada, Sakai (JP); Junichi Shimoda, Sakai (JP); Kenta Fujiwara, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 922 days.

(21) Appl. No.: 13/256,279

(22) PCT Filed: Mar. 18, 2010

(86) PCT No.: PCT/JP2010/001965
§ 371 (c)(1),
(2), (4) Date: Sep. 13, 2011

(87) PCT Pub. No.: WO2010/106807
PCT Pub. Date: Sep. 23, 2010

(65) Prior Publication Data
US 2012/0023989 A1 Feb. 2, 2012

(30) Foreign Application Priority Data

Mar. 19, 2009 (JP) .................................. 2009-069129
Apr. 7, 2009 (JP) .................................. 2009-093232

(51) Int. Cl.
*F24F 11/00* (2006.01)
*F25B 13/00* (2006.01)

(52) U.S. Cl.
CPC ............. *F25B 13/00* (2013.01); *F24F 11/0076* (2013.01); *F24F 2011/0043* (2013.01);
(Continued)

(58) Field of Classification Search
CPC ................ F25B 2313/0293; F25B 2313/0313; F25B 2313/0312; F24F 11/0001; F24F 11/0079; F24F 11/0012

USPC ..................................................... 62/178, 186
See application file for complete search history.

(56) References Cited

U.S. PATENT DOCUMENTS 2,986,015 A * 5/1961 Mitchell .......................... 62/115
3,405,535 A * 10/1968 Matthies .......................... 62/202
(Continued)

FOREIGN PATENT DOCUMENTS

| | | |
|---|---|---|
| JP | 52-150056 U | 11/1977 |
| JP | 56-148576 U | 11/1981 |

(Continued)

OTHER PUBLICATIONS

International Preliminary Report of corresponding PCT Application No. PCT/JP2010/001965.
(Continued)

*Primary Examiner* — Ljiljana Ciric
*Assistant Examiner* — Alexis Cox
(74) *Attorney, Agent, or Firm* — Global IP Counselors

(57) ABSTRACT

An air conditioning apparatus includes a compressor, indoor and outdoor heat exchangers, an indoor fan, an expansion valve, a refrigerant-pressure-perceiving part, which perceives a pressure of refrigerant sent from the compressor to the indoor heat exchanger, and a control part, which performs startup fan control in which the indoor fan remains stopped until the compressor goes from being at rest to starting up and the pressure perceived reaches a high-pressure threshold. The control part repeats an action of reducing a flow rate of the indoor fan or stopping driving of the indoor fan when the pressure perceived is equal to or less than a low-pressure lower than the high-pressure threshold, and an action of increasing the flow rate of the indoor fan or initiating driving of the indoor fan when the pressure perceived reaches or exceeds a pressure threshold which is higher than the low-pressure threshold.

9 Claims, 33 Drawing Sheets

(52) U.S. Cl.
CPC ..... *F24F2221/54* (2013.01); *F25B 2313/0293* (2013.01); *F25B 2313/02741* (2013.01); *F25B 2313/0312* (2013.01); *F25B 2313/0313* (2013.01); *F25B 2313/0314* (2013.01); *F25B 2400/01* (2013.01); *F25B 2500/26* (2013.01); *F25B 2600/021* (2013.01); *F25B 2600/2513* (2013.01); *F25B 2700/19* (2013.01); *F25B 2700/1931* (2013.01); *Y02B 30/741* (2013.01)

(56) References Cited

U.S. PATENT DOCUMENTS

| | | | | |
|---|---|---|---|---|
| 3,817,053 | A | * | 6/1974 | Orth .............................. 62/210 |
| 4,877,183 | A | * | 10/1989 | Matsuda et al. ............ 236/49.3 |
| 5,715,693 | A | * | 2/1998 | van der Walt et al. .......... 62/198 |
| 8,033,718 | B2 | * | 10/2011 | Nishiyashiki ................. 374/141 |
| 8,413,455 | B2 | * | 4/2013 | Sim et al. ...................... 62/196.1 |
| 9,046,275 | B2 | * | 6/2015 | Kinoshita ............... F25B 13/00 |
| 9,074,782 | B2 | * | 7/2015 | Kinoshita ........... F24F 11/0009 |
| 2002/0056280 | A1 | | 5/2002 | Kim |
| 2003/0041603 | A1 | * | 3/2003 | Tada et al. ........................ 62/134 |
| 2003/0172667 | A1 | | 9/2003 | Takano et al. |
| 2003/0213256 | A1 | * | 11/2003 | Ueda et al. ...................... 62/230 |
| 2004/0134225 | A1 | * | 7/2004 | Sakamoto et al. .............. 62/498 |
| 2004/0206099 | A1 | * | 10/2004 | Kim ................................ 62/178 |
| 2007/0062207 | A1 | * | 3/2007 | Aiyama et al. .................. 62/222 |
| 2007/0163297 | A1 | * | 7/2007 | Zhang et al. .................... 62/527 |
| 2009/0025406 | A1 | * | 1/2009 | Yoshimi et al. ................. 62/127 |
| 2009/0044550 | A1 | * | 2/2009 | Nishimura et al. ............. 62/149 |
| 2010/0115976 | A1 | * | 5/2010 | Sim et al. ........................ 62/234 |
| 2010/0324742 | A1 | * | 12/2010 | Huerta-Ochoa ............. 700/282 |
| 2011/0209488 | A1 | * | 9/2011 | Yamada et al. ................. 62/151 |
| 2012/0000223 | A1 | * | 1/2012 | Kinoshita ....................... 62/129 |
| 2012/0000225 | A1 | * | 1/2012 | Kinoshita et al. .............. 62/132 |
| 2012/0000228 | A1 | * | 1/2012 | Kinoshita et al. .............. 62/222 |
| 2012/0006040 | A1 | * | 1/2012 | Kinoshita et al. .............. 62/151 |
| 2012/0096882 | A1 | * | 4/2012 | Yang ............................... 62/180 |
| 2014/0374062 | A1 | * | 12/2014 | Ono et al. ........................ 165/71 |
| 2014/0374078 | A1 | * | 12/2014 | Ono et al. ...................... 165/173 |
| 2015/0041101 | A1 | * | 2/2015 | Hoshika ................... F24F 1/16 165/67 |
| 2015/0052923 | A1 | * | 2/2015 | Kanazawa ............. F25B 13/00 62/223 |
| 2015/0059377 | A1 | * | 3/2015 | Kanazawa ............. F25B 13/00 62/160 |

FOREIGN PATENT DOCUMENTS

| | | |
|---|---|---|
| JP | 61-140738 A | 6/1986 |
| JP | 61-246537 A | 11/1986 |
| JP | 62-77574 A | 4/1987 |
| JP | 1-111153 | 4/1989 |
| JP | 3-59358 A | 3/1991 |
| JP | 4-15446 A | 1/1992 |
| JP | 4-80562 A | 3/1992 |
| JP | 7-301459 A | 11/1995 |
| JP | 11-101522 A | 4/1999 |
| JP | 11-248265 A | 9/1999 |
| JP | 2000-28180 A | 1/2000 |
| JP | 2000-97510 A | 4/2000 |
| JP | 2000-105015 A | 4/2000 |
| JP | 2000-111126 A | 4/2000 |
| JP | 2000-220912 A | 8/2000 |
| JP | 2001-174055 A | 6/2001 |
| JP | 2001-255025 A | 9/2001 |
| JP | 2002-5537 A | 1/2002 |
| JP | 2002-106980 A | 4/2002 |
| JP | 2002-195669 A | 7/2002 |
| JP | 2003-42574 A | 2/2003 |
| JP | 2003-269810 A | 9/2003 |
| JP | 2004-3804 A | 1/2004 |
| JP | 2004-3827 A | 1/2004 |
| JP | 2007-127381 A | 5/2007 |
| JP | 2007-178114 A | 7/2007 |
| JP | 2007-212035 A | 8/2007 |
| JP | 2007-212036 A | 8/2007 |
| JP | 2007-255736 A | 10/2007 |
| JP | 2008-2790 A | 1/2008 |
| JP | 2008-164226 A | 7/2008 |
| WO | WO 2007/119414 A1 | 10/2007 |

OTHER PUBLICATIONS

International Preliminary Report of related PCT Application No. PCT/JP2010/001941.
International Preliminary Report of related PCT Application No. PCT/JP2010/002005.
International Preliminary Report of related PCT Application No. PCT/JP2010/001937.
International Preliminary Report of related PCT Application No. PCT/JP2010/001985.
International Preliminary Report of related PCT Application No. PCT/JP2010/001983.
International Preliminary Report of related PCT Application No. PCT/JP2010/001815.
International Preliminary Report of related PCT Application No. PCT/JP2010/001942.
International Preliminary Report of related PCT Application No. PCT/JP2010/001994.
International Search Report of corresponding PCT Application No. PCT/JP2010/001965.
International Search Report of corresponding PCT Application No. PCT/JP2010/001983.
International Search Report of corresponding PCT Application No. PCT/JP2010/001815.
International Search Report of corresponding PCT Application No. PCT/JP2010/001942.
International Search Report of corresponding PCT Application No. PCT/JP2010/001941.
international Search Report of corresponding PCT Application No. PCT/JP2010/001994.
International Search Report of corresponding PCT Application No. PCT/JP2010/002005.
International Search Report of corresponding PCT Application No. PCT/JP2010/001937.
International Search Report of corresponding PCT Application No. PCT/JP2010/001985.
Corrected Version of International Preliminary Report of related PCT Application No. PCT/JP2010/001941.
European Search Report of corresponding EP Application No. 10 75 3303.6 dated Feb. 20, 2015.

* cited by examiner

AIR CONDITIONING APPARATUS

CROSS-REFERENCE TO RELATED APPLICATIONS

This U.S. National stage application claims priority under 35 U.S.C. §119(a) to Japanese Patent Application Nos. 2009-069129, filed in Japan on Mar. 19, 2009, 2009-093232, filed in Japan on Apr. 7, 2009, the entire contents of which are hereby incorporated herein by reference.

TECHNICAL FIELD

The present invention relates to an air conditioning apparatus.

BACKGROUND ART

Among air conditioning apparatuses capable of an air-warming operation, techniques such as those disclosed in Patent Literature below have been proposed with the objective of improving inconveniences that may arise during air-warming startup.

For example, in the air conditioning apparatus of Japanese Laid-open Patent Application Publication No. 2000-111126, the angle of a louver is varied to adjust the direction of airflow during air-warming startup, preventing the user from feeling a draft from unwarmed indoor air.

In the air conditioner of Japanese Laid-open Patent Application Publication No. 2000-105015, during air-warming startup, an operation is performed for quickly raising the refrigerant temperature by blocking the supply of refrigerant to the indoor unit side and circulating the refrigerant between the compressor and the outdoor heat exchanger. The temperature of the refrigerant can thereby be raised quickly, and warm air can therefore be supplied to the user in a short amount of time following the air-warming startup.

Furthermore, in the air conditioner of Japanese Laid-open Patent Application Publication No. 11-101522, it is proposed that control be performed for increasing the flow rate of an indoor fan in an environment of an indoor temperature of 25° C. or greater in order to avoid any inconvenience that arises in environments in which the air-warming operation overloads, which is that a high-end pressure of the refrigeration cycle increases abnormally at the start of the air-warming operation.

SUMMARY

Technical Problem

In the techniques disclosed in Japanese Laid-open Patent Application Publication Nos. 2000-111126 and 11-101522, warm air cannot be supplied quickly to the user during air-warming startup. Specifically, according to the technique disclosed in Japanese Laid-open Patent Application Publication No. 2000-111126, since the airflow direction is established by the louver, if the air surrounding the user has not already been warmed, it is not possible for the user themselves to be warmed. With the technique disclosed in Japanese Laid-open Patent Application Publication No. 11-101522, the premise is an environment in which the air-warming operation overloads. Furthermore, a state arises in which a high-end pressure has increased just short of an abnormally high pressure, the airflow of the indoor fan eventually increases, and it is therefore not possible to quickly supply warm air to the user during air-warming startup.

The technique of Japanese Laid-open Patent Application Publication No. 2000-105015 requires a circuit configuration and control whereby the refrigerant can be circulated between the compressor and the outdoor heat exchanger, which is complex.

The present invention was devised in view of the circumstances described above, and an object thereof is to provide an air conditioning apparatus capable of quickly supplying warm air during air-warming startup by means of a simple configuration.

Solution to Problem

An air conditioning apparatus according to a first aspect of the present invention is an air conditioning apparatus which includes at least a compression mechanism, an indoor heat exchanger, an indoor fan, an expansion mechanism, and an outdoor heat exchanger; the air conditioning apparatus comprising a refrigerant-pressure-perceiving part and a control part. The refrigerant-pressure-perceiving part perceives the pressure of refrigerant sent from the compression mechanism to the indoor heat exchanger. The control part performs startup fan control. In the startup fan control, the indoor fan remains stopped until the compression mechanism goes from being at rest to starting up and the pressure perceived by the refrigerant-pressure-perceiving part reaches or exceeds a predetermined high-pressure threshold. Also in the startup fan control, the indoor fan is driven when the pressure perceived by the refrigerant-pressure-perceiving part reaches or exceeds the predetermined high-pressure threshold, after which the following actions are repeated: an action of reducing the flow rate of the indoor fan or stopping the driving of the indoor fan when the pressure perceived by the refrigerant-pressure-perceiving part is equal to or less than a predetermined low-pressure threshold, and an action of increasing the flow rate or initiating the driving of the indoor fan when the pressure perceived by the refrigerant-pressure-perceiving part reaches or exceeds a predetermined pressure threshold. The predetermined low-pressure threshold is a lower value than the predetermined high-pressure threshold. The predetermined pressure threshold is a higher value than the predetermined low-pressure threshold. This predetermined pressure threshold may either a value equal to or less than the predetermined high-pressure threshold, or a value less than the predetermined high-pressure threshold, for example.

In this air conditioning apparatus, in the startup fan control, since the initiation of driving the indoor fan depends on the predetermined high-pressure threshold being reached or exceeded, until then the supply of air from the indoor fan to the indoor heat exchanger ceases. Therefore, while the indoor fan is stopped, low condensation performance can be maintained in the indoor heat exchanger, and it is possible to more shorten the time duration from startup initiation of the compression mechanism until the pressure of the refrigerant sent from the compression mechanism to the indoor heat exchanger reaches or exceeds the predetermined high-pressure threshold. When refrigerant that has been controlled to a high pressure and brought to a high temperature is present within the indoor heat exchanger, the indoor fan begins to be driven, and the air first supplied to the user at startup of the air-warming operation can therefore be warm air. Furthermore, since this control can easily be achieved by adjusting the startup state of the indoor fan, there is no need for another complex configuration. Using a simple configuration it is thereby possible to quickly provide warm air to the user at the start of air warming.

Also taken into consideration is the fact that after the indoor fan has been driven for the first time following startup, when the pressure perceived by the refrigerant-pressure-perceiving part decreases and reaches or falls below the predetermined low-pressure threshold, the indoor heat exchanger cannot be brought to a sufficiently high temperature, and the warm air desired by the user cannot be sufficiently supplied. In contrast thereto, in this air conditioning apparatus, by performing control for reducing the flow rate or stopping the driving of the indoor fan, the condensation pressure can once again be quickly increased. Furthermore, after the condensation pressure has once again been quickly increased, when the predetermined high-pressure threshold is again reached or exceeded, the supply of warm air to the user can be restarted by again performing control for increasing the flow rate of the indoor fan or initiating driving.

An air conditioning apparatus according to a second aspect of the present invention is the air conditioning apparatus according to the first aspect, further comprising an outdoor temperature detector for detecting the outdoor air temperature, and an indoor temperature detector for detecting the indoor air temperature. The control part performs the startup fan control only when a predetermined surrounding temperature condition is satisfied by the relationship between the temperature detected by the outdoor temperature detector and the temperature detected by the indoor temperature detector either when the compression mechanism has not started up or when the compression mechanism has started up.

In this air conditioning apparatus, the startup fan control can be implemented in the user's preferred environment alone by establishing the predetermined surrounding temperature condition when the compression mechanism has not started up or when the compression mechanism has started up.

An air conditioning apparatus according to a third aspect of the present invention is the air conditioning apparatus according to the second aspect, wherein the temperature range in which the predetermined surrounding temperature condition is satisfied is a temperature range that satisfies an air-warming-operation-enabling temperature range condition; and is also a temperature range that satisfies the temperature conditions of being either lower than a predetermined limit indoor temperature, which is an indoor temperature within the range of the air-warming-operation-enabling temperature range, or equal to or less than the predetermined limit indoor temperature, and being either lower than a predetermined limit outdoor temperature, which is an outdoor temperature within the range of the air-warming-operation-enabling temperature range, or equal to or less than the predetermined limit outdoor temperature. The air-warming-operation-enabling temperature range is a temperature range in which the temperature of air that has passed through the indoor heat exchanger is allowed to be higher than the temperature of air that has not yet passed therethrough.

In this air conditioning apparatus, the startup fan control is not constantly performed when the air-warming-operation-enabling temperature range condition has been satisfied, and the startup fan control is performed only when the predetermined surrounding temperature condition has also been satisfied. It is thereby possible to prevent the startup fan control from being performed unnecessarily.

An air conditioning apparatus according to a fourth aspect of the present invention is the air conditioning apparatus according to the third aspect, further comprising an indoor-heat-exchange-temperature-perceiving part for perceiving the temperature of the refrigerant passing through the indoor heat exchanger. The control part does not perform the startup fan control when the air-warming-operation-enabling temperature range condition is satisfied and the predetermined surrounding temperature condition is not satisfied. The control part performs indoor heat exchange temperature control in which the indoor fan remains stopped until the compression mechanism goes from being at rest to starting up and the temperature perceived by the indoor-refrigerant-temperature-perceiving part reaches or exceeds a predetermined indoor refrigerant temperature, and the indoor fan is driven from the time that the temperature perceived by the indoor-refrigerant-temperature-perceiving part reaches or exceeds the predetermined indoor refrigerant temperature.

In this air conditioning apparatus, the startup fan control and the indoor heat exchange temperature control, which are controls during initiation of the air-warming operation, can be performed separately between times when the predetermined surrounding temperature condition is satisfied and times when it is not satisfied. Therefore, it is possible to provide the user with a level of comfort corresponding to the temperature condition by control during initiation of the air-warming operation.

An air conditioning apparatus according to a fifth aspect of the present invention is the air conditioning apparatus according to any of the first through fourth aspects, wherein the control part restricts the drive state of the compression mechanism when the pressure of the refrigerant sent from the compression mechanism to the indoor heat exchanger reaches a predetermined pressure-withstanding reference value which is higher than the predetermined high-pressure threshold.

In this air conditioning apparatus, the predetermined high-pressure threshold is a lower pressure than the predetermined pressure-withstanding reference value. Therefore, in the startup fan control, the control part does not wait for the predetermined pressure-withstanding reference value to be reached, but initiates driving of the indoor fan only when the predetermined high-pressure threshold is reached. Therefore, warm air can be started to be supplied to the user sooner.

An air conditioning apparatus according to a sixth aspect of the present invention is the air conditioning apparatus according to any of the first through fifth aspects, further comprising a supply-destination temperature detector for detecting the air temperature of a supply-destination area into which the air flow created by the indoor fan is to be supplied. The control part receives information pertaining to the temperature set by the user, and in a state in which either no refrigerant is flowing from the compression mechanism to the indoor heat exchanger or the compression mechanism is being driven at a predetermined minimum frequency, the control part performs "thermo on" control for creating a flow of refrigerant from the compression mechanism to the indoor heat exchanger when the relationship between the temperature detected by the supply-destination temperature detector and the information pertaining to the set temperature is a predetermined "thermo on" relationship. The control part does not perform the startup fan control when the "thermo on" control is initiated.

After the air-warming operation is initiated and the compression mechanism stops operating due to the room interior reaching the set temperature and the refrigerant flow stops, for example, or the refrigerant flow stops for some other reason, there are cases in which the indoor temperature decreases and an operation for increasing the indoor temperature to the set temperature is performed again. In such cases, since the supply-destination area has already been warmed to a certain extent, there is no need for high-temperature air such as is expected in room temperature environments which are fairly lower in temperature than the set temperature when the operation has not been performed in advance (or such as is expected the first time the air-warming operation is started up).

In this air conditioning apparatus, due to the restriction that the startup fan control not be performed when the "thermo on" control is initiated, either there will no longer be a need to wait for the driving of the indoor fan until the pressure perceived by the refrigerant-pressure-perceiving part reaches or exceeds the predetermined high-pressure threshold, or there will no longer be a need to increase the pressure until the pressure perceived by the refrigerant-pressure-perceiving part reaches or exceeds the predetermined high-pressure threshold.

An air conditioning apparatus according to a seventh aspect of the present invention is the air conditioning apparatus according to any of the first through sixth aspects, further comprising a timer for perceiving a time elapsed since the time point when the compression mechanism began to be driven and a refrigerant flow was created. The control part begins to drive the indoor fan when the elapsed time perceived by the timer has reached a predetermined fixed startup time duration, even when the pressure perceived by the refrigerant-pressure-perceiving part has not reached or exceeded the predetermined high-pressure threshold.

Depending on the indoor temperature or outdoor temperature situation, there will sometimes be an increase in the time duration needed for the pressure of the refrigerant heading from the compression mechanism to the indoor heat exchanger to reach the predetermined high-pressure threshold.

In this air conditioning apparatus, even in such cases, although warm air of a high temperature that corresponds to the predetermined high-pressure threshold cannot be achieved, it is possible to quickly initiate the supply of somewhat warm air to the user.

An air conditioning apparatus according to an eighth aspect of the present invention is the air conditioning apparatus according to any of the first through seventh aspects, further comprising a discharge temperature detector for detecting the temperature of refrigerant discharged from the compression mechanism. The control part initiates the driving of the indoor fan when the temperature detected by the discharge temperature detector has reached or exceeded a predetermined discharge temperature, even when the pressure perceived by the refrigerant-pressure-perceiving part has not reached or exceeded the predetermined high-pressure threshold.

Depending on the indoor temperature or outdoor temperature situation, there is a risk that before the pressure of the refrigerant heading from the compression mechanism to the indoor heat exchanger reaches the predetermined high-pressure threshold, the discharge temperature will increase abnormally and the refrigeration oil will deteriorate.

In this air conditioning apparatus, even when the pressure of the refrigerant heading from the compression mechanism to the indoor heat exchanger does not reach or does not exceed the predetermined high-pressure threshold, the driving of the indoor fan is initiated when the discharge temperature has increased to the predetermined discharge temperature. It is thereby possible to quickly initiate the supply of somewhat warm air to the user while preventing deterioration of the refrigeration oil.

An air conditioning apparatus according to a ninth aspect of the present invention is the air conditioning apparatus according to any of the first through eighth aspects, further comprising a current supply part for supplying a current to the compression mechanism, and a compressor-current-value detector for detecting a current value associated with the current supply part. The compression mechanism can be controlled by an inverter. The control part initiates the driving of the indoor fan when the current value detected by the compressor-current-value detector has reached or exceeded a predetermined current value, even when the pressure perceived by the refrigerant-pressure-perceiving part has not reached or exceeded the predetermined high-pressure threshold.

Depending on the indoor temperature or outdoor temperature situation, there is a risk that before the pressure of the refrigerant heading from the compression mechanism to the indoor heat exchanger reaches the predetermined high-pressure threshold, the supplied current volume will increase abnormally and the current supply part will malfunction.

In this air conditioning apparatus, even when the pressure of the refrigerant heading from the compression mechanism to the indoor heat exchanger does not reach or does not exceed the predetermined high-pressure threshold, the driving of the indoor fan is initiated when the supplied current volume has increased to a predetermined current value. It is thereby possible to quickly initiate the supply of somewhat warm air to the user while preventing malfunction of the current supply part.

An air conditioning apparatus according to a tenth aspect of the present invention is the air conditioning apparatus according to any of the first through ninth aspects, further comprising a magnetic field generator. The magnetic field generator generates a magnetic field used for induction-heating a refrigerant tube on an intake side of the compression mechanism and/or a member in thermal contact with the refrigerant flowing through the refrigerant tube. The control part performs the induction heating at least when the start-up fan control is being performed.

In this air conditioning apparatus, since electromagnetic induction heating is performed during the startup fan control, the time duration needed to reach the predetermined high-pressure threshold can be shortened.

Effects of Invention

In the air conditioning apparatus according to the first aspect, it is possible for warm air at the start of air warming to be quickly provided to the user by a simple configuration. Even after the indoor fan has been driven, the condensation pressure can again be quickly increased, and the supply of warm air to the user can be restarted.

In the air conditioning apparatus according to the second aspect, it is possible to implement the startup fan control in the user's preferred environment alone.

In the air conditioning apparatus according to the third aspect, it is possible to prevent the startup fan control from being performed unnecessarily.

In the air conditioning apparatus according to the fourth aspect, it is possible to provide the user with a level of comfort corresponding to the temperature condition by control during initiation of the air-warming operation.

In the air conditioning apparatus according to the fifth aspect, warm air can be started to be supplied to the user sooner.

In the air conditioning apparatus according to the sixth aspect, either an unnecessary standby time for the indoor fan can be eliminated, or the refrigerant pressure needed in order to initiate driving of the indoor fan can be suppressed.

In the air conditioning apparatus according to the seventh aspect, it is possible to quickly initiate the supply of somewhat warm air to the user.

In the air conditioning apparatus according to the eighth aspect, it is possible to quickly initiate the supply of somewhat warm air to the user while preventing deterioration of the refrigeration oil.

In the air conditioning apparatus according to the ninth aspect, it is possible to quickly initiate the supply of somewhat warm air to the user while preventing malfunction of the current supply part.

In the air conditioning apparatus according to the tenth aspect, since electromagnetic induction heating is performed during the startup fan control, the time duration needed to reach the predetermined high-pressure threshold can be shortened.

DESCRIPTION OF EMBODIMENTS

An air conditioning apparatus 1 comprising an electromagnetic induction heating unit 6 in one embodiment of the present invention is described in an example hereinbelow with reference to the drawings.

<1-1> Air Conditioning Apparatus 1

Figure 1:
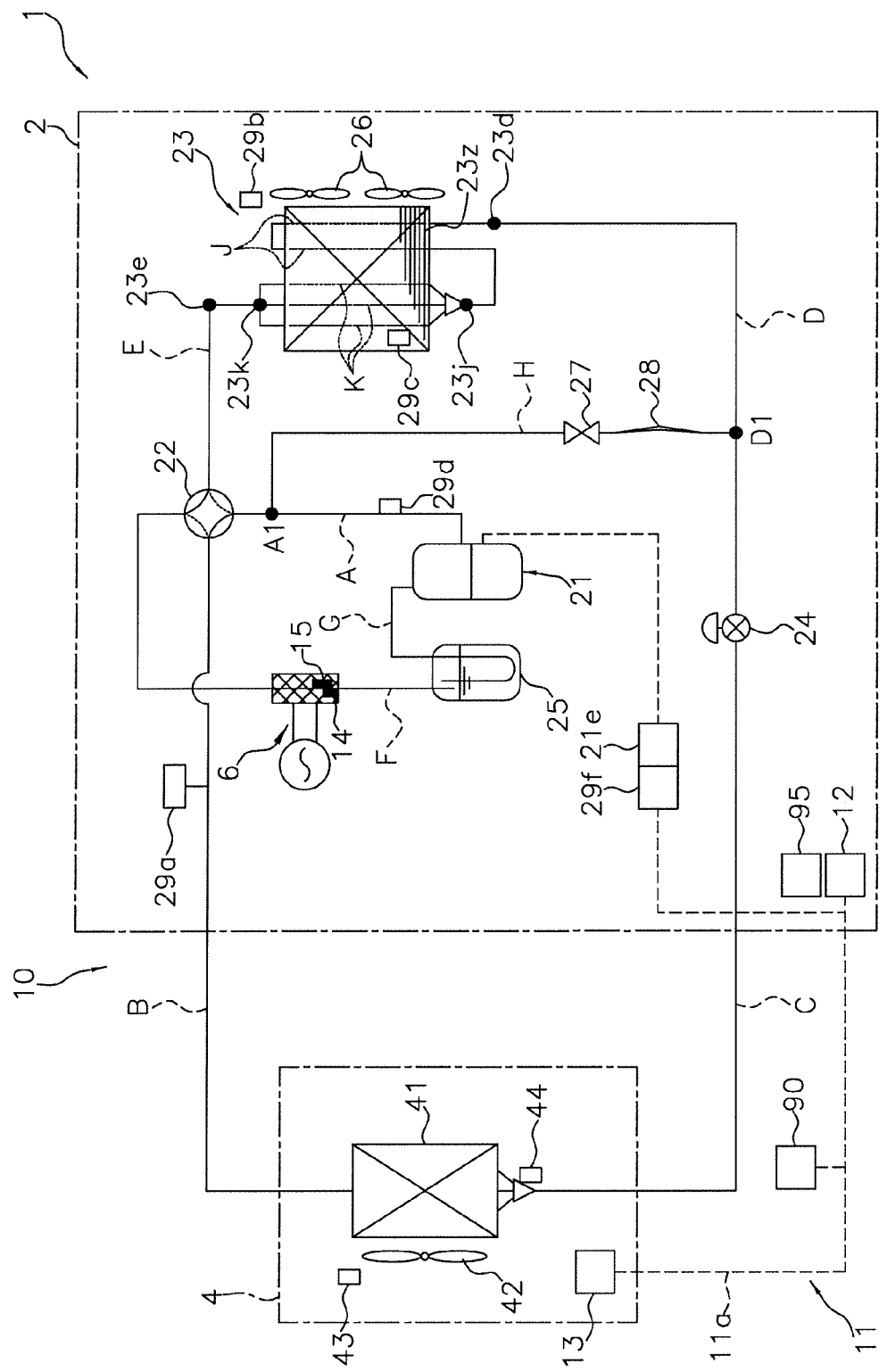
FIG. 1 is a refrigerant circuit diagram of an air conditioning apparatus according to an embodiment of the present invention.

FIG. 1 shows a refrigerant circuit diagram showing a refrigerant circuit 10 of the air conditioning apparatus 1.

In the air conditioning apparatus 1, an outdoor unit 2 as a heat source-side apparatus and an indoor unit 4 as a usage-side apparatus are connected by refrigerant tubes, and air conditioning is performed in the space where the usage-side apparatus is located; the air conditioning apparatus 1 comprising a compressor 21, a four-way switching valve 22, an outdoor heat exchanger 23, an outdoor electric expansion valve 24, an accumulator 25, outdoor fans 26, an indoor heat exchanger 41, an indoor fan 42, a hot gas bypass valve 27, a capillary tube 28, an electromagnetic induction heating unit 6, and other components.

The compressor 21, the four-way switching valve 22, the outdoor heat exchanger 23, the outdoor electric expansion valve 24, the accumulator 25, the outdoor fans 26, the hot gas bypass valve 27, the capillary tube 28, and the electromagnetic induction heating unit 6 are housed within the outdoor unit 2. The indoor heat exchanger 41 and the indoor fan 42 are housed within the indoor unit 4.

The refrigerant circuit 10 has a discharge tube A, an indoor-side gas tube B, an indoor-side liquid tube C, an outdoor-side liquid tube D, an outdoor-side gas tube E, an accumulation tube F, an intake tube G, a hot gas bypass circuit H, a branched tube K, and a converging tube J. Large quantities of gas-state refrigerant pass through the indoor-side gas tube B and the outdoor-side gas tube E, but the refrigerant passing through is not limited to a gas refrigerant. Large quantities of liquid-state refrigerant pass through the indoor-side liquid tube C and the outdoor-side liquid tube D, but the refrigerant passing through is not limited to a liquid refrigerant.

The discharge tube A connects the compressor 21 and the four-way switching valve 22. The discharge tube A is provided with a discharge temperature sensor 29d for detecting the temperature of the refrigerant passing through. A current supply part 21e supplies current to the compressor 21. The amount of the current supplied to the current supply part 21e is detected by a compressor-current-value detector 29f.

The indoor-side gas tube B connects the four-way switching valve 22 and the indoor heat exchanger 41. A pressure sensor 29a for sensing the pressure of the refrigerant passing through is provided at some point along the indoor-side gas tube B.

The indoor-side liquid tube C connects the indoor heat exchanger 41 and the outdoor electric expansion valve 24.

The outdoor-side liquid tube D connects the outdoor electric expansion valve 24 and the outdoor heat exchanger 23.

The outdoor-side gas tube E connects the outdoor heat exchanger 23 and the four-way switching valve 22.

Figure 15:
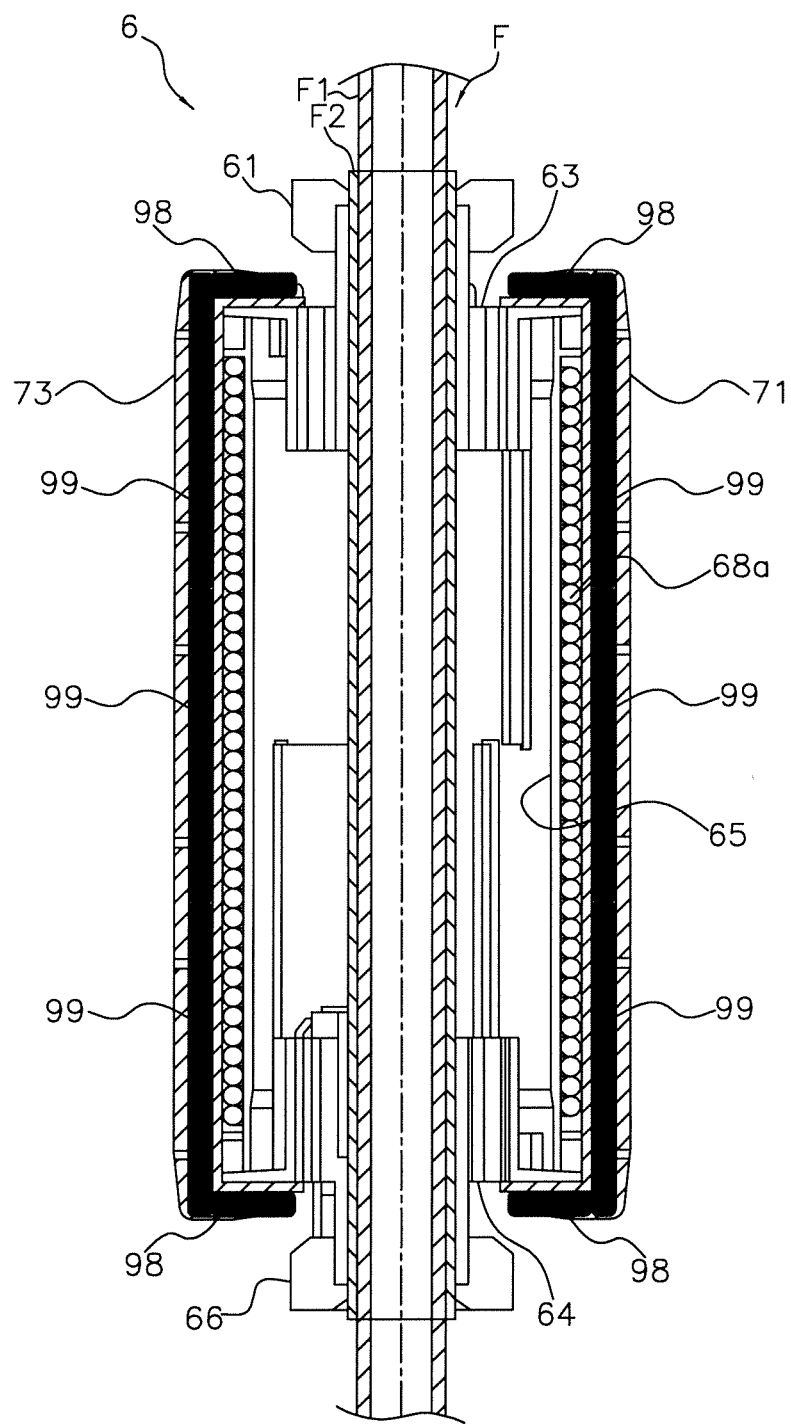
FIG. 15 is a cross-sectional structural view of the electromagnetic induction heating unit.

The accumulation tube F connects the four-way switching valve 22 and the accumulator 25, and extends in a vertical direction when the outdoor unit 2 has been installed. The electromagnetic induction heating unit 6 is attached to a part of the accumulation tube F. A heat-generating portion of the accumulation tube F, whose periphery is covered at least by a coil 68 described hereinafter, is composed of a copper tube F1 through which refrigerant flows and a magnetic tube F2 provided so as to cover the periphery of the copper tube F1 (see FIG. 15). This magnetic tube F2 is composed of SUS (stainless used steel) 430. This SUS 430 is a ferromagnetic material, which creates eddy currents when placed in a magnetic field and which generates heat by Joule heat created by its own electrical resistance. Aside from the magnetic tube F2, the tubes constituting the refrigerant circuit 10 are composed of copper tubes of the same material as the copper tube F1. The material of the tubes covering the periphery of the copper tube F1 is not limited to SUS 430, and can be, for example, iron, copper, aluminum, chrome, nickel, other conductors, and alloys and the like containing at least two or more metals selected from these listed. The example of the magnetic material given here contains ferrite, martensite, or a combination of the two, but it is preferable to use a ferromagnetic substance which has a comparatively high electrical resistance and which has a higher Curie temperature than its service temperature range. The accumulation tube F here requires more current, but it need not comprise a magnetic substance and a material containing a magnetic substance, or it may include a material that will be the target of induction heating. The magnetic material may constitute the entire accumulation tube F, it may be formed only in the inside surface of the accumulation tube F, or it may be present only due to being included in the material constituting the accumulation tube F, for example. By performing electromagnetic induction heating in this manner, the accumulation tube F can be heated by electromagnetic induction, and the refrigerant drawn into the compressor 21 via the accumulator 25 can be warmed. The warming capability of the air conditioning apparatus 1 can thereby be improved. Even in cases in which the compressor 21 is not sufficiently warmed at the start of the air-warming operation, for example, the lack of capability at startup can be compensated for by the quick heating by the electromagnetic induction heating unit 6. Furthermore, when the four-way switching valve 22 is switched to the air-cooling operation state and a defrosting operation is performed for removing frost deposited on the outdoor heat exchanger 23 or other components, the compressor 21 can quickly compress the warmed refrigerant as a target due to the electromagnetic induction heating unit 6 quickly heating the accumulation tube F. Therefore, the temperature of the hot gas discharged from the compressor 21 can be quickly increased. The time required to thaw the frost through the defrosting operation can thereby be shortened. Therefore, even when the defrosting operation must be performed at the right time during the air-warming operation, the air-warming operation can be resumed as quickly as possible, and user comfort can be improved.

The intake tube G connects the accumulator 25 and the intake side of the compressor 21.

The hot gas bypass circuit H connects a branching point A1 provided at some point along the discharge tube A and a branching point D1 provided at some point along the outdoor-side liquid tube D. Disposed at some point in the hot gas bypass circuit H is the hot gas bypass valve 27, which can switch between a state of permitting the passage of refrigerant and a state of not permitting the passage of refrigerant. Between the hot gas bypass valve 27 and the branching point D1, the hot gas bypass circuit H is provided with a capillary tube 28 for lowering the pressure of refrigerant passing through. This capillary tube 28 makes it possible to approach the pressure that follows the refrigerant pressure decrease caused by the outdoor electric expansion valve 24 during the air-warming operation, and therefore makes it possible to suppress the rise in refrigerant pressure in the outdoor-side liquid tube D caused by the supply of hot gas through the hot gas bypass circuit H to the outdoor-side liquid tube D.

The branched tube K, which constitutes part of the outdoor heat exchanger 23, is a refrigerant tube extending from a gas-side inlet/outlet 23e of the outdoor heat exchanger 23 and branching into a plurality of tubes at a branching/converging point 23k described hereinafter, in order to increase the effective surface area for heat exchange. The branched tube K has a first branched tube K1, a second branched tube K2, and a third branched tube K3 which extend independently from the branching/converging point 23k to a converging/branching point 23j, and these branching tubes K1, K2, K3 converge at the converging/branching point 23j. Seen from the side with the converging tube J, the branched tube K branches at and extends from the converging/branching point 23j.

The converging tube J, which constitutes a part of the outdoor heat exchanger 23, is a tube extending from the converging/branching point 23j to a liquid-side inlet/outlet 23d of the outdoor heat exchanger 23. The converging tube J is capable of equalizing the subcooling degree of the refrigerant flowing out from the outdoor heat exchanger 23 during the air-cooling operation, and is also capable of thawing ice deposited in the vicinity of the lower end of the outdoor heat exchanger 23 during the air-warming operation. The converging tube J has a cross-sectional area approximately three times each of those of the branching tubes K1, K2, K3, and the amount of refrigerant passing through is approximately three times greater than in each of the branching tubes K1, K2, K3.

The four-way switching valve 22 is capable of switching between an air-cooling operation cycle and an air-warming operation cycle. In FIG. 1, the connection state during the air-warming operation is shown by solid lines, and the connection state during the air-cooling operation is shown by dotted lines. During the air-warming operation, the indoor heat exchanger 41 functions as a cooler of refrigerant and the outdoor heat exchanger 23 functions as a heater of refrigerant. During the air-cooling operation, the outdoor heat exchanger 23 functions as a cooler of refrigerant and the indoor heat exchanger 41 functions as a heater of refrigerant.

The outdoor heat exchanger 23 has the gas-side inlet/outlet 23e, the liquid-side inlet/outlet 23d, the branching/converging point 23k, the converging/branching point 23j, the branched tube K, the converging tube J, and heat exchange fins 23z. The gas-side inlet/outlet 23e is positioned in the end of the outdoor heat exchanger 23 next to the outdoor-side gas tube E, and is connected to the outdoor-side gas tube E. The liquid-side inlet/outlet 23d is positioned in the end of the outdoor heat exchanger 23 next to the outdoor-side liquid tube D, and is connected to the outdoor-side liquid tube D. The branching/converging point 23k is where the tube extending from the gas-side inlet/outlet 23e branches, and the refrigerant can branch or converge depending on the direction in which the refrigerant is flowing. The branched tube K extends as a plurality of tubes from each of the branched portions in the branching/converging point 23k. The converging/branching point 23j is where the branched tube K converges, and the refrigerant can converge or branch depending on the direction in which the refrigerant is flowing. The converging tube J extends from the converging/branching point 23j to the liquid-side inlet/outlet 23d. The heat exchange fins 23z are composed of a plurality of plate-shaped aluminum fins aligned in their plate-thickness direction and arranged at predetermined intervals. The branched tube K and the converging tube J both pass through the heat exchange fins 23z. Specifically, the branched tube K and the converging tube J are arranged so as to penetrate in the plate-thickness direction through different parts of the same heat exchange fins 23z. Upwind side of the outdoor fans 26 in the direction of air flow, the outdoor heat exchanger 23 is provided with an outdoor air temperature sensor 29b for sensing the temperature of the outdoor air. The outdoor heat exchanger 23 is also provided with an outdoor heat exchange temperature sensor 29c for sensing the temperature of the refrigerant flowing through the branched tube air conditioning apparatus.

An indoor temperature sensor 43 for sensing the indoor temperature is provided inside the indoor unit 4. The indoor heat exchanger 41 is also provided with an indoor refrigerant temperature sensor 44 for sensing the refrigerant temperature of the side next to the indoor-side liquid tube C where the outdoor electric expansion valve 24 is connected.

An outdoor control part 12 for controlling the devices disposed in the outdoor unit 2 and an indoor control part 13 for controlling the devices disposed in the indoor unit 4 are connected by a communication line 11a, thereby constituting a control part 11. This control part 11 performs various controls on the air conditioning apparatus 1.

The outdoor control part 12 is also provided with a timer 95 for counting the elapsed time when the various controls are performed.

The control part 11 has a controller 90 for receiving setting input from the user.

<1-2> Outdoor Unit 2

Figure 2:
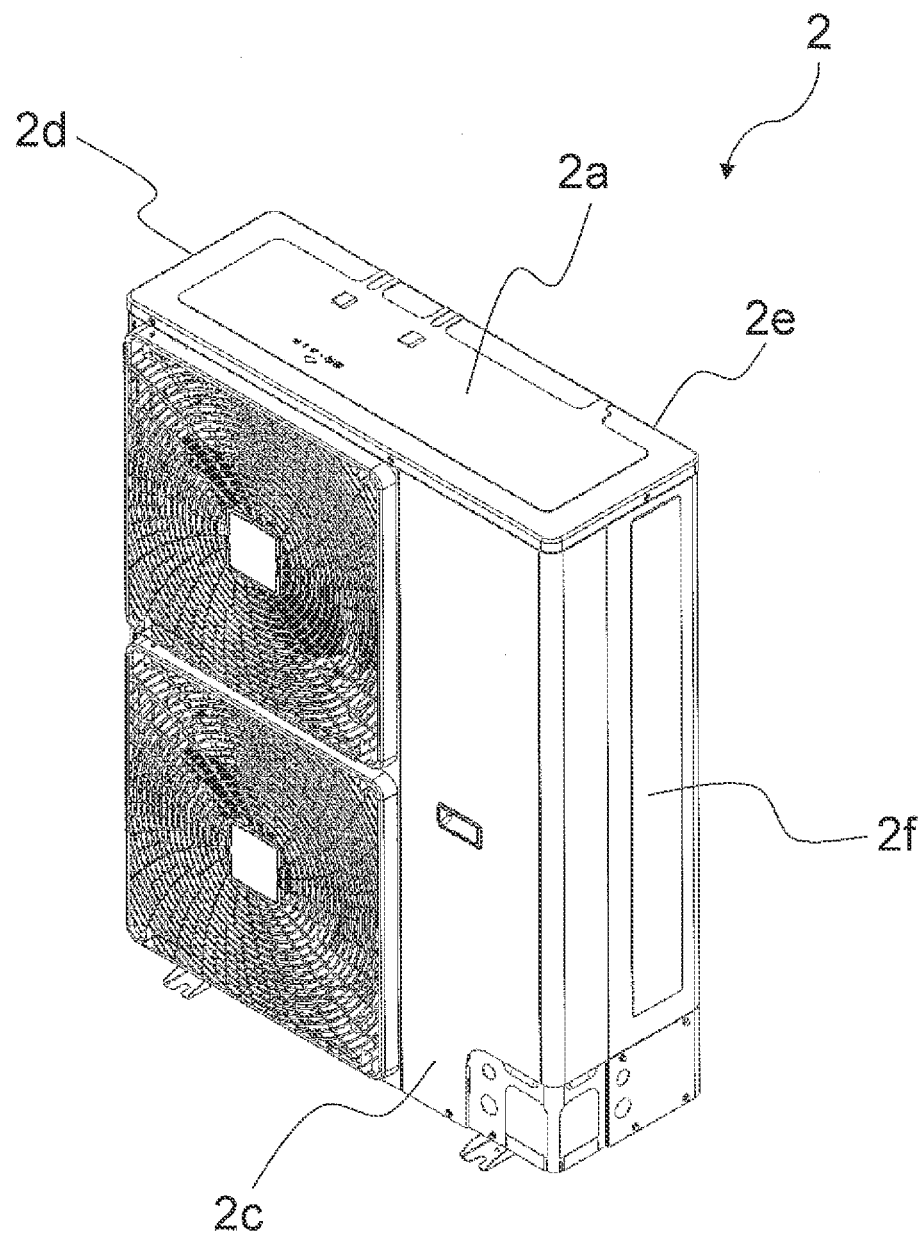
FIG. 2 is an external perspective view including the front side of an outdoor unit.
Figure 3:
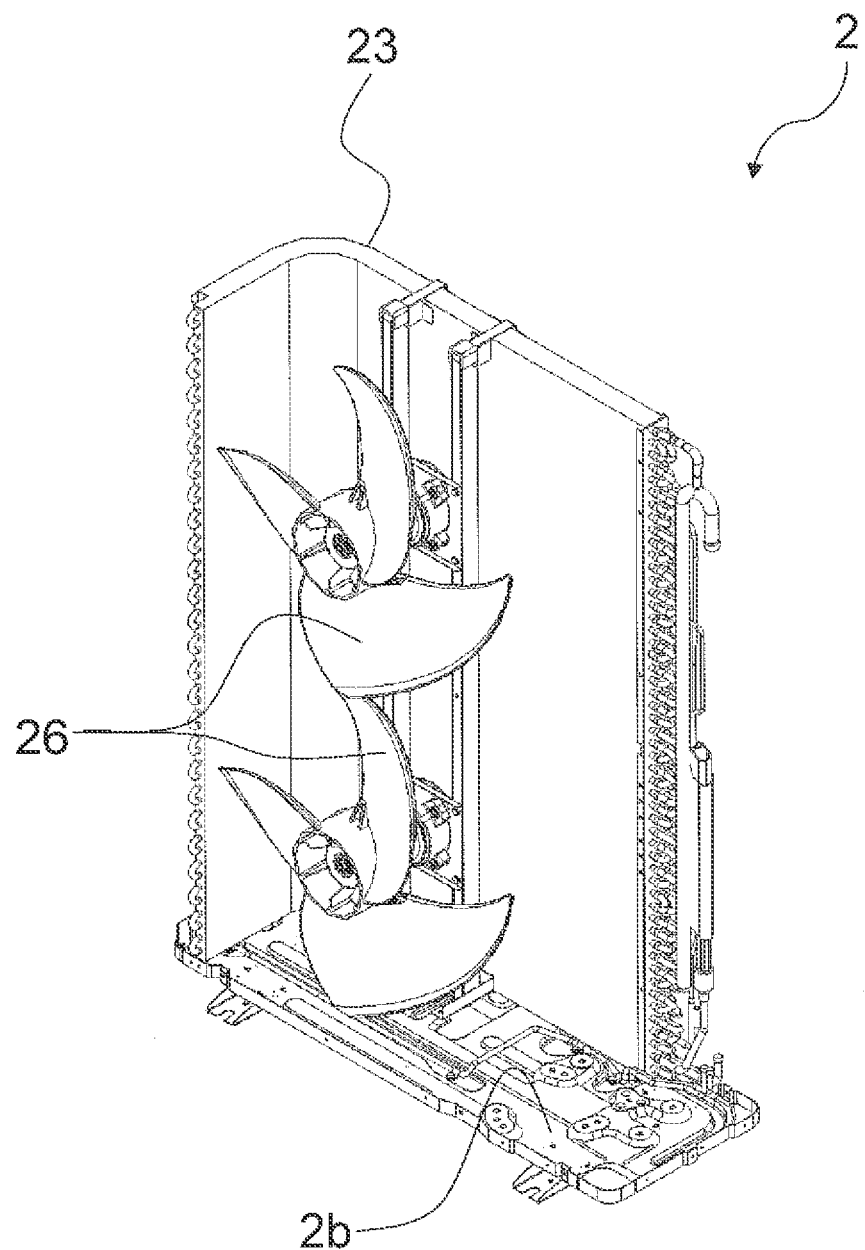
FIG. 3 is a perspective view of the internal arrangement and configuration of the outdoor unit.
Figure 4:
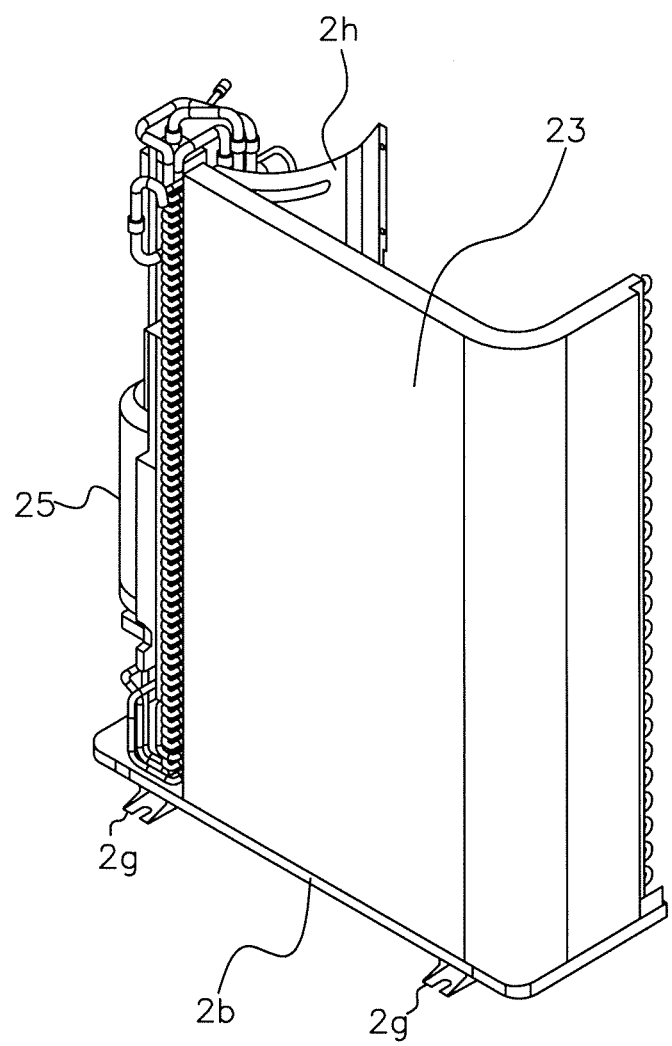
FIG. 4 is an external perspective view including the rear side of the internal arrangement and configuration of the outdoor unit.

FIG. 2 shows an external perspective view of the front side of the outdoor unit 2. FIG. 3 shows a perspective view depicting the positional relationship between the outdoor heat exchanger 23 and the outdoor fans 26. FIG. 4 shows a perspective view of the rear side of the outdoor heat exchanger 23.

The outside surfaces of the outdoor unit 2 are configured from a substantially rectangular parallelepiped outdoor unit casing, which is configured from a ceiling plate 2a, a bottom plate 2b, a front panel 2c, a left side panel 2d, a right side panel 2f, and a rear side panel 2e.

The outdoor unit 2 is sectioned via a partitioning plate 2H into an air-blower chamber next to the left side panel 2d, in which the outdoor heat exchanger 23, the outdoor fans 26, and other components are placed; and a machine chamber next to the right side panel 2f where the compressor 21 and/or the electromagnetic induction heating unit 6 are placed. The outdoor unit 2 is fixed in place by being screwed onto the bottom plate 2b, and the outdoor unit 2 has an outdoor unit support stand 2G constituting the left and right sides of the lowest end of the outdoor unit 2. The electromagnetic induction heating unit 6 is disposed in the machine chamber, in an upper position in proximity to the right side panel 2f and the ceiling plate 2a. The heat exchange fins 23z of the outdoor heat exchanger 23 described above are arranged so as to be aligned in the plate-thickness direction while the plate-thickness direction runs generally horizontally. The converging tube J is placed in the lowest parts of the heat exchange fins 23z of the outdoor heat exchanger 23, by passing through the heat exchange fins 23z in the thickness direction. The hot gas bypass circuit H is disposed so as to extend below the outdoor fans 26 and the outdoor heat exchanger 23.

<1-3> Internal Configuration of Outdoor Unit 2

Figure 5:
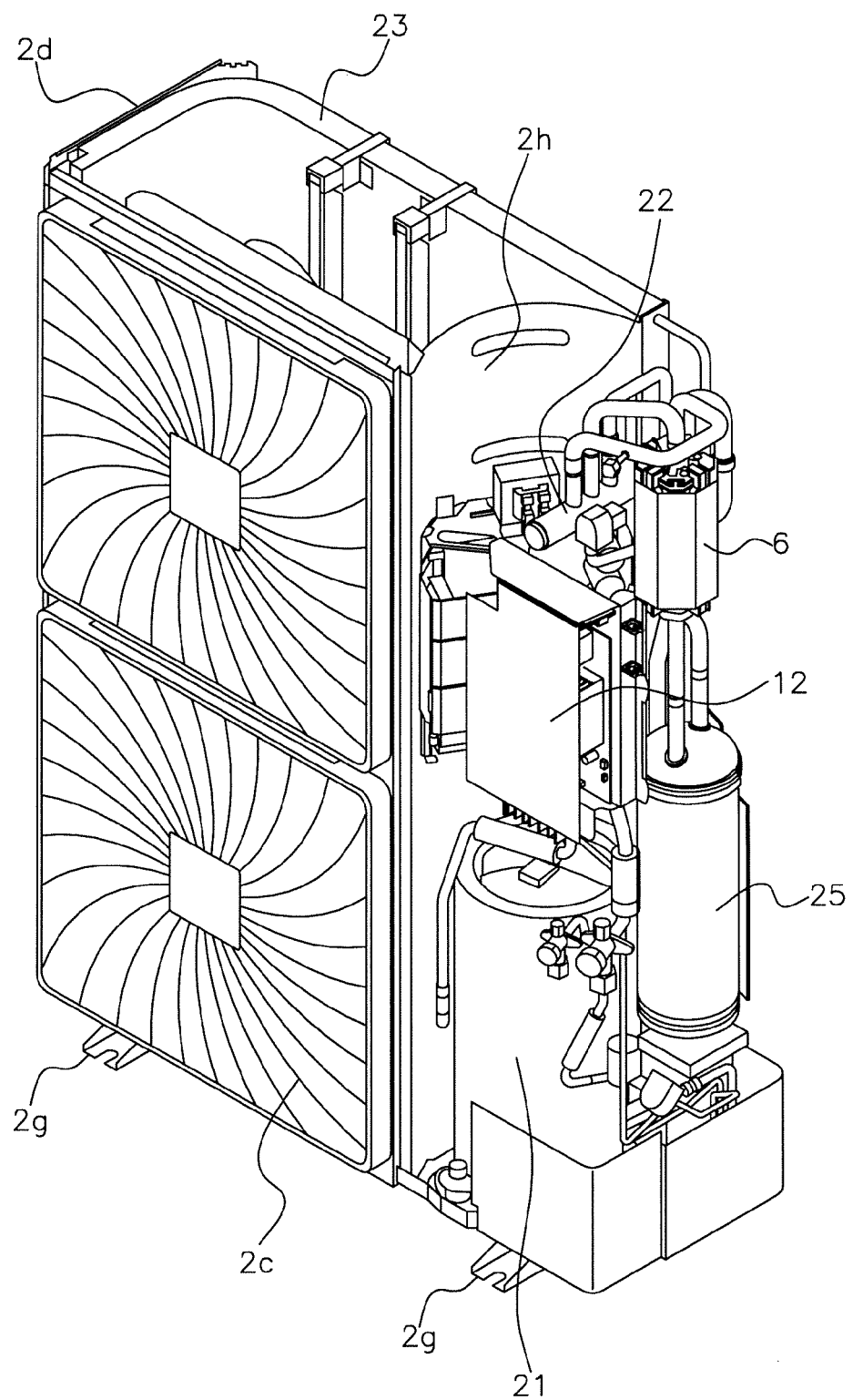
FIG. 5 is an overall front perspective view showing the internal structure of a machine chamber of the outdoor unit.
Figure 6:
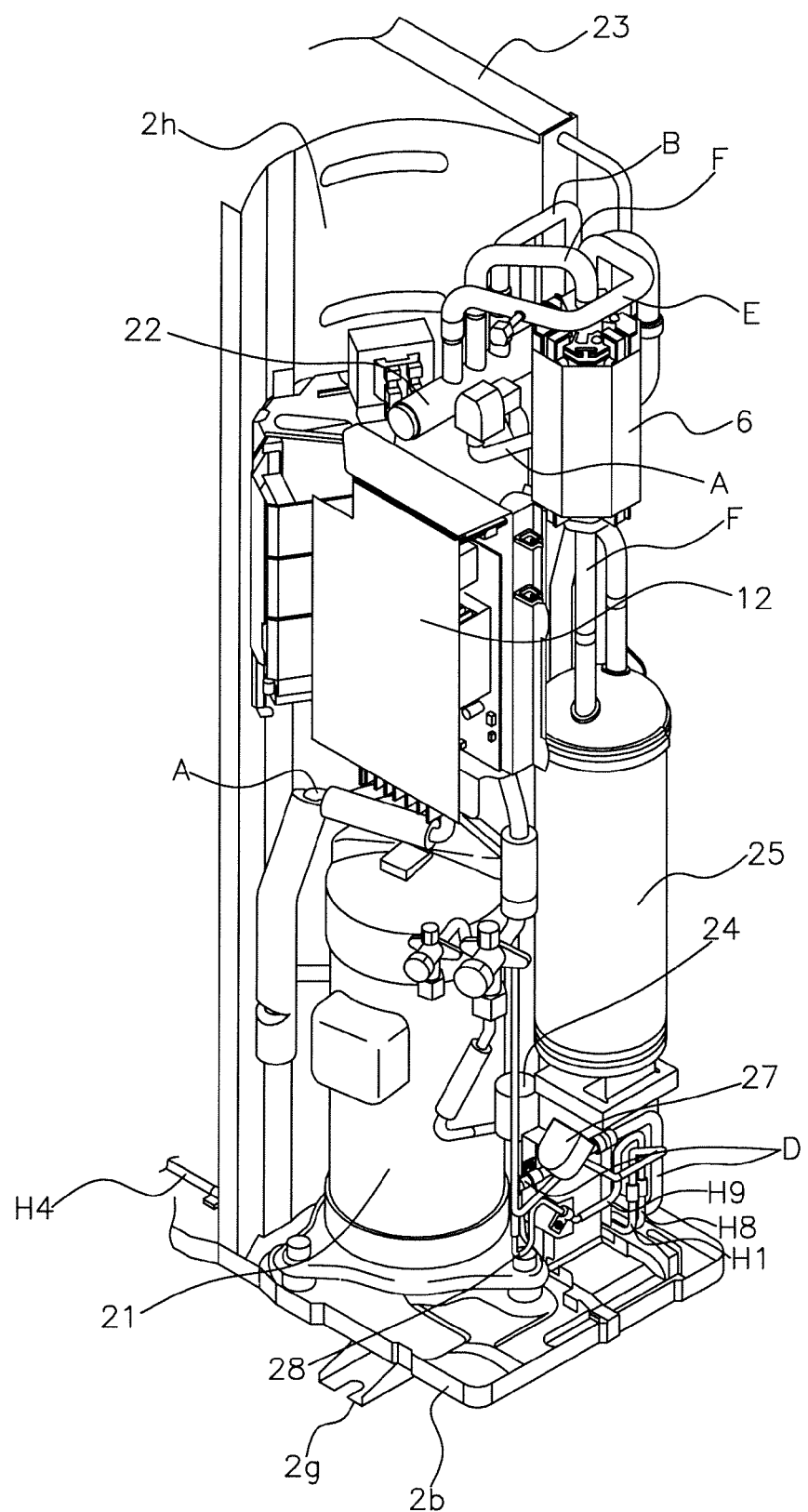
FIG. 6 is a perspective view showing the internal structure of the machine chamber of the outdoor unit.
Figure 7:
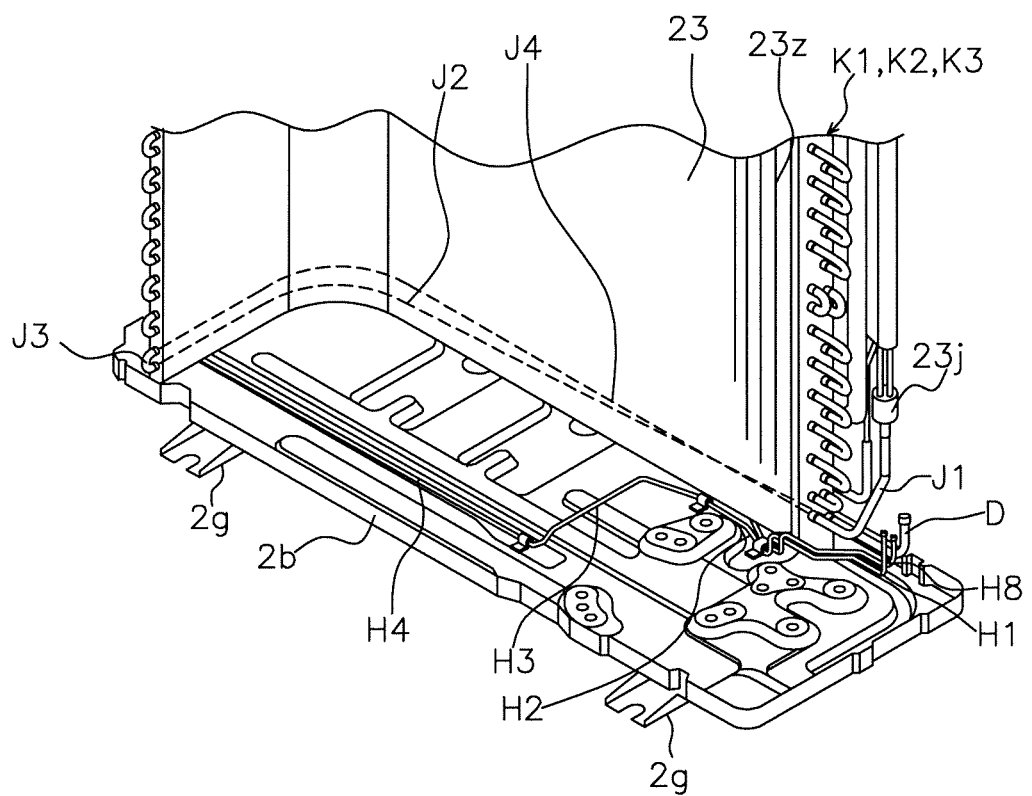
FIG. 7 is a perspective view of a bottom plate and an outdoor heat exchanger of the outdoor unit.

FIG. 5 shows an overall front perspective view showing the internal structure of the machine chamber of the outdoor unit 2. FIG. 6 shows a perspective view showing the internal structure of the machine chamber of the outdoor unit 2. FIG. 7 shows a perspective view depicting the arrangement relationship between the outdoor heat exchanger 23 and the bottom plate 2b.

The partitioning plate 2H partitions the outdoor unit 2 frontward to rearwaward from the top end to the bottom end, so as to section the outdoor unit 2 into an air-blower chamber in which the outdoor heat exchanger 23, the outdoor fans 26, and other components are placed, and a machine chamber in which the electromagnetic induction heating unit 6, the compressor 21, the accumulator 25, and other components are placed. The compressor 21 and the accumulator 25 are placed in a space below the machine chamber of the outdoor unit 2. The electromagnetic induction heating unit 6, the four-way switching valve 22, and the outdoor control part 12 are placed in an upper space of the machine chamber of the outdoor unit 2, which is also a space at the top of the compressor 21, the accumulator 25, and other components. The functional elements constituting the outdoor unit 2 and placed in the machine chamber, which are the compressor 21, the four-way switching valve 22, the outdoor heat exchanger 23, the outdoor electric expansion valve 24, the accumulator 25, the hot gas bypass valve 27, the capillary tube 28, and the electromagnetic induction heating unit 6, are connected via the discharge tube A, the indoor-side gas tube B, the outdoor-side liquid tube D, the outdoor-side gas tube E, the accumulation tube F, the hot gas bypass circuit H, and other components so that the refrigeration cycle is performed by the refrigerant circuit 10 shown in FIG. 1. The hot gas bypass circuit H is configured from nine portions linked, which are a first bypass portion H1 through to a ninth bypass portion H9 as described hereinafter, and when refrigerant flows through the hot gas bypass circuit H, the refrigerant flows sequentially from the first bypass portion H1 to the ninth bypass portion H9.

<1-4> Converging Tube J and Branched Tube K

The converging tube J shown in FIG. 7 has a cross-sectional area equivalent to the cross-sectional areas of the first branched tube K1, the second branched tube K2, and the third branched tube K3 as described above, and within the outdoor heat exchanger 23, the portion containing the first branched tube K1, the second branched tube K2, and the third branched tube K3 can be increased in heat exchange effective surface area over that of the converging tube J. In the portion of the converging tube J, a large amount of refrigerant collects and flows intensively in comparison with the portion of the first branched tube K1, the second branched tube K2, and the third branched tube K3, and the formation of ice below the outdoor heat exchanger 23 can therefore be suppressed more effectively. The converging tube J herein is composed of a first converging tube portion J1, a second converging tube portion J2, a third converging tube portion J3, and a fourth converging tube portion J4 connected to each other, as shown in FIG. 7. Refrigerant that has flowed into the outdoor heat exchanger 23 through the branched tube K converges at the converging/branching point 23j, and the configuration permits the refrigerant in the refrigerant circuit 10 to make a pass through the lowest end of the outdoor heat exchanger 23 after having collected into one flow. The first converging tube portion J1 extends from the converging/branching point 23j to the heat exchange fins 23z placed in the outermost edge of the outdoor heat exchanger 23. The second converging tube portion J2 extends from the end of the first converging tube portion J1 so as to pass through the plurality of heat exchange fins 23z. Similar to the second converging tube portion J2, the fourth converging tube portion 34 also extends so as to pass through the plurality of heat exchange fins 23z. The third converging tube portion J3 is a U-shaped tube which connects the second converging tube portion J2 and the fourth converging tube portion J4 in the end of the outdoor heat exchanger 23. During the air-cooling operation, since the flow of refrigerant in the refrigerant circuit 10 collects from a multiple-split flow in the branched tube K into a single flow in the converging tube J, the refrigerant can collect into a single flow in the converging tube J even if the degree of subcooling of the refrigerant flowing through the branched tube K in the portion immediately before the converging/branching point 23j differs with each set of refrigerant flowing through the individual tubes constituting the branched tube K, and the degree of subcooling of the outlet of the outdoor heat exchanger 23 can therefore be adjusted. When the defrosting operation is performed during the air-warming operation, the hot gas bypass valve 27 is opened and high-temperature refrigerant discharged from the compressor 21 can be supplied to the converging tube J provided at the bottom end of the outdoor heat exchanger 23 before being supplied to the other portions of the outdoor heat exchanger 23. Therefore, ice deposited in the bottom vicinity of the outdoor heat exchanger 23 can be effectively thawed.

<1-5> Hot Gas Bypass Circuit H

Figure 8:
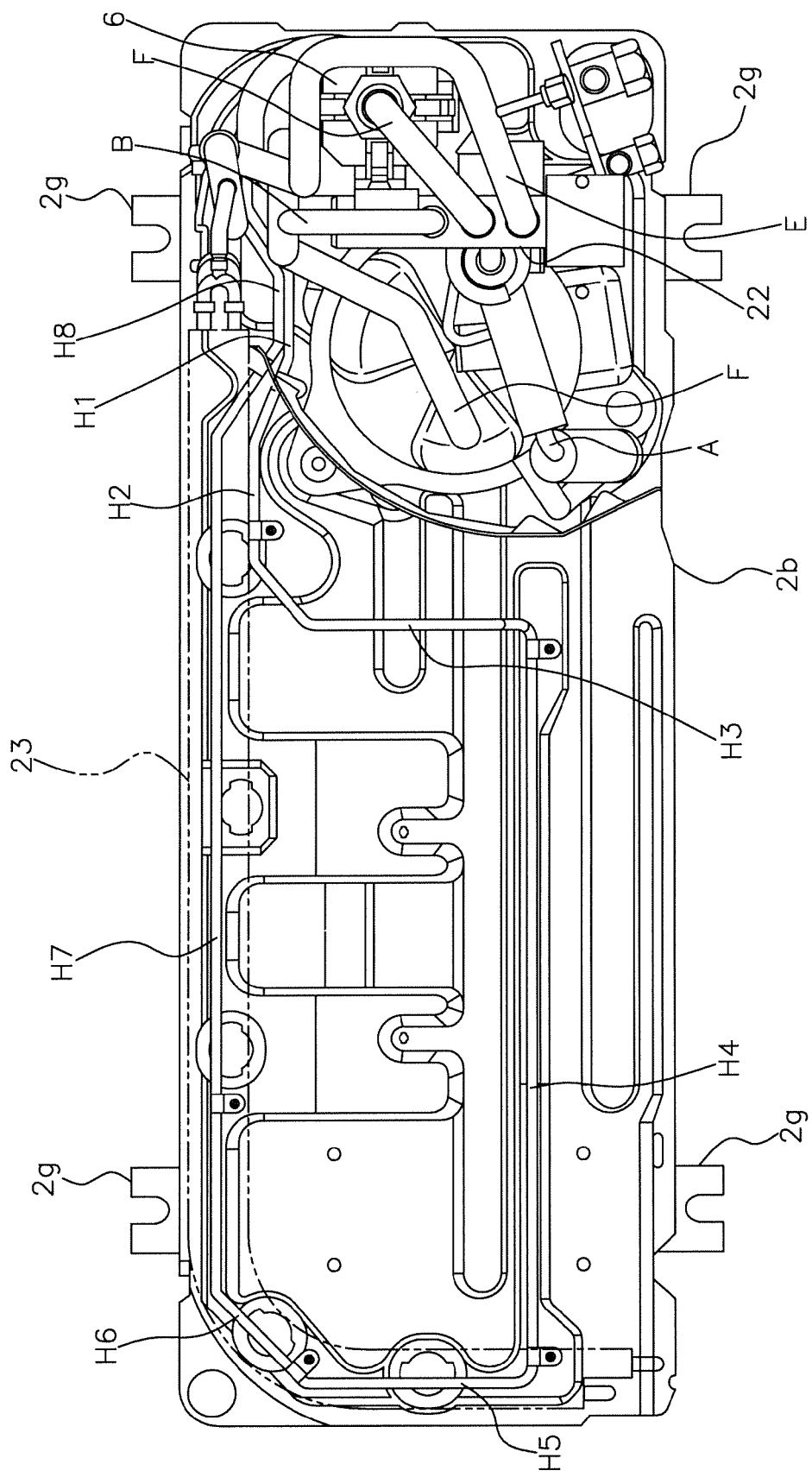
FIG. 8 is a plan view in which an air-blowing mechanism of the outdoor unit has been removed.
Figure 9:
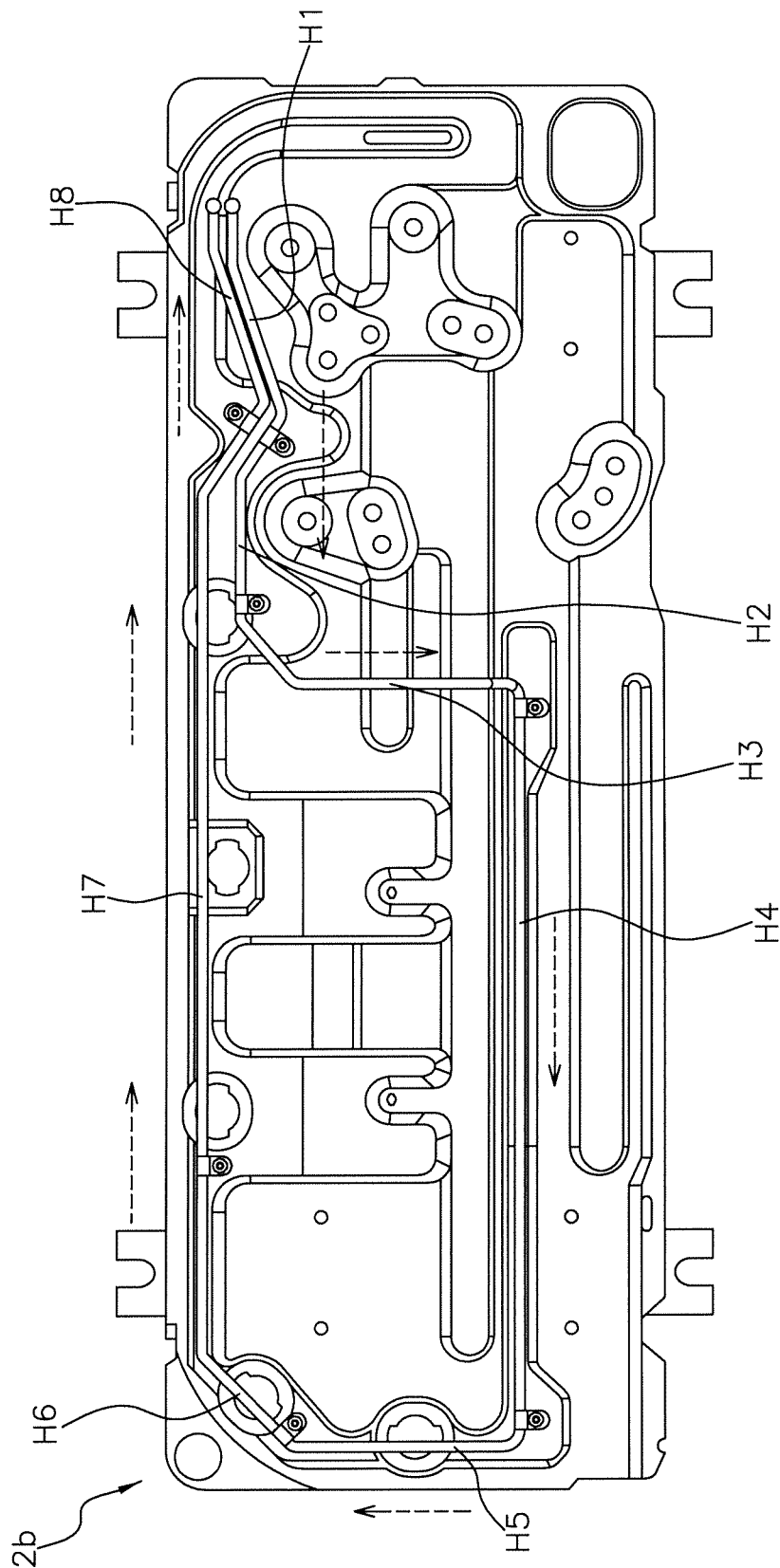
FIG. 9 is a plan view showing the placement relationship between the bottom plate of the outdoor unit and a hot gas bypass circuit.

FIG. 8 shows a plan view in which the air-blowing mechanism of the outdoor unit 2 has been removed. FIG. 9 shows a plan view of the placement relationship between the bottom plate of the outdoor unit 2 and the hot gas bypass circuit H.

The hot gas bypass circuit H has a first bypass portion H1 through to an eighth bypass portion H8 as shown in FIGS. 8 and 9, and also a ninth bypass portion H9 which is not shown. In the hot gas bypass circuit H, the portion that branches at the branching point A1 from the discharge tube A, extends to the hot gas bypass valve 27, and further extends from this hot gas bypass valve 27 is the first bypass portion H1. The second bypass portion H2 extends from the end of the first bypass portion H1 toward the air-blower chamber near the rear side. The third bypass portion H3 extends toward the front side from the end of the second bypass portion H2. The fourth bypass portion H4 extends in the opposite direction of the machine chamber, toward the left, from the end of the third bypass portion H3. The fifth bypass portion H5 extends toward the rear side from the end of the fourth bypass portion H4, up to a portion where a gap can be ensured from the rear side panel 2e of the outdoor unit casing. The sixth bypass portion 1H6 extends from the end of the fifth bypass portion H5 toward the machine chamber at the right and toward the rear side. The seventh bypass portion H7 extends from the end of the sixth bypass portion H6 toward the machine chamber at the right and through the inside of the air-blower chamber. The eighth bypass portion H8 extends through the inside of the machine chamber from the end of the seventh bypass portion H7. The ninth bypass portion H9 extends from the end of the eighth bypass portion H8 until it reaches the capillary tube 28. When the hot gas bypass valve 27 has been opened, refrigerant flows through the hot gas bypass circuit H in sequence from the first bypass portion H1 to the ninth bypass portion H9 as described above. Therefore, the refrigerant that branches at the branching point A1 of the discharge tube A extending from the compressor 21 flows to the first bypass portion H1 before the refrigerant flowing through the ninth bypass portion H9. Therefore, viewing the refrigerant flowing through the hot gas bypass circuit H as a whole, the refrigerant that has flowed through the fourth bypass portion H4 then continues to flow to the fifth through eighth bypass portions H8, the temperature of the refrigerant flowing through the fourth bypass portion H4 readily becomes higher than the temperature of the refrigerant flowing through the fifth through eighth bypass portions H8.

Thus, the hot gas bypass circuit H is placed in the bottom plate 2b of the outdoor unit casing so as to pass near the portion below the outdoor fans 26 and below the outdoor heat exchanger 23. Therefore, the vicinity of the portion where the hot gas bypass circuit H passes can be warmed by the high-temperature refrigerant branched and supplied from the discharge tube A of the compressor 21 without the use of a heater or another separate heat source. Consequently, even if the top side of the bottom plate 2b is wetted by rainwater or by drain water produced in the outdoor heat exchanger 23, the formation of ice can be suppressed in the bottom plate 2b below the outdoor fans 26 and below the outdoor heat exchanger 23. It is thereby possible to avoid situations in which the driving of the outdoor fans 26 is hindered by ice and situations in which the surface of the outdoor heat exchanger 23 is covered by ice, reducing heat exchange efficiency. The hot gas bypass circuit H is arranged so as to pass below the outdoor fans 26 after branching at the branching point A1 of the discharge tube A and before passing below the outdoor heat exchanger 23. Therefore, the formation of ice below the outdoor fans 26 can be prevented with greater priority.

<1-6> Electromagnetic Induction Heating Unit 6

Figure 10:
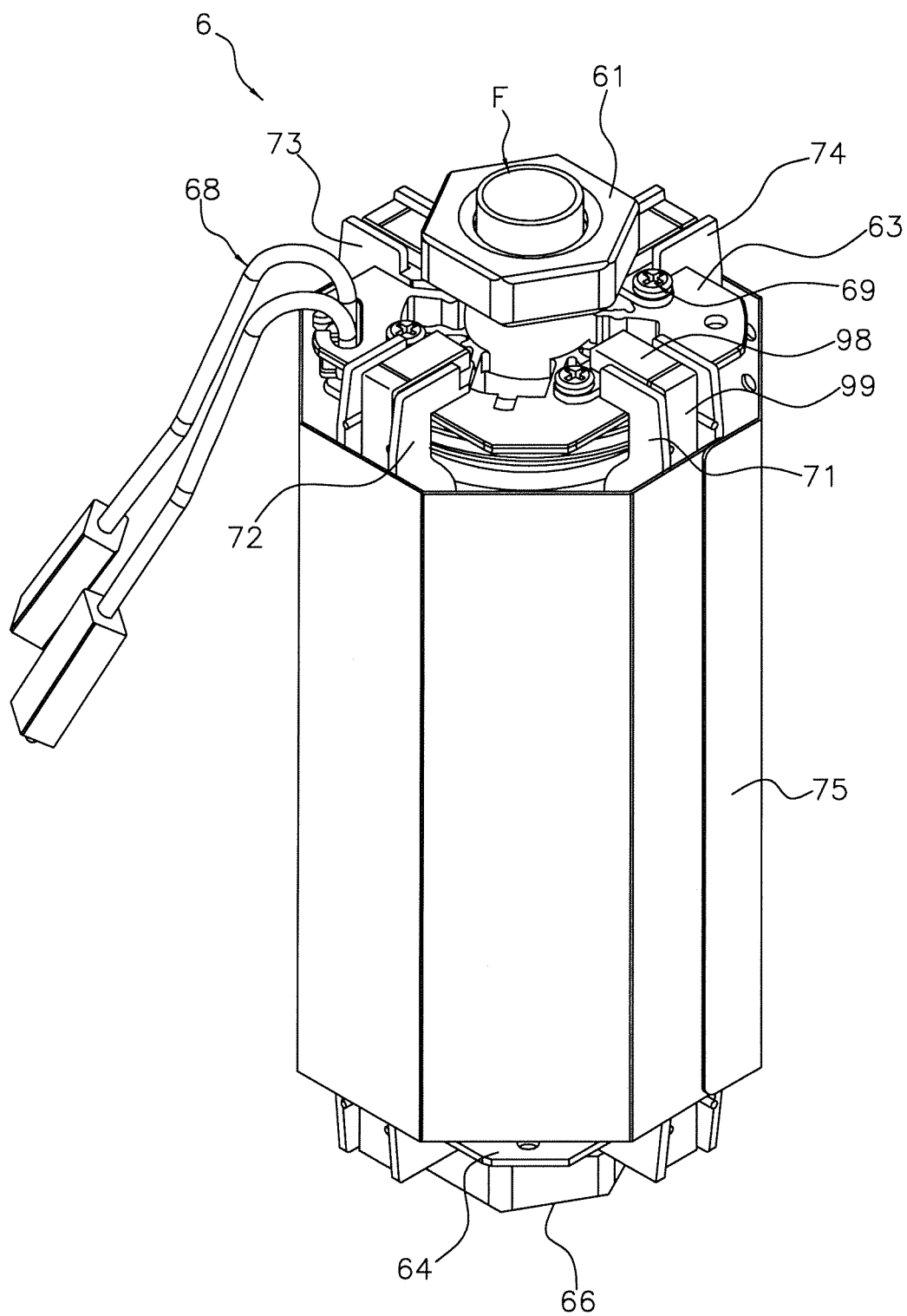
FIG. 10 is an external perspective view of an electromagnetic induction heating unit.
Figure 11:
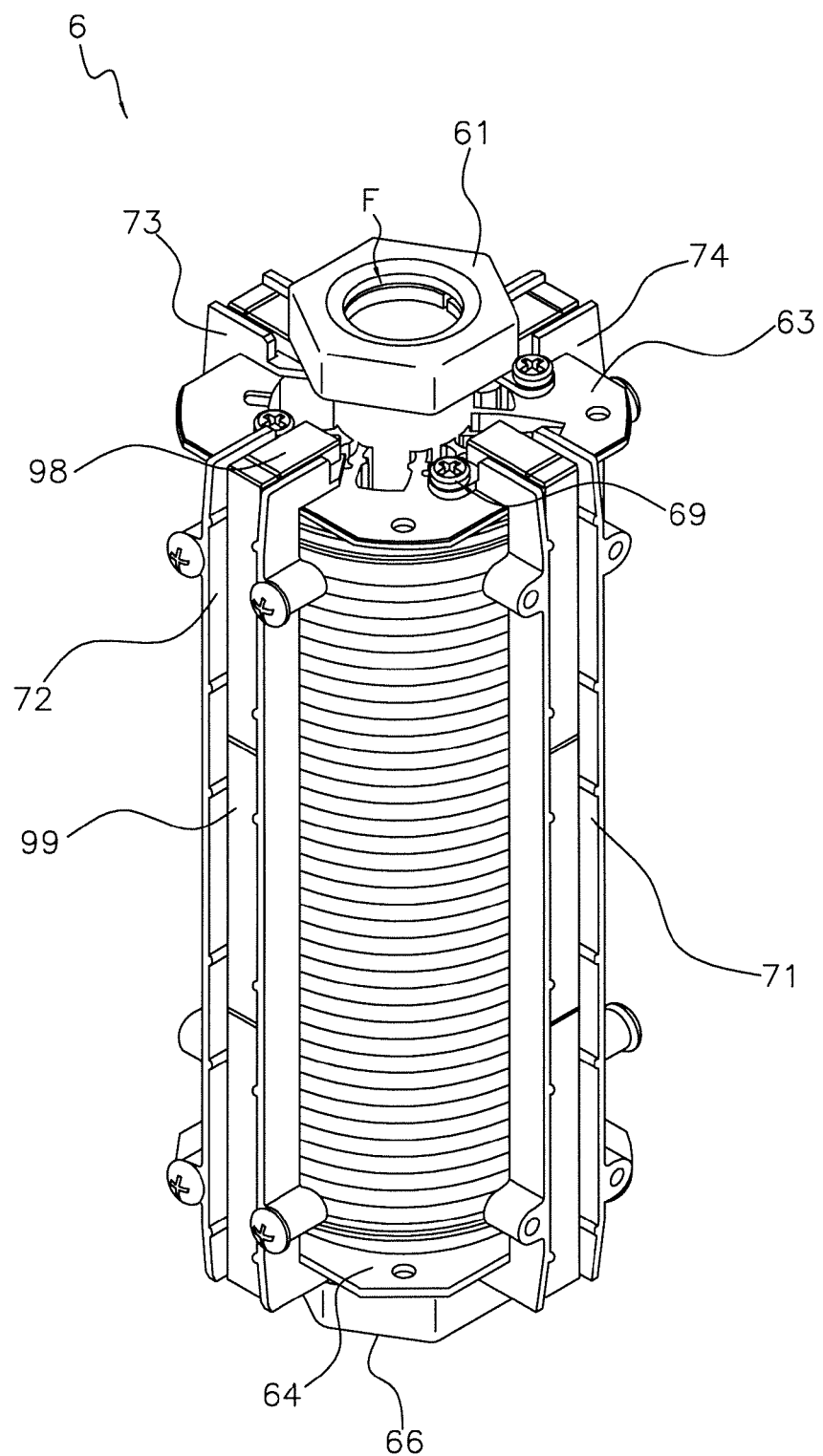
FIG. 11 is an external perspective view showing a state in which a shielding cover has been removed from the electromagnetic induction heating unit.
Figure 12:
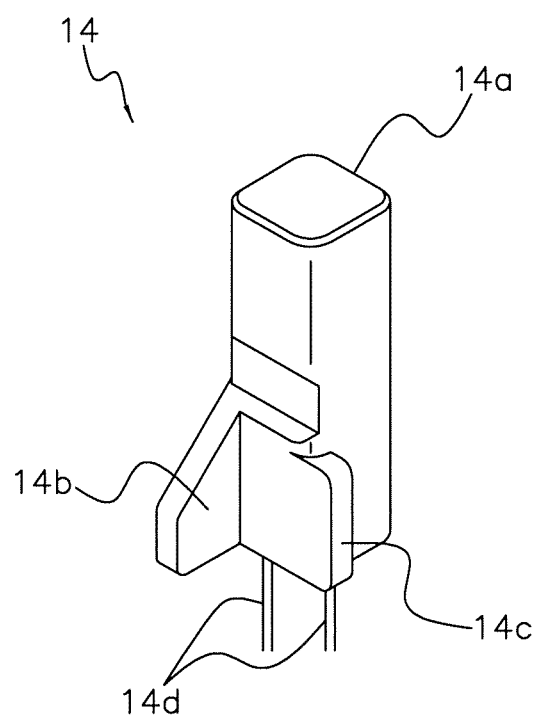
FIG. 12 is an external perspective view of an electromagnetic induction thermistor.

FIG. 10 shows a schematic perspective view of the electromagnetic induction heating unit 6 attached to the accumulation tube F. FIG. 11 shows an external perspective view in which a shielding cover 75 has been removed from the electromagnetic induction heating unit 6. FIG. 12 shows a cross-sectional view of the electromagnetic induction heating unit 6 attached to the accumulation tube F.

The electromagnetic induction heating unit 6 is placed so as to cover the magnetic tube F2 from the radially outer side, the magnetic tube F2 being the heat-generating portion of the accumulation tube F, and the magnetic tube F2 is made to generate heat by electromagnetic induction heating. This heat-generating portion of the accumulation tube F has a double-layered tube structure having a copper tube F1 on the inner side and a magnetic tube F2 on the outer side.

The electromagnetic induction heating unit 6 comprises a first hexagonal nut 61, a second hexagonal nut 66, a first bobbin cover 63, a second bobbin cover 64, a bobbin main body 65, a first ferrite case 71, a second ferrite case 72, a third ferrite case 73, a fourth ferrite case 74, a first ferrite 98 a second ferrite 99, a coil 68, the shielding cover 75, an electromagnetic induction thermistor 14, a fuse 15, and other components.

Figure 13:
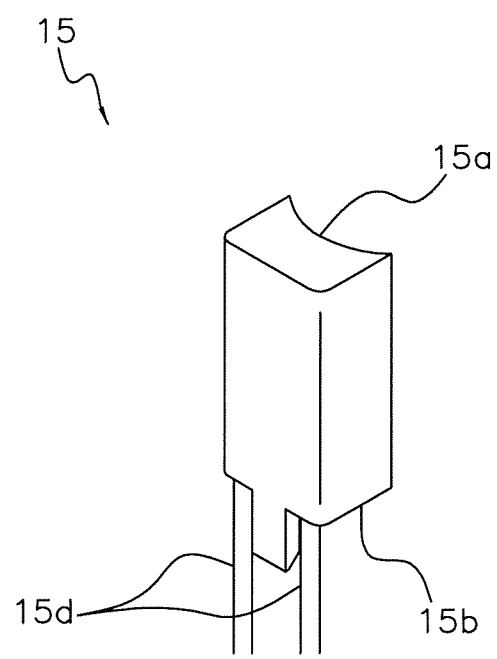
FIG. 13 is an external perspective view of a fuse.
Figure 14:
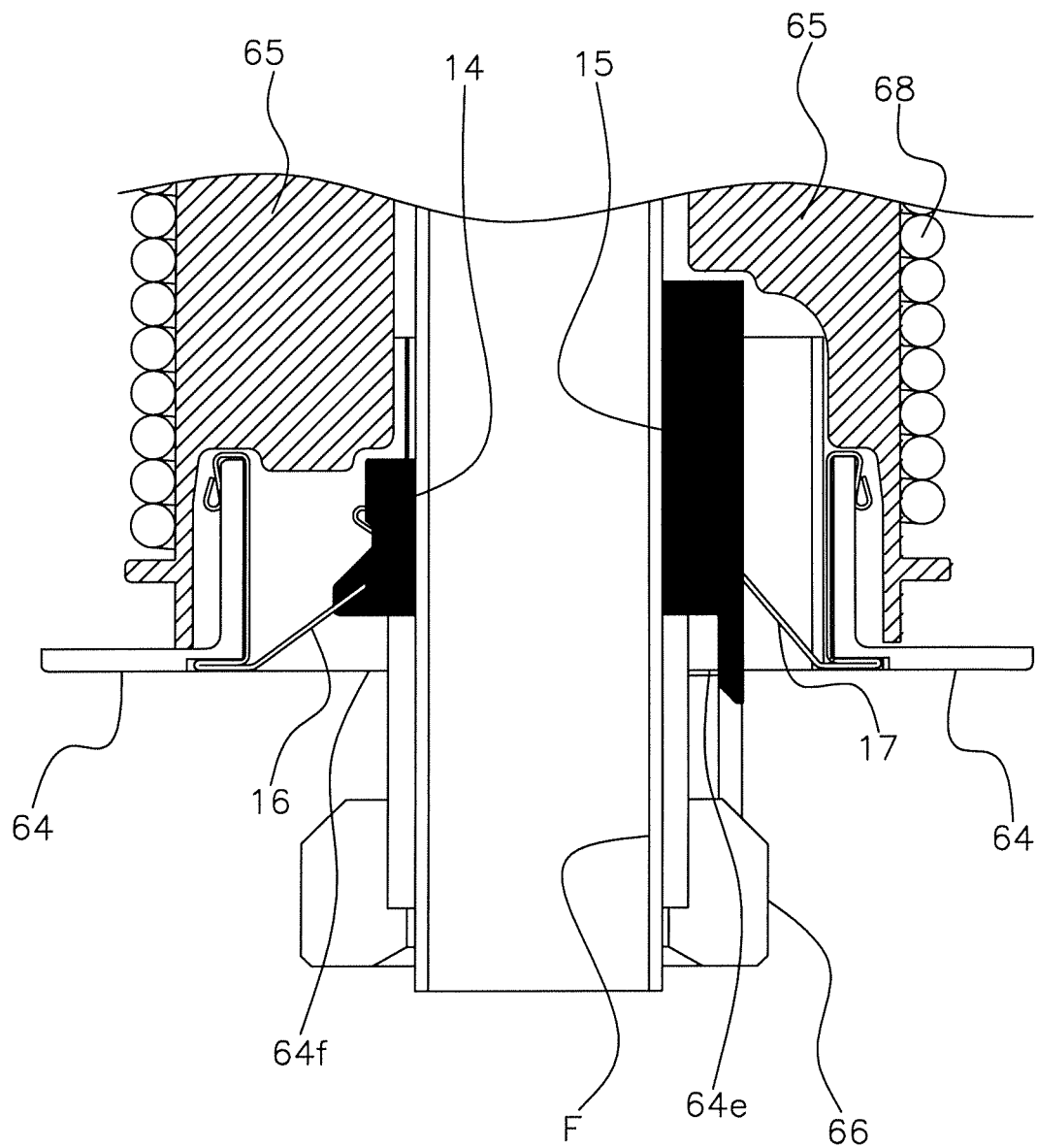
FIG. 14 is a schematic cross-sectional view showing the attached state of the electromagnetic induction thermistor and the fuse.
Figure 16:
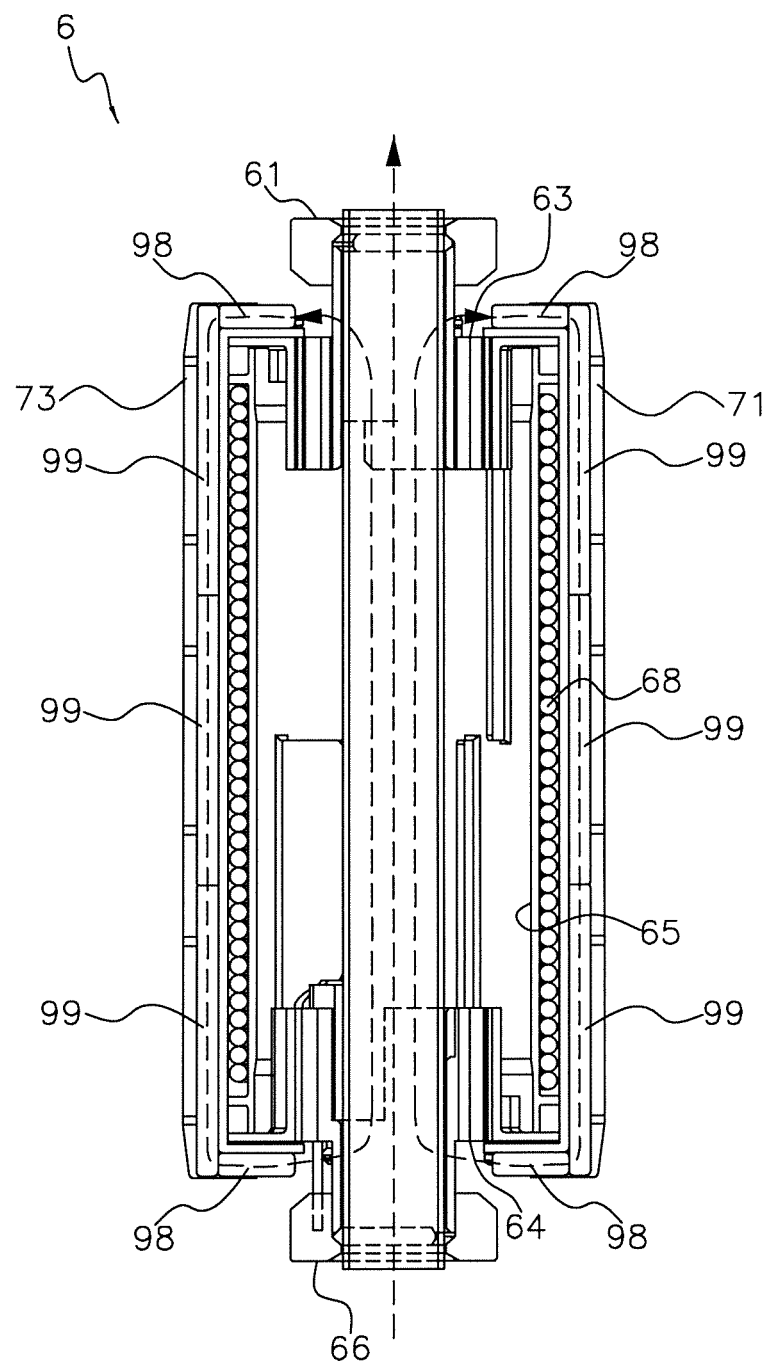
FIG. 16 is a cross-sectional view showing the details of a magnetic flux.

The first hexagonal nut 61 and the second hexagonal nut 66 are made of a resin, and are used to stabilize the fixed state between the electromagnetic induction heating unit 6 and the accumulation tube F with the aid of a C ring (not shown). The first bobbin cover 63 and the second bobbin cover 64 are made of a resin and are used to cover the accumulation tube F from the radially outer side in the top end position and bottom end position, respectively. The first bobbin cover 63 and the second bobbin cover 64 have four screw holes for screws 69, whereby the first through fourth first ferrite cases 71 to 74 described hereinafter are screwed in via the screws 69. Furthermore, the second bobbin cover 64 has an electromagnetic induction thermistor insertion opening 64F for inserting the electromagnetic induction thermistor 14 shown in FIG. 12 and attaching it to the outer surface of the magnetic tube F2. The second bobbin cover 64 also has a fuse insertion opening 64E for inserting the fuse 15 shown in FIG. 13 and attaching it to the outer surface of the magnetic tube F2. The electromagnetic induction thermistor 14 has an electromagnetic induction thermistor detector 14A, an outer projection 14B, a side projection 14C, and electromagnetic induction thermistor wires 14D for converting the detection result of the electromagnetic induction thermistor detector 14A to a signal and sending it to the control part 11, as shown in FIG. 12. The electromagnetic induction thermistor detector 14A has a shape that conforms to the curved shape of the outer surface of the accumulation tube F, and has a substantial contact surface area. The fuse 15 has a fuse detector 15A, an asymmetrical shape 15B, and fuse wires 15D for converting the detection result of the fuse detector 15A to a signal and sending it to the control part 11, as shown in FIG. 13. Having received from the fuse 15 a notification that a temperature exceeding a predetermined limit temperature has been detected, the control part 11 performs a control for stopping the supply of electricity to the coil 68, avoiding heat damage to the equipment. The bobbin main body 65 is made of a resin and the coil 68 is wound over the bobbin main body 65. The coil 68 is wound in a helical shape over the outer side of the bobbin main body 65, the axial direction being the direction in which the accumulation tube F extends. The coil 68 is connected to a control print board (not shown), and the coil receives the supply of high-frequency electric current. The output of the control print board is controlled by the control part 11. The electromagnetic induction thermistor 14 and the fuse 15 are attached in a state in which the bobbin main body 65 and the second bobbin cover 64 have been joined together, as shown in FIG. 14. When the electromagnetic induction thermistor 14 has been attached, a satisfactory state of pressure with the outer surface of the magnetic tube F2 is maintained by a plate spring 16 pushing radially inward on the magnetic tube F2. Similarly, in the attachment of the fuse 15, a satisfactory state of pressure with the outer surface of the magnetic tube F2 is maintained by a plate spring 17 pushing radially inward on the magnetic tube F2. Thus, since the electromagnetic induction thermistor 14 and the fuse 15 stay satisfactorily in firm contact with the outer surface of the accumulation tube F, responsiveness is improved and sudden temperature changes caused by electromagnetic induction heating can be quickly detected. By the first ferrite case 71, the first bobbin cover 63 and the second bobbin cover 64 are held in from the direction in which the accumulation tube F extends and are screwed in place by the screws 69. The first ferrite case 71 through to the fourth ferrite case 74 house the first ferrite 98 and the second ferrite 99, which are configured from the highly magnetically permeable material ferrite. The first ferrite 98 and the second ferrite 99 absorb the magnetic field created by the coil 68 and form a magnetic flux pathway, thereby impeding the magnetic field from leaking out to the exterior, as shown in the cross-sectional view of the accumulation tube F and electromagnetic induction heating unit 6 of FIG. 15 and the magnetic flux explanatory drawing of FIG. 16. The shielding cover 75 is placed around the outermost periphery of the electromagnetic induction heating unit 6, and collects an unattractable magnetic flux by the first ferrite 98 and the second ferrite 99 alone. The magnetic flux mostly does not leak out past the shielding cover 75, and the location where the magnetic flux is created can be determined arbitrarily.

<1-7> Electromagnetic Induction Heating Control

The electromagnetic induction heating unit 6 described above performs a control for causing the magnetic tube F2 of the accumulation tube F to generate heat during startup in which the air-warming operation is initiated when the refrigeration cycle is caused to perform the air-warming operation, during air-warming capability assistance, and during performing of the defrosting operation. A description shall be provided of (i) a flow condition judgment process, (ii) a sensor-separated detection process, (iii) a rapid pressure-increasing process, (iv) a steady output process, and (v) a defrosting process as controls focused on the electromagnetic induction heating unit 6.

The description hereinbelow pertains to the time of startup in particular.

Figure 17:
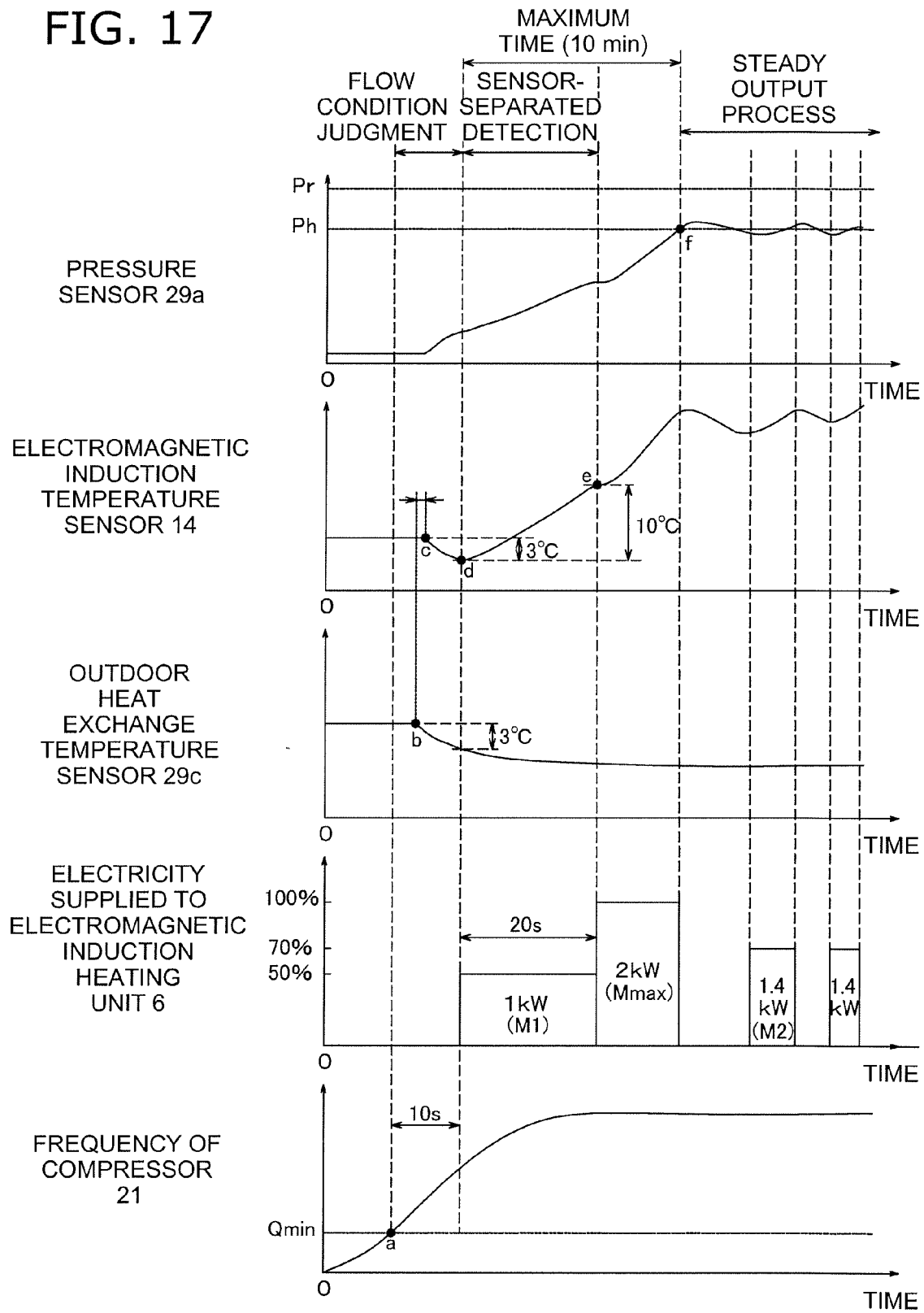
FIG. 17 is a view showing a time chart of electromagnetic induction heating control.

When an air-warming operation command is inputted to the controller 90 from the user, the control part 11 initiates the air-warming operation. When the air-warming operation is initiated, the control part 11 causes the timer 95 to initiate a count of the air-warming initiation elapsed time, then waits until the compressor 21 has started up and the pressure detected by the pressure sensor 29a has risen to 39 kg/cm$^2$, and causes the indoor fan 42 to be driven. This prevents discomfort for the user due to unwarmed air flowing into the room in the stage at which the refrigerant passing through the indoor heat exchanger 41 has not yet been warmed. Electromagnetic induction heating using the electromagnetic induction heating unit 6 is performed here in order to shorten the time for the compressor 21 to start up and the pressure detected by the pressure sensor 29a to reach 39 kg/cm$^2$. During this electromagnetic induction heating, since the temperature of the accumulation tube F rises rapidly, prior to initiating electromagnetic induction heating, the control part 11 performs a control for determining whether or not conditions are suitable for initiating electromagnetic induction heating. Examples of such a determination include a flow condition judgment process, a sensor-separation detection process, a rapid pressure-increasing process, and the like, as shown in the time chart of FIG. 17.

(i) Flow Condition Judgment Process

When electromagnetic induction heating is performed, the heating load is only the refrigerant accumulating in the portion of the accumulation tube F where the electromagnetic induction heating unit 6 is attached while refrigerant is not flowing to the accumulation tube F. Thus, when electromagnetic induction heating by the electromagnetic induction heating unit 6 is performed while refrigerant is not flowing to the accumulation tube F, the temperature of the accumulation tube F rises abnormally to an extent such that the refrigerator oil deteriorates. The temperature of the electromagnetic induction heating unit 6 itself also rises, and the reliability of the equipment is reduced. Therefore, a flow condition determination process is performed herein which ensures that refrigerant flows to the accumulation tube F during a stage prior to initiating electromagnetic induction heating, so that electromagnetic induction heating by the electromagnetic induction heating unit 6 is not performed while refrigerant is not yet flowing to the accumulation tube F.

Figure 18:
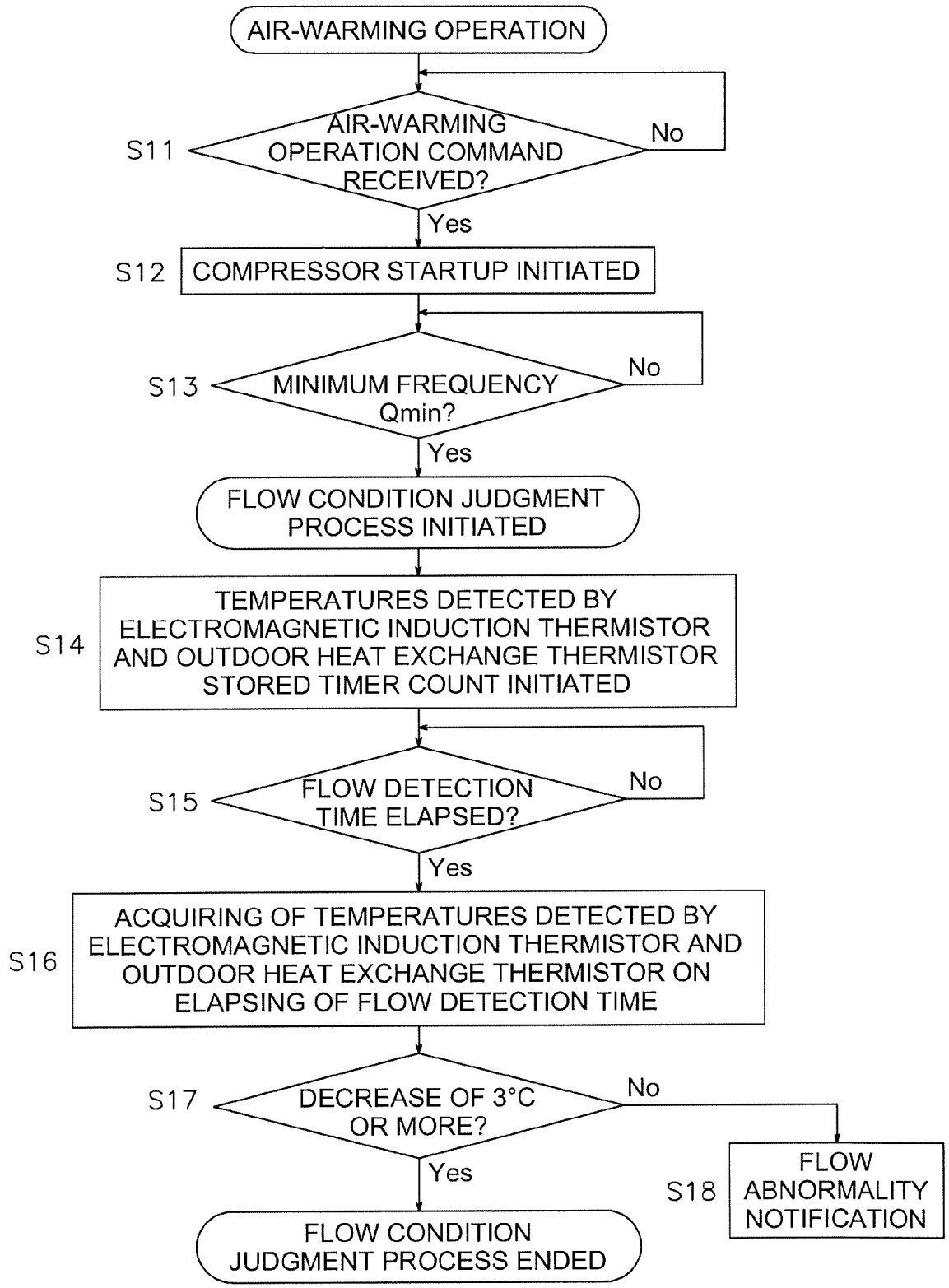
FIG. 18 is a view showing a flowchart of a flow condition judgment process.

In the flow condition determination process, the following processes are performed as shown in the flowchart of FIG. 18.

In step S11, the control part 11 determines whether or not the controller 90 has received a command from the user for the air-warming operation and not for the air-cooling operation. Such a determination is made because the refrigerant must be heated by the electromagnetic induction heating unit 6 under the conditions in which the air-warming operation is performed.

In step S12, the control part 11 initiates startup of the compressor 21, and the frequency of the compressor 21 gradually increases.

In step S13, the control part 11 determines whether or not the frequency of the compressor 21 has reached a predetermined minimum frequency Qmin, and proceeds to step S14 when it has determined that the minimum frequency has been reached.

In step S14, the control part 11 initiates the flow condition determination process, stores detected temperature data of the electromagnetic induction thermistor 14 and detected temperature data of the outdoor heat exchange temperature sensor 29c at the time the frequency of the compressor 21 reached the predetermined minimum frequency Qmin (see point a in FIG. 17), and initiates a count of the flow detection time duration by the timer 95. When the frequency of the compressor 21 has not yet reached the predetermined minimum frequency Qmin, the refrigerant flowing through the accumulation tube F and the outdoor heat exchanger 23 is in a gas-liquid double phase and maintains a constant temperature at the saturation temperature, and the temperatures detected by the electromagnetic induction thermistor 14 and the outdoor heat exchange temperature sensor 29c are therefore constant and unchanging at the saturation temperature. However, the frequency of the compressor 21 continues to increase after some time, the refrigerant pressures in the outdoor heat exchanger 23 and in the accumulation tube F continue to further decrease, and the saturation temperature begins to decrease, whereby the temperatures detected by the electromagnetic induction thermistor 14 and the outdoor heat exchange temperature sensor 29c begin to decrease. Since the outdoor heat exchanger 23 herein is positioned farther downstream than the accumulation tube F in relation to the intake side of the compressor 21, the timing at which the refrigerant temperature in the outdoor heat exchanger 23 begins to decrease is earlier than the timing at which the refrigerant temperature in the accumulation tube F begins to decrease (see points b and c in FIG. 17).

In step S15, the control part 11 determines whether or not the flow detection time duration of 10 seconds has elapsed since the timer 95 began counting, and proceeds to step S16 when the flow detection time duration has elapsed. When the flow detection time duration has not yet elapsed, step S15 is repeated.

In step S16, the control part 11 acquires detected temperature data of the electromagnetic induction thermistor 14 and detected temperature data of the outdoor heat exchange temperature sensor 29c at the time that the flow detection time duration had elapsed and the refrigerant temperatures in the outdoor heat exchanger 23 and in the accumulation tube F had decreased, and then proceeds to step S17.

In step S17, the control part 11 determines whether or not the detected temperature of the electromagnetic induction thermistor 14 acquired in step S16 has fallen 3° C. or more below the detected temperature data of the electromagnetic induction thermistor 14 stored in step S14, and also determines whether or not the detected temperature of the outdoor heat exchange temperature sensor 29c acquired in step S16 has fallen 3° C. or more below the detected temperature data of the outdoor heat exchange temperature sensor 29c stored in step S14. Specifically, it is determined whether or not a decrease in the refrigerant temperature was successfully detected during the flow detection time duration. When either the detected temperature of the electromagnetic induction thermistor 14 or the detected temperature of the outdoor heat exchange temperature sensor 29c has fallen by 3° C. or more, it is determined that refrigerant is flowing through the accumulation tube F and a refrigerant flow has been ensured, the flow condition determination process is ended, and a transition is made either to the rapid pressure-increasing process during startup in which the output of the electromagnetic induction heating unit 6 is used at its maximum limit, to the sensor-separated detection process, or to another process.

On the other hand, when neither the detected temperature of the electromagnetic induction thermistor 14 nor the detected temperature of the outdoor heat exchange temperature sensor 29c has fallen by 3° C. or more, the process transitions to step S18.

In step S18, the control part 11 assumes that the quantity of refrigerant flowing through the accumulation tube F is insufficient for induction heating by the electromagnetic induction heating unit 6, and the control part 11 outputs a flow abnormality display on the display screen of the controller 90.

(ii) Sensor-Separated Detection Process

The sensor-separated detection process is a process for confirming the attached state of the electromagnetic induction thermistor 14, and is performed after the electromagnetic induction thermistor 14 is attached to the accumulation tube F and the air conditioning apparatus 1 is finished being installed (after installation is finished, including after the breaker supplying electricity to the electromagnetic induction heating unit 6 has tripped), when the air-warming operation is first initiated. Specifically, the control part 11 performs the sensor-separated detection process after it has been determined in the flow condition judgment process that the flow volume of refrigerant in the accumulation tube F has been ensured, and before the rapid pressure-increasing process during startup in which the output of the electromagnetic induction heating unit 6 is used at its maximum limit.

When the air conditioning apparatus 1 is being transported, unanticipated vibrations or other factors can cause the attached state of the electromagnetic induction thermistor 14 to be unstable or to come apart, and when a newly transported electromagnetic induction heating unit 6 is operated for the first time, its reliability in particular is required. When a newly transported electromagnetic induction heating unit 6 operates for the first time in the proper manner, it can be estimated, to a certain extent, that subsequent operations will be stable. Therefore, the sensor-separated detection process is performed with the timing described above.

Figure 19:
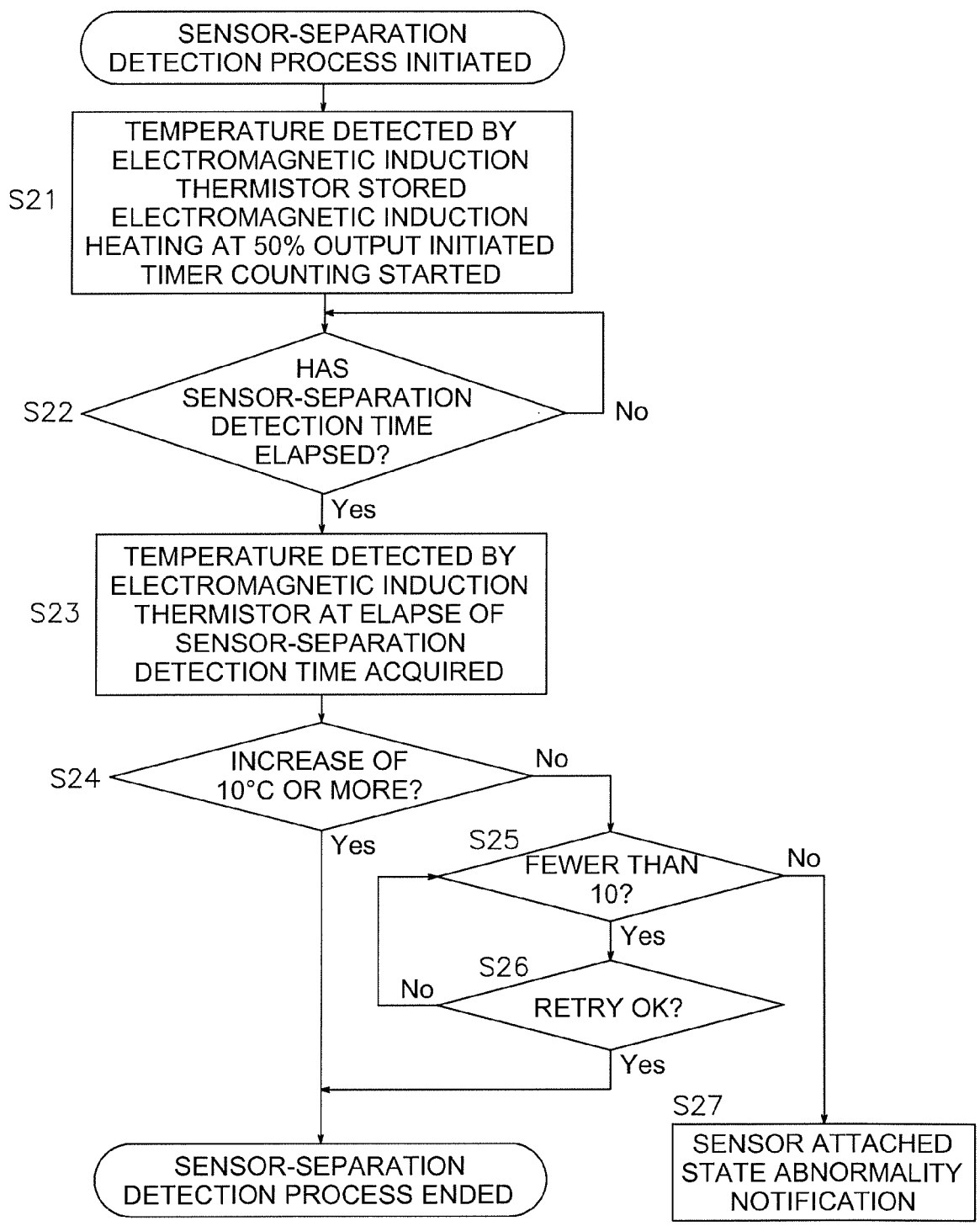
FIG. 19 is a view showing a flowchart of the sensor-separated detection process.

In the sensor-separated detection process, the following processes are performed as shown in the flowchart of FIG. 19.

In step S21, the control part 11 ensures either the refrigerant flow quantity in the accumulation tube F that was confirmed by the flow condition determination process or a greater refrigerant flow quantity, stores detected temperature data of the electromagnetic induction thermistor 14 (see point d in FIG. 17) at the time the flow detection time duration ended (=starting time point of the sensor-separated detection time duration), and initiates the supply of electricity to the coil 68 of the electromagnetic induction heating unit 6. Electricity is supplied to the coil 68 of the electromagnetic induction heating unit 6 here for the sensor-separated detection time duration of 20 seconds, at a separated detection supplied electricity M1 (1 kW) of an output 50% less than a predetermined maximum supplied electricity Mmax (2 kW). In this stage, since the attached state of the electromagnetic induction thermistor 14 is not yet confirmed to be satisfactory, the output is reduced to 50% regardless of any abnormal rise in temperature in the accumulation tube F, so that the fuse 15 will not be damaged and the resinous components of the electromagnetic induction heating unit 6 will not melt due to the electromagnetic induction thermistor 14 being unable to detect this abnormal rise in temperature. At the same time, the continuous heating time duration of the electromagnetic induction heating unit 6 is set in advance so as not to exceed the maximum continuous output time duration of 10 minutes, and the control part 11 therefore causes the timer 95 to begin counting the elapsed time duration in which the electromagnetic induction heating unit 6 continues to output. The supply of electricity to the coil 68 of the electromagnetic induction heating unit 6 and the magnitude of the magnetic field generated by the coil 68 around itself are correlated values.

In step S22, the control part 11 determines whether or not the sensor-separated detection time duration has ended. When the sensor-separated detection time duration has ended, the process transitions to step S23. When the sensor-separated detection time duration has not yet ended, step S22 is repeated.

In step S23, the control part 11 acquires the detected temperature of the electromagnetic induction thermistor 14 at the point in time when the sensor-separated detection time duration ended (point e of FIG. 17), and the process transitions to step S24.

In step S24, the control part 11 determines whether or not the detected temperature of the electromagnetic induction thermistor 14 at end of the sensor-separated detection time duration acquired in step S23 has risen 10° C. or more above the detected temperature data of the electromagnetic induction thermistor 14 at the start of the sensor-separated detection time duration stored in step S21. Specifically, a determination is made as to whether or not the refrigerant temperature has risen by 10° C. or more due to the induction heating by the electromagnetic induction heating unit 6 during the sensor-separated detection time duration. When the detected temperature of the electromagnetic induction thermistor 14 has risen by 10° C. or more, it is determined that it was successfully confirmed that the attached state of the electromagnetic induction thermistor 14 to the accumulation tube F is satisfactory and that the accumulation tube F has been appropriately warmed by the induction heating of the electromagnetic induction heating unit 6, the sensor-separated detection process is ended, and the process transitions to the rapid pressure-increasing process at startup in which the output of the electromagnetic induction heating unit 6 is used to its maximum limit. When the detected temperature of the electromagnetic induction thermistor 14 has not risen by 10° C. or more, the process transitions to step S25.

In step S25, the control part 11 counts the number of times a sensor-separated retry process was performed. When the number of retries is less than ten, the process transitions to step S26, and when the number of retries exceeds ten, the process transitions to step S27 without transitioning to step S26.

In step S26, the control part 11 performs the sensor-separated retry process. Herein the detected temperature data of the electromagnetic induction thermistor 14 at elapse of 30 more seconds (not shown in FIG. 17) is stored, electricity is supplied at a separated detection supplied electricity M1 to the coil 68 of the electromagnetic induction heating unit 6 for 20 seconds, the same processes of steps S22 and S23 are performed, the sensor-separated detection process is ended when the detected temperature of the electromagnetic induction thermistor 14 has risen by 10° C. or more, and the process transitions to the rapid pressure-increasing process at startup in which the output of the electromagnetic induction heating unit 6 is used to its maximum limit. When the detected temperature of the electromagnetic induction thermistor 14 has not risen by 10° C. or more, the process returns to step S25.

In step S27, the control part 11 determines that the attached state of the electromagnetic induction thermistor 14 to the accumulation tube F is unstable or unsatisfactory, and outputs a sensor-separated abnormality display on the display screen of the controller 90.

(iii) Rapid Pressure-Increasing Process

The control part 11 initiates the rapid pressure-increasing process in a state in which flow condition determination process and the sensor-separated detection process have ended, it was confirmed that sufficient refrigerant flow in the accumulation tube F has been ensured, the attached state of the electromagnetic induction thermistor 14 to the accumulation tube F is satisfactory, and the accumulation tube F has been appropriately warmed by induction heating by the electromagnetic induction heating unit 6.

Even if induction heating by the electromagnetic induction heating unit 6 is performed here at high output, the reliability of the air conditioning apparatus 1 is successfully improved because it is confirmed that there is no abnormal rise in temperature in the accumulation tube F.

Figure 20:
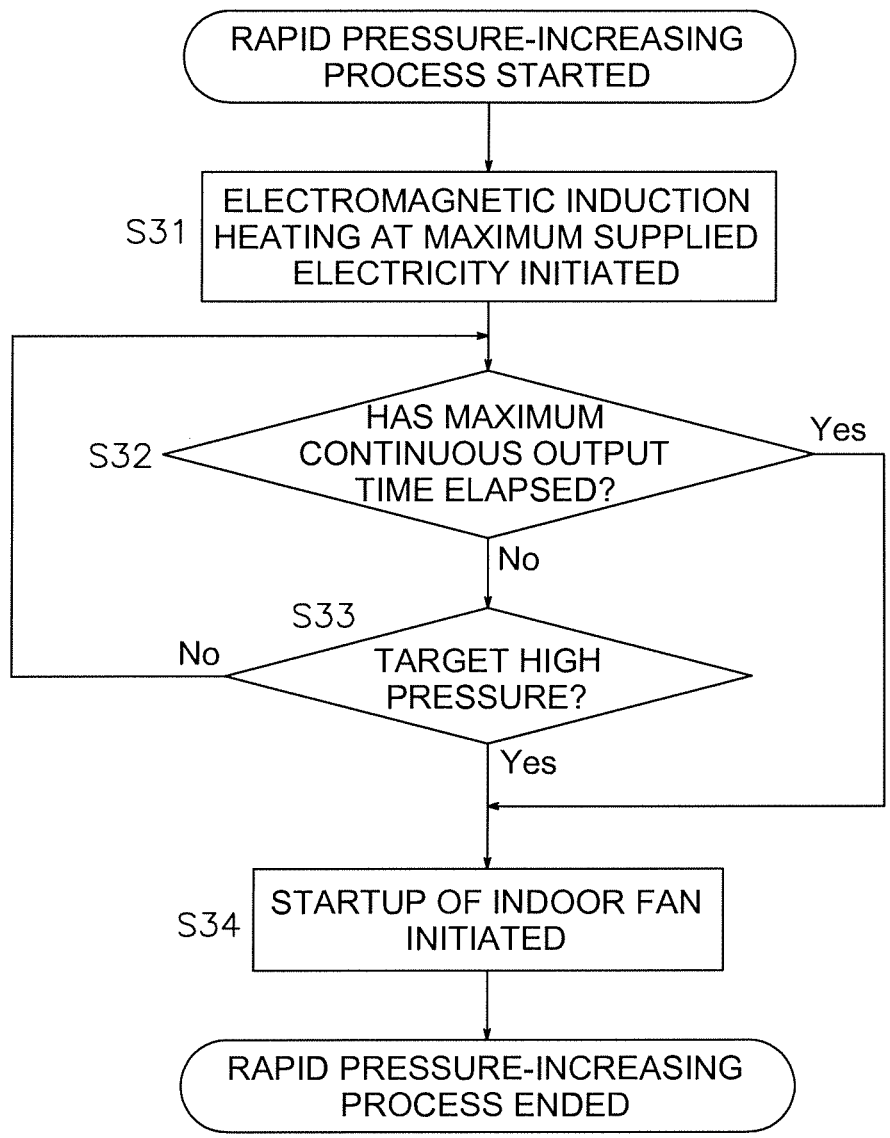
FIG. 20 is a view showing a flowchart of the rapid pressure-increasing process.

In the rapid pressure-increasing process, the following processes are performed as shown in FIG. 20.

In step S31, the control part 11 sets the supply of electricity to the coil 68 of the electromagnetic induction heating unit 6 not to the separated detected supplied electricity M1 limited to 50% output as it was during the sensor-separated detection process described above, but rather to the predetermined maximum supplied electricity Mmax (2 kW). This output by the electromagnetic induction heating unit 6 is continued until the pressure sensor 29a reaches a predetermined target high pressure Ph.

To prevent abnormal high-pressure increases in the refrigeration cycle of the air conditioning apparatus 1, the control part 11 forces the compressor 21 to stop when the pressure sensor 29a detects an abnormally high pressure Pr. The predetermined target high pressure Ph during this rapid pressure-increasing process is provided as a separate threshold that is a pressure value smaller than the abnormally high pressure Pr.

In step S32, the control part 11 determines whether or not the maximum continuous output time duration of 10 minutes of the electromagnetic induction heating unit 6 has elapsed since the start of the count in step S21 of the sensor-separated detection process. If the maximum continuous output time duration has not elapsed, the process advances to step S33. If the maximum continuous output time duration has elapsed, the process advances to step S34.

In step S33, the control part 11 determines whether or not the detected pressure of the pressure sensor 29a has reached the target high pressure Ph. If the target high pressure Ph has been reached, the process transitions to step S34. If the target high pressure Ph has not been reached, step S32 is repeated.

In step S34, the control part 11 initiates driving of the indoor fan 42, ends the rapid pressure-increasing process, and transitions to a steady output process.

When the process advances herein from step S33 to step S34, the indoor fan 42 begins to operate under conditions in which sufficiently warm conditioned air can be successfully being supplied to the user. When the process advances from step S32 to step S34, a state of successfully supplying the user with sufficiently warm conditioned air has not been reached, but conditioned air that is somewhat warm can be supplied and the supply of warm air can be initiated in a range whereby the elapsed time since the start of the air-warming operation is not too long.

(iv) Steady Output Process

In the steady output process, a steadily supplied electricity M2 (1.4 kW), which is equal to or greater than the separated detected supplied electricity M1 (1 kW) and equal to or less than the maximum supplied electricity Mmax (2 kW), is designated as a fixed output value, and the frequency of electricity supply to the electromagnetic induction heating unit 6 is PI controlled so that the detected temperature of the electromagnetic induction thermistor 14 is maintained at the startup target accumulation tube temperature of 80° C.

Figure 21:
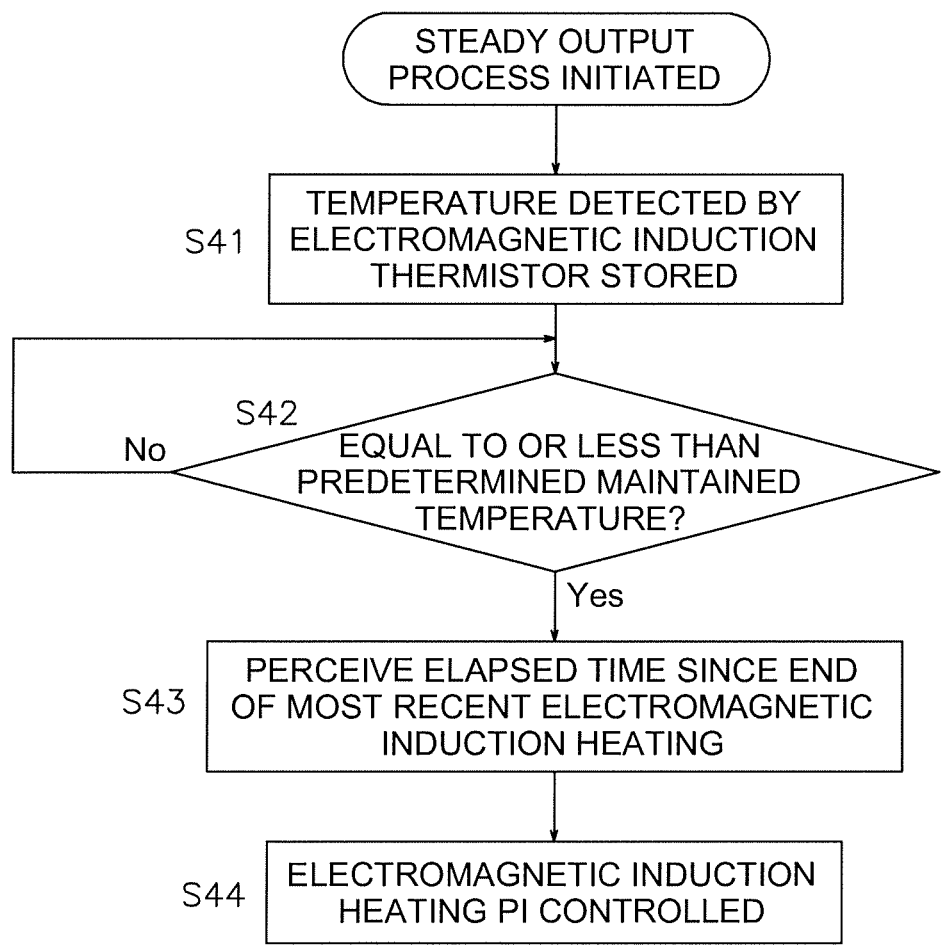
FIG. 21 is a view showing a flowchart of the steady output process.

In the steady output process, the following processes are performed as shown in the flowchart of FIG. 21.

In step S41, the control part 11 stores the detected temperature of the electromagnetic induction thermistor 14 and transitions to step S42.

In step S42, the control part 11 compares the detected temperature of the electromagnetic induction thermistor 14 stored in step S41 with the startup target accumulation tube temperature of 80° C., and determines whether or not the detected temperature of the electromagnetic induction thermistor 14 is equal to or less than a predetermined maintained temperature that is lower than the startup target accumulation tube temperature of 80° C. by a predetermined temperature. If the detected temperature is equal to or less than the predetermined maintained temperature, the process transitions to step S43. If the detected temperature is not equal to or less than the predetermined maintained temperature, the process waits continuously until the detected temperature is equal to or less than the predetermined maintained temperature.

In step S43, the control part 11 perceives the elapsed time since the end of the most recent supply of electricity to the electromagnetic induction heating unit 6.

In step S44, the control part 11 designates one set as the continuous supply of electricity to the electromagnetic induction heating unit 6 while constantly maintaining the steadily supplied electricity M2 (1.4 kW) for 30 seconds, and performs P1 control in which the frequency of this set is increased to a higher frequency the longer the elapsed time perceived in step S43.

(v) Defrosting Process

When the steady output process described above is continued and the detected temperature of the outdoor heat exchange temperature sensor 29c of the outdoor heat exchanger 23 is a predetermined value or lower, the defrosting process, which is an operation for melting frost adhering to the outdoor heat exchanger 23, is performed. Specifically, as with setting the connection state of the four-way switching valve 22 to the air-cooling operation (the connection state shown by the dashed lines of FIG. 1), high-pressure, high-temperature gas refrigerant discharged from the compressor 21 is supplied to the outdoor heat exchanger 23 before passing through the indoor heat exchanger 41, and the heat of condensation of the refrigerant is used to melt the frost adhering to the outdoor heat exchanger 23.

In the defrosting process, the following processes are performed.

In step S51, the control part 11 confirms that the frequency of the compressor 21 is equal to or greater than the predetermined minimum frequency Qmin, which ensures a predetermined refrigerant circulating volume; that a refrigerant flow volume is ensured by the flow condition judgment process to an extent such that electromagnetic induction heating can be performed; and that the state of attachment of the electromagnetic induction thermistor 14 is proper according to the sensor-separation detection process; and transitions to step S52.

In step S52, the control part 11 determines whether or not the detected temperature of the outdoor heat exchange temperature sensor 29c is less than 10° C. If it is less than 10° C., the process transitions to step S53. If it is not less than 10° C., step S52 is repeated.

In step S53, the control part 11 brings induction heating by the electromagnetic induction heating unit 6 to a halt and transmits a defrost signal.

In step S54, after transmitting a defrost signal, the control part 11 sets the connection state of the four-way switching valve 22 to the connection state of the air-cooling operation, and also performs a count, using the timer 95, of the time elapsed after defrosting is initiated, once the connection state of the four-way switching valve 22 has become the connection state of the air-cooling operation.

In step S55, the control part 11 determines whether or not 30 seconds has elapsed since defrosting was initiated. If 30 seconds has elapsed, the process transitions to step S56. If 30 seconds has not elapsed, step S55 is repeated.

In step S56, the control part 11 brings the electricity supplied to the coil 68 of the electromagnetic induction heating unit 6 to a predetermined maximum supplied electricity Mmax (2 kW), and performs PI control of the frequency of induction heating by the electromagnetic induction heating unit 6 so that the detected temperature of the electromagnetic induction thermistor 14 reaches the target defrosting temperature, which is 40° C. (different from the startup target accumulation tube temperature during the steady output process). When the detected temperature of the outdoor heat exchange temperature sensor 29c falls below 0° C., the hot gas bypass valve 27 of the hot gas bypass circuit H then opens, high-temperature, high-pressure gas refrigerant is supplied to the area below the outdoor fans 26 and below the outdoor heat exchanger 23 on the top surface of the bottom plate 2b of the outdoor unit 2, and the ice formed on the top surface of the bottom plate 2b is removed. Since the connection state of the four-way switching valve 22 is switched to the state of the air-cooling operation, the high-temperature, high-pressure gas refrigerant discharged from the compressor 21 flows from the branching/converging point 23k of the outdoor heat exchanger 23 to the converging/branching point 23j and converges into a single flow in the converging/branching point 23j, whereby refrigerant three times greater in volume than that of the branched tube K flows collectively through the converging tube J. Since the converging tube J is positioned in the vicinity of the bottom end of the outdoor heat exchanger 23, much heat of condensation can be collectively supplied to the bottom end vicinity of the outdoor heat exchanger 23. Defrosting can thereby be further quickened.

In step S57, the control part 11 determines whether or not the defrost initiation elapsed time has exceeded 10 minutes. If it has not exceeded 10 minutes, the process transitions to step S58. If it has exceeded 10 minutes, the process transitions to step S59. The connection state of the four-way switching valve 22 can thereby be prevented from remaining for 10 minutes or more in the air-cooling state, making it unlikely that the user will experience discomfort from a decrease in the indoor temperature.

In step S58, the control part 11 determines whether or not the detected temperature of the outdoor heat exchange temperature sensor 29c exceeds 10° C. If it exceeds 10° C., the process transitions to step S59. If it does not exceed 10° C., the process returns to and repeats step S56.

In step S59, the control part 11 stops the compressor 21 to equalize the high and low pressures in the refrigeration cycle, and ends induction heating by the electromagnetic induction heating unit 6.

In step S60, the control part 11 switches the connection state of the four-way switching valve 22 to the connection state of the air-warming operation.

The control part 11 then transmits a signal which ends defrosting. Furthermore, the control part 11 progressively raises the frequency of the compressor 21 to the predetermined minimum frequency Qmin or greater, and performs the steady output process until a condition is reached in which the defrosting process will be performed again. The hot gas bypass valve 27 of the hot gas bypass circuit H closes after 5 seconds following the transmission of the signal that ends defrosting.

<1-8> Air-Conditioning Startup Control

In the aforementioned electromagnetic induction superheat control, (i) the flow condition judgment process, (ii) the sensor-separated detection process, (iii) the rapid pressure-increasing process, (iv) the steady output process, and (v) the defrosting process were described with focus on the electromagnetic induction heating unit 6.

Air-conditioning startup control for enabling rapid high-temperature air discharge is performed herein by taking advantage of the electromagnetic induction superheat control being performed.

Figure 22:
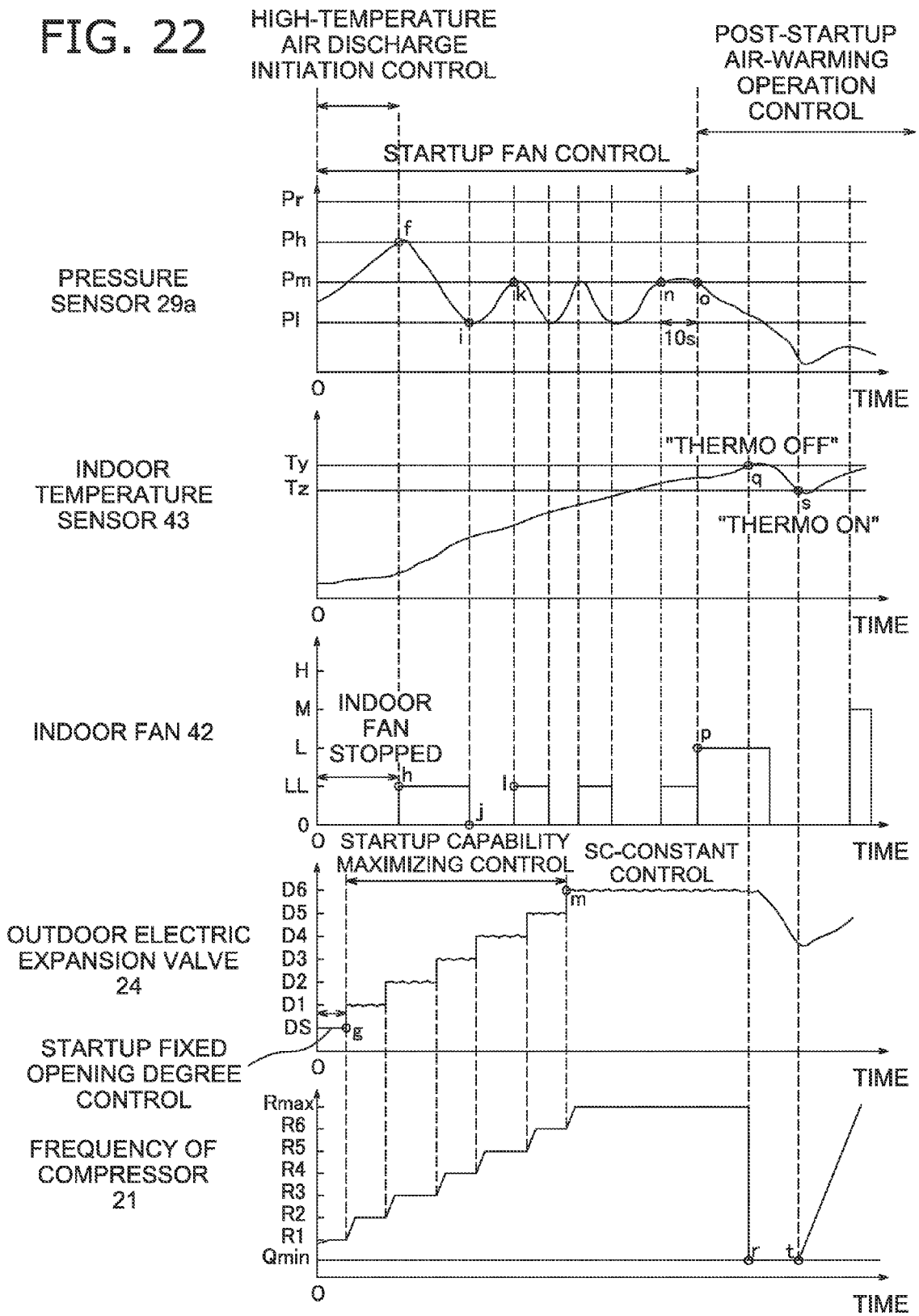
FIG. 22 is a view showing a flowchart of the defrosting process

This air-conditioning startup control involves performing (vi) lead-in judgment control, (vii) startup capability maximizing control, (viii) high-temperature air discharge initiation control, and (ix) post-startup air-warming operation control, as shown in the time chart of FIG. 22.

(vi) Lead-In Judgment Control

In lead-in judgment control, either moderate-temperature air discharge control is performed in conditions in which there is little cooling down of the surrounding temperature and there is no particular need to supply especially warm air to the user, or high-temperature air discharge control is performed for supplying warmer conditioned air to the user when the surrounding temperature is low. The control part 11 determines whether moderate-temperature air discharge control or high-temperature air discharge control will be performed based on the surrounding temperature.

Figure 24:
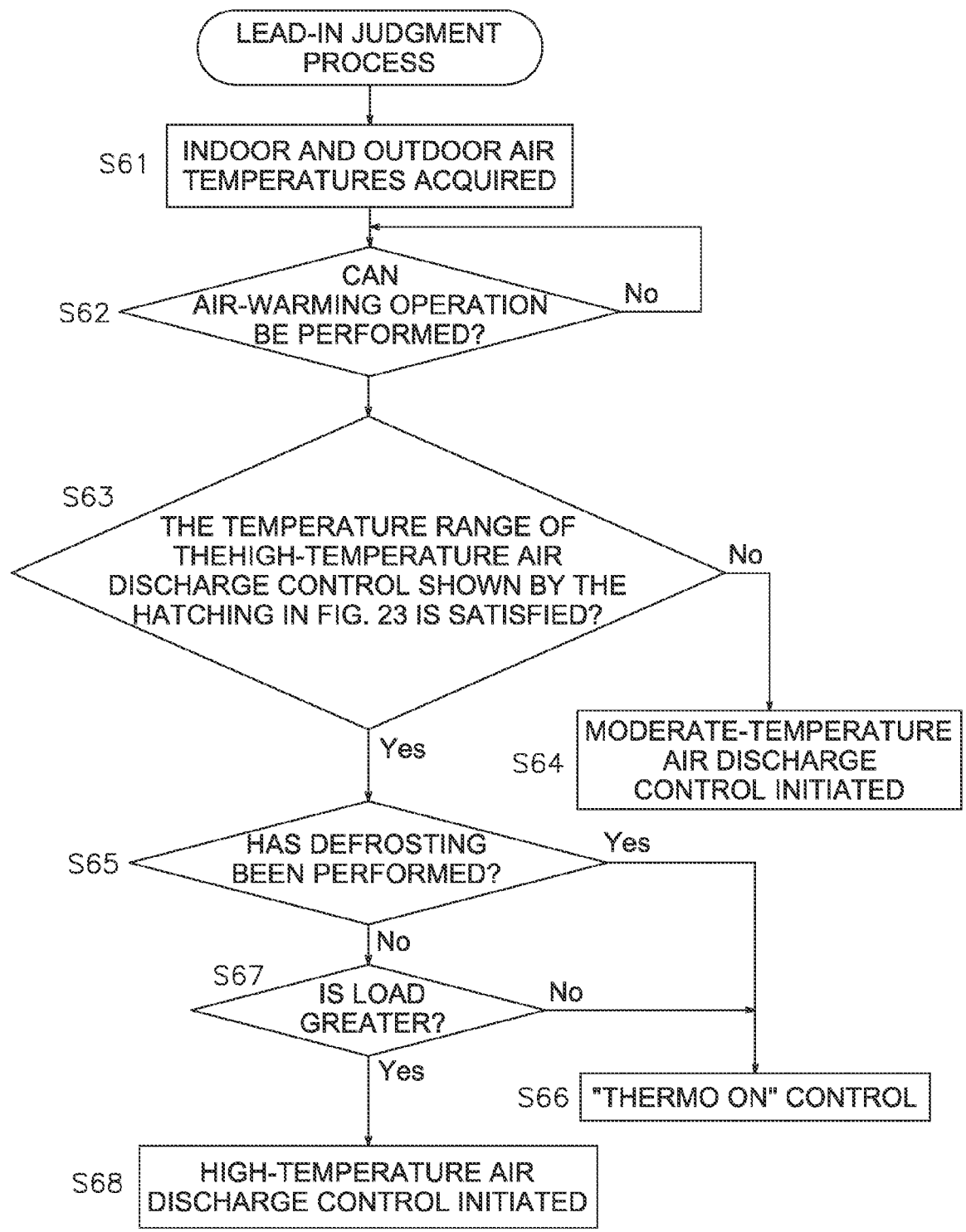
FIG. 24 is a view showing a flowchart of lead-in judgment control.

In lead-in judgment control, the following processes are performed as shown in the flowchart of FIG. 24.

In step S61, when the user inputs a set temperature and inputs a command to initiate the air-warming operation by an input button (not shown) of the controller 90, the control part 11 receives information of this air-warming operation command and acquires the detected temperature of the indoor temperature sensor 43 and the detected temperature of the outdoor air temperature sensor 29b at the time of initiation.

Figure 23:
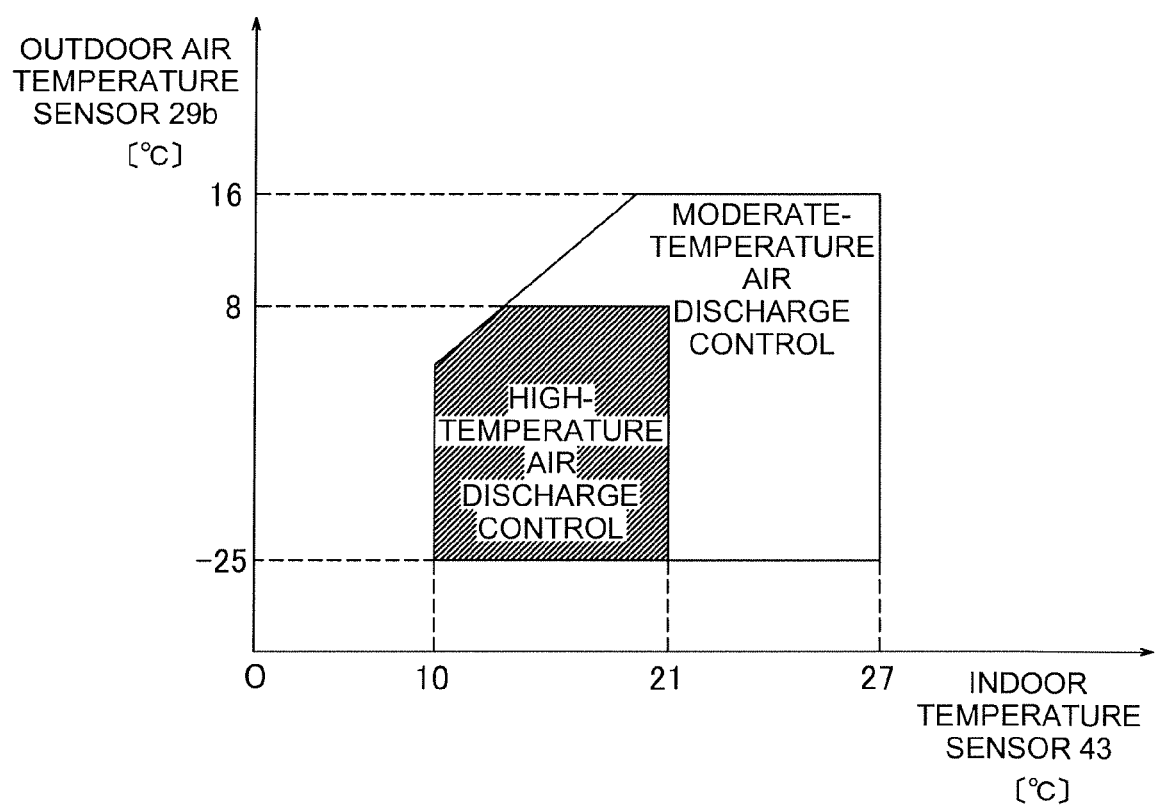
FIG. 23 is a graph showing the temperature range conditions under which high-temperature air discharge control is performed.

In step S62, the control part 11 determines whether or not the temperature conditions allow for the air-warming operation to be performed, on the basis of the indoor temperature and outdoor temperature acquired in step S61. Specifically, when the relationship between the indoor temperature and the outdoor temperature is satisfied as shown in FIG. 23, it is determined that the air-warming operation can be performed and the process transitions to step S63. The range allowing the air-warming operation is established in advance as a temperature condition range such that the outdoor air temperature is cooler than the indoor air temperature and it is possible for the refrigeration cycle of the air conditioning apparatus 1 to perform the air-warming operation. The control part 11 prestores data representing the relationship between outdoor temperature and indoor temperature such as is shown in FIG. 23.

In step S63, the control part 11 determines whether or not the temperature conditions allow for high-temperature air discharge control to be performed, on the basis of the indoor temperature and outdoor temperature acquired in step S61 as well as the relationship data between the indoor temperature and outdoor temperature shown in FIG. 23. Specifically, when the temperature range of the high-temperature air discharge control shown by the hatching in FIG. 23 is satisfied, it is determined that the high-temperature air discharge control will be performed and the process transitions to step S65. When it is determined that the high-temperature air discharge control will not be performed, it is determined that the moderate-temperature air discharge control will be performed and the process transitions to step S64.

In step S64, the control part 11 initiates the moderate-temperature air discharge control. Although a detailed description thereof is not provided, this moderate-temperature air discharge control is a control in which during startup after the air-warming operation is initiated, the indoor fan 42 is not started up until the detected temperature of the indoor refrigerant temperature sensor 44 reaches a predetermined temperature, and startup of the indoor fan 42 is initiated after the detected temperature has reached the predetermined temperature. In this moderate-temperature air discharge control, control is performed for incrementally increasing the flow rate of the indoor fan 42 until it reaches a set flow rate.

In step S65, the control part 11 determines whether or not to initiate operation after the defrosting process. If operation is to be initiated after the defrosting process, the process transitions to step S66. If operation is not to be initiated after the defrosting process, the process transitions to step S67.

In step S66, the control part 11 initiates "thermo on" control described hereinafter.

In step S67, the control part 11 determines whether or not a situation is in effect where the load is greater than a load in a situation that satisfies a "thermo on" condition for initiating the "thermo on" control. The situation where the load is greater than a load in a situation that satisfies the "thermo on" condition is a situation that satisfies the condition that the set temperature less the detected temperature of the indoor temperature sensor 43 less 0.5° C. be greater than 1. Specifically, "thermo on" control is a process of reinitiating operation in a situation in which the indoor temperature has been warmed somewhat. On the other hand, at the start of the air-warming operation, the operation-initiating process is performed in an environment in which the indoor temperature is low, the degree of deviation from the set temperature is high, and the user requests that warmer conditioned air be supplied. When it is determined that there is a situation in effect where the load is greater than a load in a situation that satisfies the "thermo on" condition, the process transitions to step S68. When it is determined that a situation is in effect where the load is equal to or less than that of a situation that satisfies the "thermo on" condition, the process transitions to step S66.

In step S68, the control part 11 initiates the high-temperature air discharge control and ends the lead-in judgment process. This high-temperature air discharge control is a control in which during startup after initiation of the air-warming operation, the indoor fan 42 is not started up until the detected pressure of the pressure sensor 29a reaches the target high pressure Ph, and startup of the indoor fan 42 is initiated after the pressure has reached the target high pressure Ph, as was also described in the electromagnetic induction superheat control.

(vii) Startup Capability Maximizing Control

In the rapid pressure-increasing process described above, a description was given of a control for shortening the time duration needed for the detected pressure of the pressure sensor 29a to reach the target high pressure Ph after initiation of the air-warming operation. The startup capability maximizing control is a control in which the opening degree of the outdoor electric expansion valve 24 is progressively increased along with the increase in the frequency of the compressor 21 after startup fixed opening degree control has been performed for narrowing the opening degree of the outdoor electric expansion valve 24 in order to shorten the time duration for reaching the target high pressure Ph when the high-temperature air discharge control has been initiated.

Figure 25:
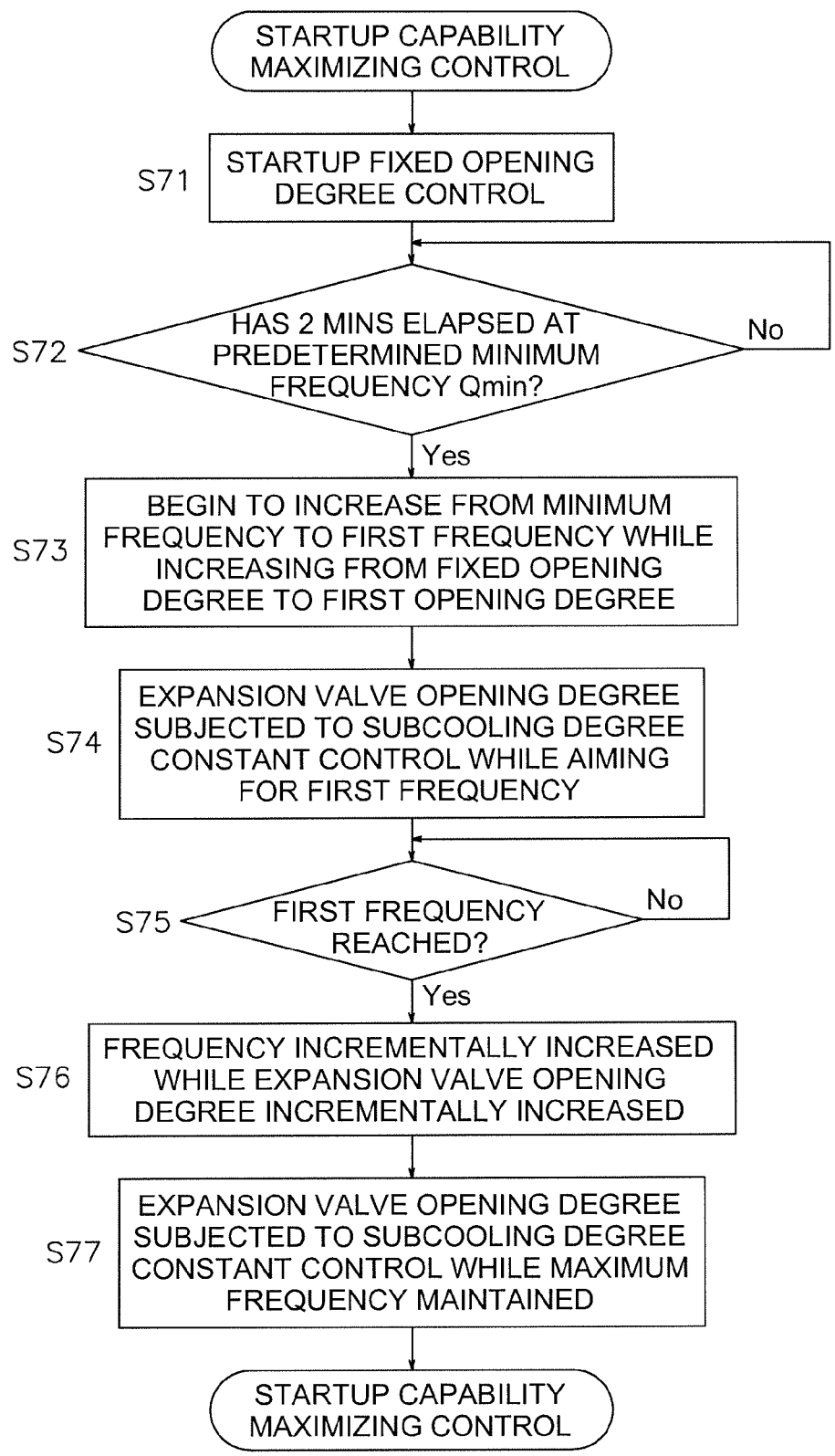
FIG. 25 is a view showing a flowchart of startup capability maximizing control.

In the startup capability maximizing control, the following processes are performed as shown in the flowchart of FIG. 25.

In step S71, with the opening degree of the outdoor electric expansion valve 24 remaining fixed at a fixed opening degree DS (see point g in FIG. 22), the control part 11 performs startup fixed opening degree control for bringing the frequency of the compressor 21 to a predetermined minimum frequency Qmin within a predetermined time duration of two minutes following initiation of the air-warming operation.

The fixed opening degree DS is the opening degree of the outdoor electric expansion valve 24, narrowed so as to be smaller than the opening degree corresponding to the state of the refrigerant. This refrigerant state corresponding opening degree is the opening degree of the outdoor electric expansion valve 24 controlled when it is assumed that the post-startup air-warming operation control, described hereinafter, has been performed under the same conditions as each of those in effect when the startup fixed opening degree control is performed. The conditions in effect when the startup fixed opening degree control is performed include operating conditions of the refrigeration cycle (the frequency of the compressor 21, the flow rate of the indoor fan 42, the flow rate of the outdoor fans 26, and the like) other than the opening degree of the outdoor electric expansion valve 24, and the surrounding temperature conditions of the refrigeration cycle (outdoor temperature conditions, indoor temperature conditions, and the like). The post-startup air-warming operation control is a control for adjusting the opening degree of the outdoor electric expansion valve 24 so that the refrigerant state of the refrigeration cycle stabilizes, so that the degree of subcooling is constant at a predetermined value in the refrigerant flowing through the side of the indoor heat exchanger 41 near the outdoor electric expansion valve 24.

In step S72, with the frequency of the compressor 21 having reached the predetermined minimum frequency Qmin, the control part 11 determines whether or not the air-warming initiation elapsed time of two minutes has elapsed as counted by the timer 95 since the air-warming operation was initiated. When the predetermined minimum frequency Qmin has been reached and the air-warming initiation elapsed time of two minutes has elapsed since the air-warming operation was initiated, the process transitions to step S73. When either the predetermined minimum frequency Qmin has not been reached or the air-warming initiation elapsed time of two minutes has not elapsed since the air-warming operation was initiated, step S72 is repeated.

In step S73, the control part 11 begins to increase the frequency of the compressor 21 to a first frequency R1 while simultaneously increasing the opening degree of the outdoor electric expansion valve 24 to a first opening degree D1 larger than the fixed opening degree DS.

In step S74, while controlling the frequency of the compressor 21 to be the first frequency R1, the control part 11 controls the opening degree of the outdoor electric expansion valve 24 so that the degree of subcooling is constant at a predetermined value in the refrigerant flowing through the side of the indoor heat exchanger 41 near the outdoor electric expansion valve 24.

In step S75, the control part 11 determines whether or not the frequency of the compressor 21 has reached the first frequency R1. If the frequency has reached the first frequency R1, the process transitions to step S76. If the frequency has not reached the first frequency R1, the process waits until it reaches the first frequency R1.

In step S76, the control part 11 begins to increase the frequency of the compressor 21 to a second frequency R2 while simultaneously increasing the opening degree of the outdoor electric expansion valve 24 to a second opening degree D2 larger than the first opening degree D1. This type of control is hereinafter repeated until the frequency of the compressor 21 reaches a maximum frequency Rmax and the opening degree of the outdoor electric expansion valve 24 reaches a maximum opening degree Dmax (see point m in FIG. 22). When the frequency of the compressor 21 has reached the maximum frequency Rmax and the opening degree of the outdoor electric expansion valve 24 has reached the maximum opening degree Dmax, the process transitions to step S77. When either the frequency of the compressor 21 has not reached the maximum frequency Rmax or the opening degree of the outdoor electric expansion valve 24 has not reached the maximum opening degree Dmax, step S76 is repeated.

In step S77, while the frequency of the compressor 21 is kept at the maximum frequency Rmax, the control part 11 controls the opening degree of the outdoor electric expansion valve 24 so that the degree of subcooling is constant at a predetermined value in the refrigerant flowing through the side of the indoor heat exchanger 41 near the outdoor electric expansion valve 24.

The above-described startup capability maximizing control is performed until the detected temperature of the indoor temperature sensor 43 reaches the set temperature for the first time after the air-warming operation was initiated, and while the post-startup air-warming operation control is performed after the set temperature is reached, the startup capability maximizing control is not performed until air-warming operation startup is performed again.

It is thereby possible to gradually increase the refrigerating capacity by gradually increasing the refrigerant circulation volume of the refrigeration cycle. By increasing the refrigerating capacity incrementally rather than increasing it once to the maximum, it is possible to avoid situations in which the compressor 21 draws in liquid-state refrigerant or the detected pressure of the pressure sensor 29a increases abnormally.

(viii) High-Temperature Air Discharge Initiation Control

Since the indoor temperature at the initiation of the air-warming operation is commonly low, when the indoor fan 42 is first driven at startup, an air flow of cold air going into the room is often formed. Therefore, due to the high-temperature air discharge initiation control being performed, the temperature of the conditioned air first supplied from the indoor unit 4 into the room after the air-warming operation is initiated is to a certain extent a high temperature, and discomfort imposed on the user is reduced.

Furthermore, the driving of the indoor fan 42 is maintained in a stopped state and the condensing capability in the indoor heat exchanger 41 is kept low, so that the time period during which sufficiently high-temperature conditioned air begins to be supplied into the room can be implemented in the earliest stage possible following the initiation of the air-warming operation. The pressure of refrigerant moving from the compressor 21 toward the indoor heat exchanger 41 is thereby quickly increased, and the refrigerant is increased in temperature and pressure.

Figure 26:
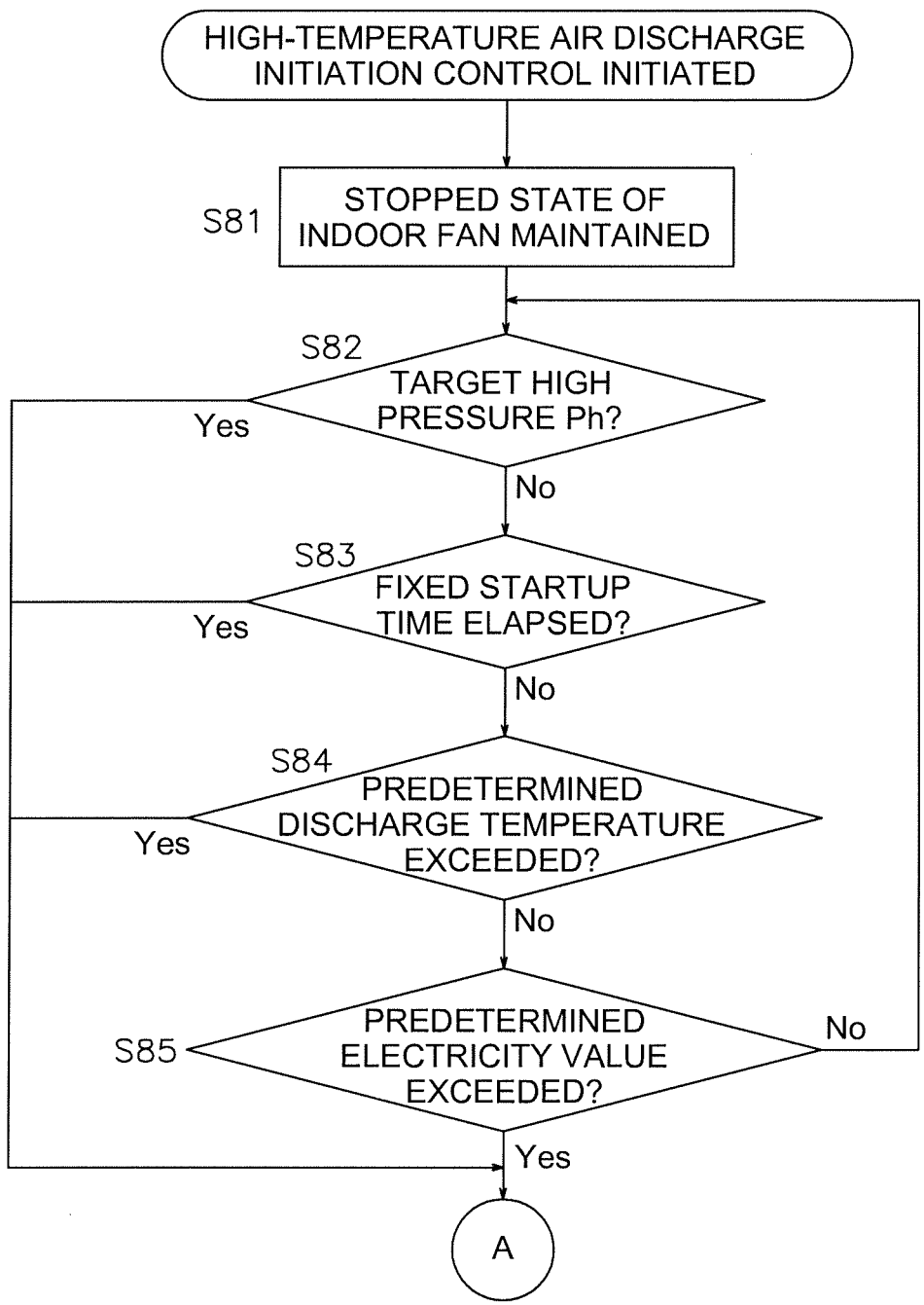
FIG. 26 is a view showing a flowchart (a first part) of high-temperature air discharge initiation control.
Figure 27:
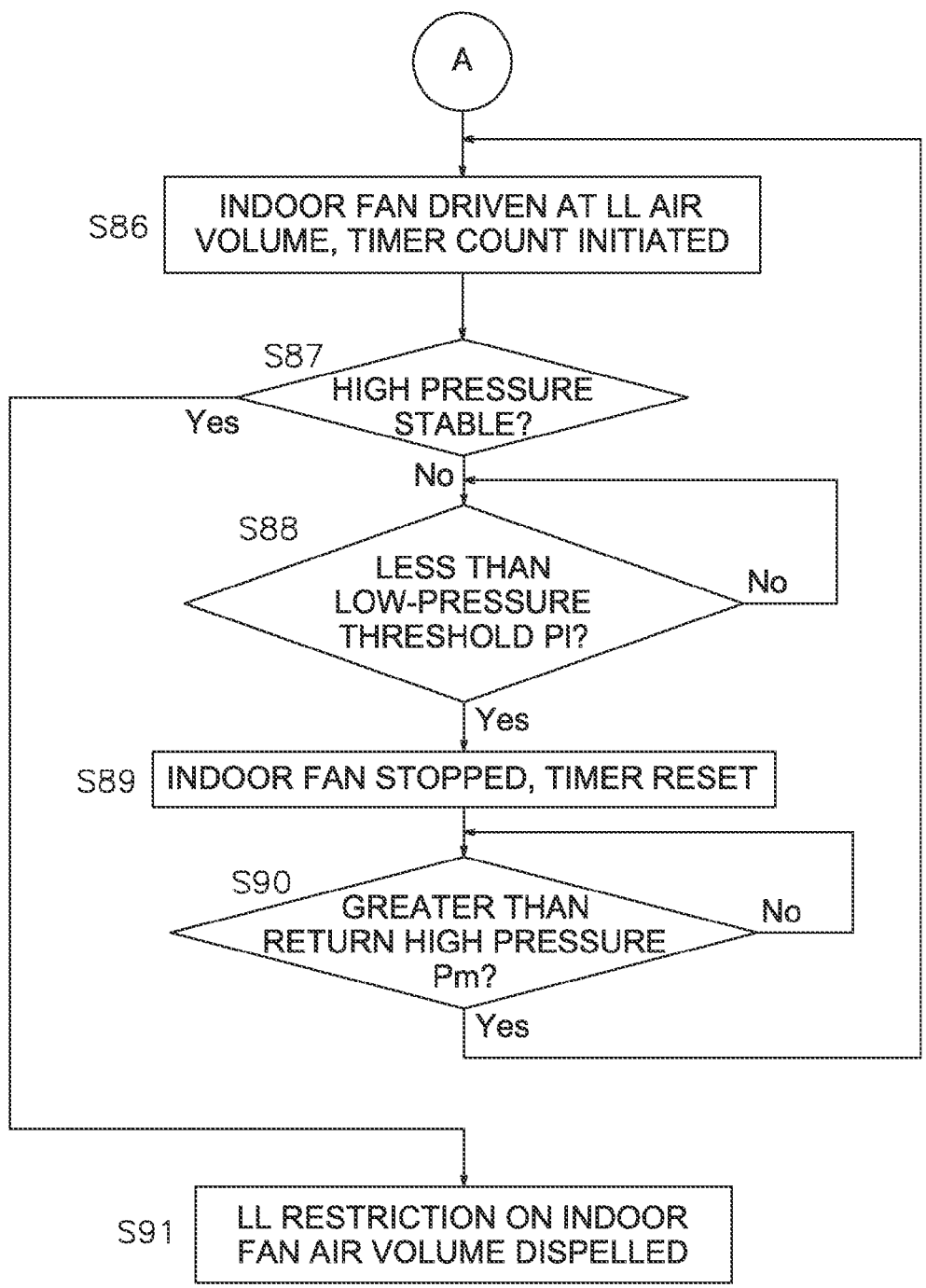
FIG. 27 is a view showing a flowchart (a second part) of high-temperature air discharge initiation control.

In the high-temperature air discharge initiation control, the following processes are performed as shown in the flowcharts of FIGS. 26 and 27.

In step S81, the control part 11 confirms that the indoor fan 42 has been stopped and maintains the fan in this stopped state.

In step S82, the control part 11 determines whether or not the detected pressure of the pressure sensor 29a has reached the target high pressure Ph. If the target high pressure Ph has been reached (see point f in FIG. 22), the process transitions to step S86. If the target high pressure Ph has not been reached, the process transitions to step S83.

In step S83, the control part 11 determines whether or not a predetermined fixed startup time duration Tx, which is 2 mins 30 sec, has elapsed since the initiation of the air-warming operation. If the predetermined fixed startup time duration Tx has elapsed, the process transitions to step S86 even if the detected pressure of the pressure sensor 29a has not reached the target high pressure Ph. If the predetermined fixed startup time duration has not elapsed, the process transitions to step S84. It is thereby possible to avoid instances of warn air continuing to be not discharged for a long time after the air-warming operation has been initiated.

In step S84, the control part 11 determines whether or not the temperature of the refrigerant passing through the discharge tube A as detected by the discharge temperature sensor 29d has exceeded a predetermined discharge temperature Tp of 110 degrees. If the predetermined discharge temperature Tp has been exceeded, the process transitions to step S86 even if the detected pressure of the pressure sensor 29a has not reached the target high pressure Ph. If the predetermined discharge temperature Tp has not been exceeded, the process transitions to step S85. Abnormal increases in high pressure can thereby be prevented, and deterioration of the refrigeration oil can be avoided while preventing loads imposed on the machinery.

In step S85, the control part 11 determines whether or not a predetermined current value Eh has been exceeded by the amount of current supplied by the current supply part 21e, as detected by the compressor-current-value detector 29f. If the predetermined current value Eh has been exceeded, the process transitions to step S86 even if the detected pressure of the pressure sensor 29a has not reached the target high pressure Ph. If the predetermined current value Eh has not been exceeded, the process returns to step S82. Damage to the electric components can thereby be avoided.

The flow rate of indoor fan 42 can be set to four levels in sequence: an ultralow flow rate "LL," a low flow rate "L," a medium flow rate "M", and a maximum flow rate "H."

In step S86, the control part 11 drives the indoor fan 42 at the ultralow flow rate "LL," while at the same time the timer begins to count time after startup of the indoor fan (see point h or l in FIG. 22). Startup is herein initiated at the lowest flow rate "LL." Thus, since only the lowest "LL" flow rate is supplied to the indoor heat exchanger 41, warm air can continue to be supplied into the room without a sudden drop in the pressure detected by the pressure sensor 29a.

In step S87, the control part 11 either determines if a timer count of 30 or more seconds has elapsed since starting up the indoor fan and a state of exceeding a predetermined return high-pressure threshold Pm has been maintained for 10 or more seconds (see points n and o of FIG. 22), or determines whether or not 10 minutes has elapsed since initiating the air-warming operation. If it is determined either that a timer count of 30 or more seconds has elapsed since starting up the indoor fan and the target high pressure has been maintained for 10 or more seconds, or that 10 minutes has elapsed since initiating the air-warming operation, the process transitions to step S91. If it is determined that either a timer count of 30 or more seconds has not elapsed since starting up the indoor fan or the target high pressure has not been maintained for 10 or more seconds, and 10 minutes has not elapsed since initiating the air-warming operation, the process transitions to step S88. Immediate deviation from control is prevented herein by waiting for a timer count of 30 or more seconds to elapse after starting up the indoor fan.

In step S88, the control part 11 either determines if the detected pressure of the pressure sensor 29a is less than a predetermined low-pressure threshold P1 of 36 kg/cm$^2$ before a timer count of 5 seconds elapses after starting up the indoor fan, or determines if a pre-established duration of 10 seconds has elapsed. If either the pressure is less than the predetermined low-pressure threshold P1 (see point i in FIG. 22) or 10 seconds has elapsed, the process transitions to step S89. If the pressure is not less than the predetermined low-pressure threshold P1 and 10 seconds has not elapsed, step S88 is repeated.

In step S89, the control part 11 stops the indoor fan 42, brings the flow rate to "0," and resets the indoor fan post-startup timer (see point j of FIG. 22).

In step S90, the control part 11 either determines if the detected pressure of the pressure sensor 29a is greater than the predetermined return high-pressure threshold Pm of 37 kg/cm$^2$ (see point k in FIG. 22), or determines whether or not a pre-established duration of 10 seconds has elapsed since the stopping of the indoor fan 42. If the pressure is greater than the predetermined return high-pressure threshold Pm or 10 seconds has elapsed since the stopping of the indoor fan 42, the process transitions to step S86. If the pressure is not greater than the predetermined return high-pressure threshold Pm and 10 seconds has not elapsed since the stopping of the indoor fan 42, step S90 is repeated.

In step S91, the control part 11 ends the high-temperature air discharge initiation control, initiates the post-startup air-warming operation control, and creates a state in which the flow rate of the indoor fan 42 is not restricted to "LL" and a flow rate of "L" or greater can be achieved (see point p in FIG. 22).

(ix) Post-Startup Air-Warming Operation Control

The post-startup air-warming operation control is a control for adjusting the opening degree of the outdoor electric expansion valve 24 so that the refrigerant state of the refrigeration cycle stabilizes due to subcooling degree constant control of the refrigerant flowing through the side of the indoor heat exchanger 41 near the outdoor electric expansion valve 24.

Figure 28:
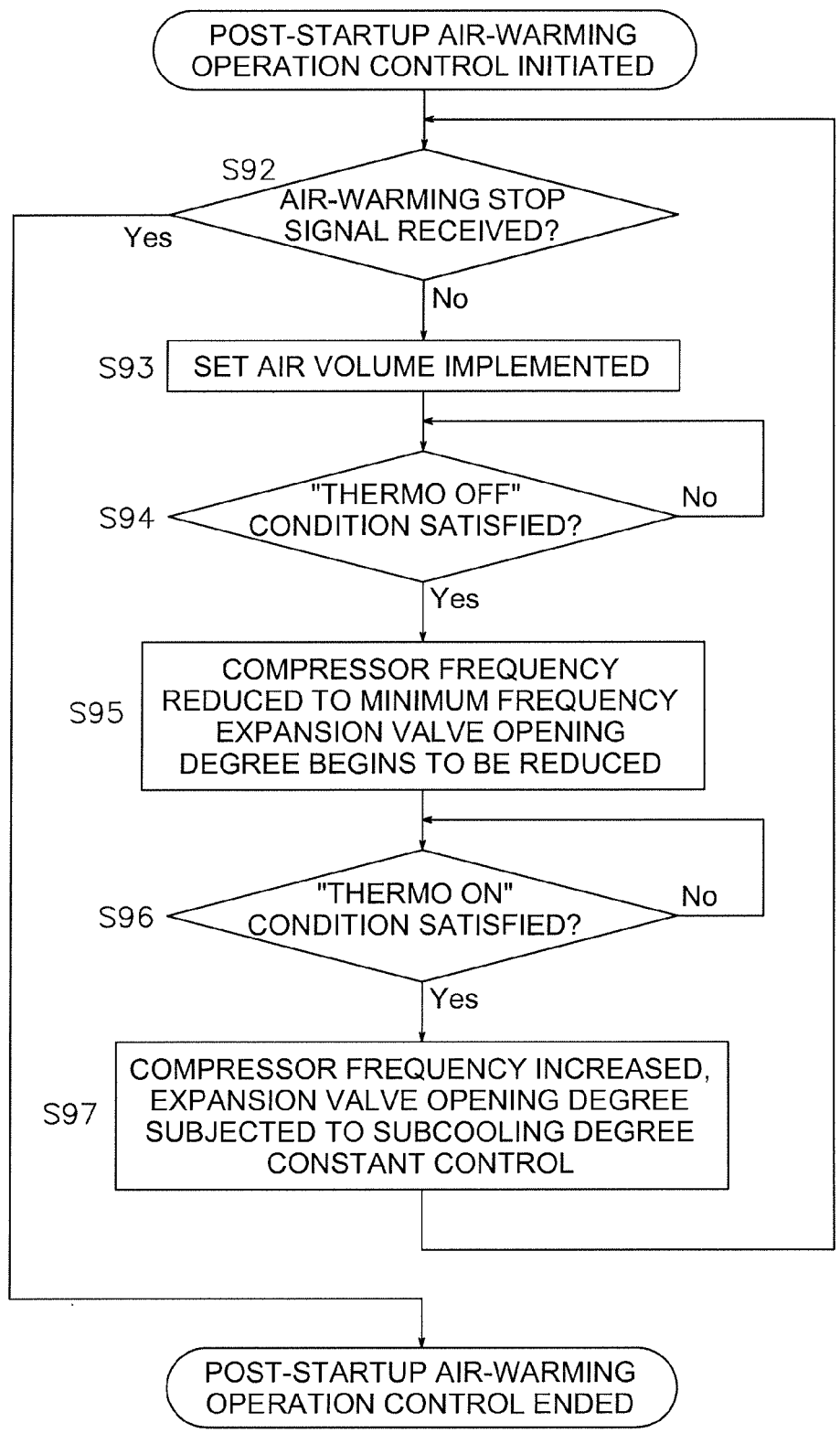
FIG. 28 is a view showing a flowchart of post-startup air-warming operation control.

In the post-startup air-warming operation control, the following processes are performed as shown in the flowchart of FIG. 28.

In step S92, the control part 11 determines whether or not the controller 90 has received an air-warming stop command from the user. If it is determined that an air-warming stop command has been received, the post-startup air-warming operation control is ended. If an air-warming stop command has not been received, the process transitions to step S93.

In step S93, rather than restricting the flow rate of the indoor fan 42 to "LL," the control part 11 implements an flow rate of "L" or greater as the set flow rate set by the user with the controller 90.

In step S94, the control part 11 determines whether or not a "thermo off" condition is satisfied. Specifically, the control part 11 determines whether or not a "thermo off" condition has been satisfied, where the set temperature less the detected temperature of the indoor temperature sensor 43 less 0.5° C.

is 1 or less (a state in which the detected temperature of the indoor temperature sensor 43 exceeds Ty at point q in FIG. 22). If the "thermo off" condition is satisfied, the process transitions to step S95. If the "thermo off" condition is not satisfied, step S94 is repeated.

In step S95, the control part 11 reduces the opening degree of the outdoor electric expansion valve 24 while also reducing the frequency of the compressor 21 to the minimum frequency Qmin.

In step S96, the control part 11 determines whether or not the "thermo on" condition is satisfied. Specifically, the control part 11 determines whether or not a "thermo on" condition has been satisfied, where the set temperature less the detected temperature of the indoor temperature sensor 43 is 2° C. or greater (a state in which the detected temperature of the indoor temperature sensor 43 is below Tz at point s in FIG. 22). If the "thermo on" condition is satisfied, the process transitions to step S97. If the "thermo on" condition is not satisfied, step S96 is repeated.

In step S97, the control part 11 performs control for continuing to increase the opening degree of the outdoor electric expansion valve 24 while continuing to increase the frequency of the compressor 21, and returns to and repeats step S92. Operations such as the high-temperature air discharge initiation control are not performed at this time. This is because the room interior is already near the set temperature and is sufficiently warm.

<Characteristics of Air Conditioning Apparatus 1 of Present Embodiment>

(1)

In the air conditioning apparatus 1 of the present embodiment, the time needed to reach the target high pressure Ph can be shortened by performing the high-temperature air discharge initiation control for stopping the driving of the indoor fan 42 until the target high pressure Ph is reached. Warm air can thereby be quickly supplied to the user at air-warming startup.

Such control for stopping the driving of the indoor fan 42 is controlled so as to not be performed during "thermo on" control, and it is therefore possible to prevent the inconvenience of warm air not being supplied for a while during "thermo on."

Such control for stopping the driving of the indoor fan 42 is also performed only under predetermined temperature conditions, and control is limited to conditions in which there is a particular need for warm air when the air-warming operation is initiated, and it is therefore possible to prevent the supply of warm air from being initiated later than necessary (in situations in which high-temperature air discharge is not requested.

(2)

Even in conventional air conditioning apparatuses, when the air-warming operation is initiated, the fan of the indoor unit is kept in a stopped state without being driven for some time after driving of the compressor is initiated, in order for the air first discharged to be somewhat high in temperature. However, in such a conventional air conditioning apparatus, a temperature sensor for detecting the temperature of refrigerant flowing through the indoor heat exchanger is provided, and this detected temperature being a somewhat high temperature is a condition for initiating the driving of the indoor unit fan. Specifically, in a conventional air conditioning apparatus, there is no focus on the pressure of the refrigerant flowing through the indoor heat exchanger as a condition for initiating driving of the indoor unit fan.

In contrast thereto the air conditioning apparatus 1 of the embodiment described above, control is performed in which the driving of the indoor fan 42 is initiated when the detected pressure of the pressure sensor 29*a* reaches the target high pressure Ph. Specifically, the condition for initiating driving of the indoor fan 42 when the air-warming operation is initiated is not the refrigerant temperature, but is rather that the pressure of the refrigerant heading to the indoor heat exchanger 41 reach the target high pressure Ph. Thus, since focus is given to the pressure of the refrigerant heading to the indoor heat exchanger 41 as detected by the pressure sensor 29*a* when the objective is to quickly warm the indoor heat exchanger 41 when the air-warming operation is initiated, an operation to raise the pressure of the refrigerant as quickly as possible can be implemented while ensuring stability such that the abnormally high pressure Pr is not exceeded by the refrigerant pressure in the high-pressure portion where the pressure sensor 29*a* is provided (the design pressure of this portion, for example). If an attempt is made to quickly raise the pressure of the refrigerant heading to the indoor heat exchanger 41 when control is performed focusing on the temperature of the refrigerant as in conventional practice, reliability is compromised because there is a risk that the pressure of the refrigerant will be abnormally increased because the focus is on the refrigerant temperature alone, and with the excessive increase in the refrigerant pressure unaccounted for, the output of the compressor 21 is further increased in order to increase the refrigerant temperature. Since the rate of increase in the refrigerant pressure is greater than the rate of increase in the refrigerant temperature, when an operation is attempted to ensure reliability when focus is on the refrigerant temperature alone as in conventional methods, it is not possible to perform an action of rapidly increasing the refrigerant pressure because there is no control performed that focuses on refrigerant pressure. As described above, in the air conditioning apparatus 1 of the above embodiment, it is possible to achieve as rapid a pressure increase as possible within the range of the design pressure and other factors while avoiding abnormal pressures.

(3)

In a conventional air conditioning apparatus in which the flow rate of the indoor unit fan can be adjusted among multiple levels, in order for the temperature of the air first discharged to be a somewhat high temperature when the air-warming operation is initiated, the indoor unit fan is kept in a stopped state without being driven for some time after driving of the compressor is initiated, and the driving of the indoor unit fan is initiated while suppressing the flow rate when a certain temperature condition has been satisfied. After the indoor unit fan has been driven, a process is performed for incrementally increasing the flow rate with the objective of approaching the set flow rate.

In contrast in the air conditioning apparatus 1 of the above embodiment, after the detected pressure of the pressure sensor 29*a* reaches the target high pressure Ph and the indoor fan 42 is driven for the first time, instead of further increasing the flow rate, the flow rate is reduced and the indoor fan 42 is stopped. Therefore, unlike the case of further increasing the flow rate of the indoor unit fan as in conventional practice, the detected pressure of the pressure sensor 29*a* can be maintained at a high pressure in around a range between the predetermined return high-pressure threshold Pm and the predetermined low-pressure threshold P1.

(4)

In the air conditioning apparatus 1, the sensor-separated detection process is performed before the electromagnetic induction heating unit 6 achieves a large output such as the maximum supplied electricity Mmax (2 kW). Therefore, it is possible to avoid situations in which the output of the electromagnetic induction heating unit 6 is significantly increased while the electromagnetic induction thermistor 14 has not yet detected the actual temperature of the accumulation tube F. Therefore, the resinous components of the fuse 15 and the electromagnetic induction heating unit 6 can be prevented from melting.

The sensor-separated detection process is performed when the air-warming operation is first initiated, even after the electromagnetic induction thermistor 14 has been attached to the accumulation tube F and the air conditioning apparatus 1 has finished being installed (after installation is finished, including after the breaker supplying electricity to the electromagnetic induction heating unit 6 has tripped). Therefore, even if the attached state of the electromagnetic induction thermistor 14 is unsatisfactory during transportation or installation, large increases in the output of the electromagnetic induction heating unit 6 can be avoided while the attached state of the electromagnetic induction thermistor 14 remains unsatisfactory.

When electromagnetic induction heating is performed, sudden temperature increases generally tend to occur more readily than temperature increases caused by changes in the refrigerant circulation conditions in the refrigeration cycle. To address this issue, in the electromagnetic induction heating unit 6 of the air conditioning apparatus 1, the electromagnetic induction thermistor 14, which is pressed against the magnetic tube F2 by the elastic force of the plate spring 16, maintains satisfactory responsiveness to rapid temperature changes caused by electromagnetic induction heating during the above-described sensor-separated detection process in which temperature changes caused by electromagnetic induction heating are detected. Therefore, the time duration required until the sensor-separated detection process is ended can be shortened.

Furthermore, the flow condition judgment process is performed before the sensor-separated detection process is performed, and it is possible to confirm that the detected temperature has decreased. Therefore, even if induction heating by the electromagnetic induction heating unit 6 is performed after a flow has been confirmed by this flow condition judgment process, the target portion of induction heating does not undergo a further temperature increase due to the flow of refrigerant, but rather the extent of the temperature increase in this portion is suppressed due to the flow of refrigerant. The reliability of induction heating using the electromagnetic induction heating unit 6 of the air conditioning apparatus 1 can be improved from this respect as well.

Other Embodiments

An embodiment of the present invention was described above based on the drawings, but the specific configuration is not limited to this embodiment, and modifications can be made within a range that does not deviate from the scope of the invention.

(A)

In the embodiment described above, an example was described of a case in which the refrigerant state in the refrigeration cycle was stabilized by subcooling degree constant control.

However, the present invention is not limited to this example.

For example, instead of keeping the degree of subcooling at a certain constant value, control may be performed for maintaining the degree of subcooling within a certain range.

(B)

In the embodiment described above, an example was described of a case in which the refrigerant state in the refrigeration cycle was stabilized by subcooling degree constant control.

However, the present invention is not limited to this example.

For example, control may be performed for maintaining the extent of change in the distribution state of the refrigerant in the refrigeration cycle for a predetermined time duration either at a predetermined distribution state or within a predetermined distribution range. To detect this refrigerant distribution state, the refrigerant distribution state may be perceived such as by providing sight glass to the condenser of the refrigeration cycle to perceive the liquid surface of the refrigerant, and stability control may be performed so that the distribution state reaches a predetermined distribution state or comes within a predetermined distribution range.

Furthermore, control may be performed so that the degree of superheating of the refrigerant flowing through the intake side of the compressor 21 is maintained for a predetermined time duration at a predetermined value or within a predetermined range.

(C)

In the embodiment described above, an example was described of a case in which the control part 11 lowers the frequency of the compressor 21 to the minimum frequency Qmin when the "thermo off" condition is satisfied.

However, the present invention is not limited to this example.

For example, the control part 11 may completely halt the driving of the compressor 21 when the "thermo off" condition is satisfied.

(D)

In the embodiment described above, a case was described in which the predetermined return high-pressure threshold Pm and the target high pressure Ph are different pressure values.

However, the present invention is not limited to this example.

For example, control may be performed with the predetermined return high-pressure threshold Pm and the target high pressure Ph as the same pressure values.

(E)

In the embodiment described above, a case was described in which within the refrigerant circuit 10, the electromagnetic induction heating unit 6 is attached to the accumulation tube F.

However, the present invention is not limited to this example.

For example, the electromagnetic induction heating unit 6 may be provided to another refrigerant tube besides the accumulation tube F. In this case, the magnetic tube F2 or another magnetic element is provided to the refrigerant tube portion where the electromagnetic induction heating unit 6 is provided.

(F)

In the embodiment described above, a case was described in which the accumulation tube F is constituted as a double-layered tube comprising the copper tube F1 and the magnetic tube F2.

However, the present invention is not limited to this example.

Figure 29:
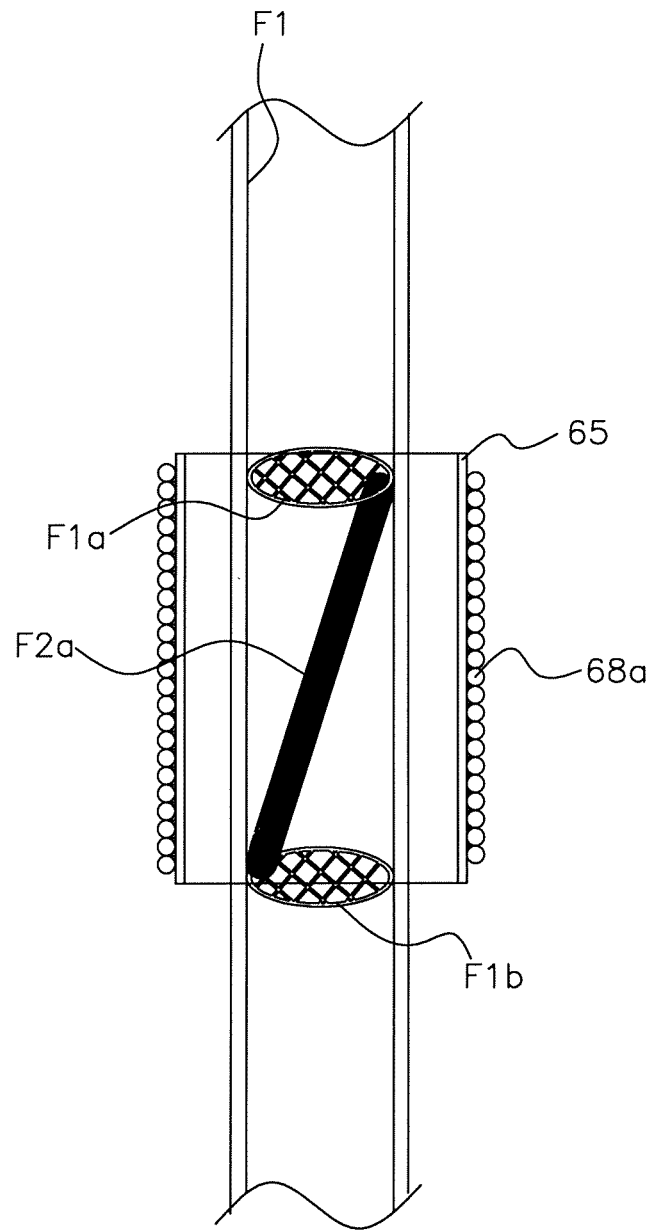
FIG. 29 is an explanatory view of a refrigerant tube of another embodiment (F).

A magnetic member F2a and two stoppers F1a, F1b may be disposed inside the accumulation tube F and a refrigerant tube as a heated object, for example, as shown in FIG. 29. The magnetic member F2a is a member containing a magnetic material whereby heat is generated by electromagnetic induction heating in the embodiment described above. The stoppers F1a, F1b are placed in two locations inside the copper tube F1, constantly permitting refrigerant to pass through but not permitting the magnetic member F2a to pass through. The magnetic member F2a thereby does not move despite the flow of refrigerant. Therefore, the intended heating position in the accumulation tube F, for example, can be heated. Furthermore, since the heat-generating magnetic member F2a and the refrigerant are in direct contact, heat transfer efficiency can be improved.

(G)

The magnetic member F2a described in the other embodiment (F) may be positioned within the tube without the use of the stoppers F1a, F1b.

Figure 30:
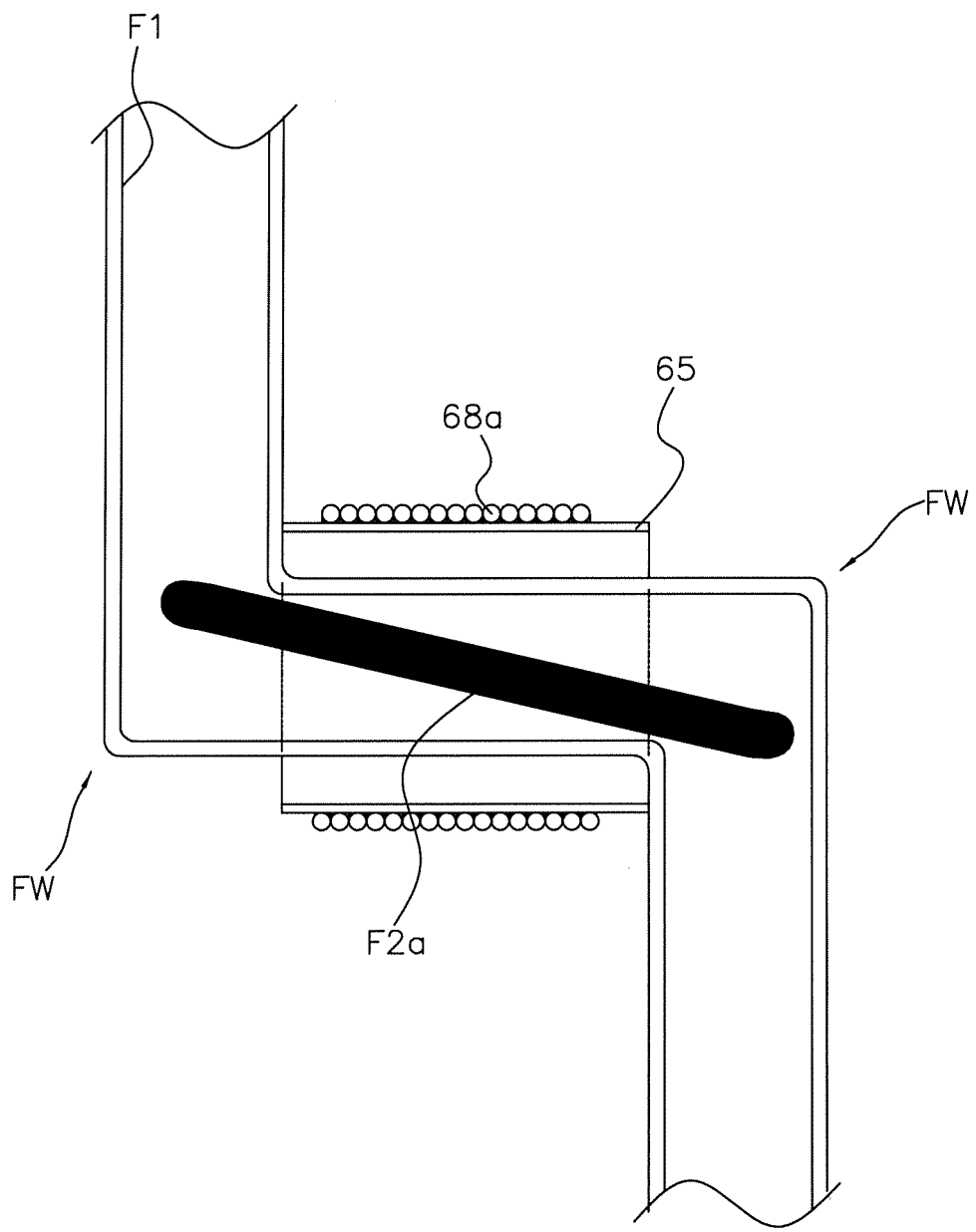
FIG. 30 is an explanatory view of a refrigerant tube of another embodiment (G).

Bent portions FW may be provided in two locations in the copper tube F1, and the magnetic member F2a may be placed inside the copper tube F1 between these two bent portions FW, for example, as shown in FIG. 30. The movement of the magnetic member F2a can be restricted while permitting refrigerant to pass through in this manner as well.

(H)

In the embodiment described above, an example was described of a case in which the coil 68 was wound around the accumulation tube F in a helical formation.

However, the present invention is not limited to this example.

Figure 31:
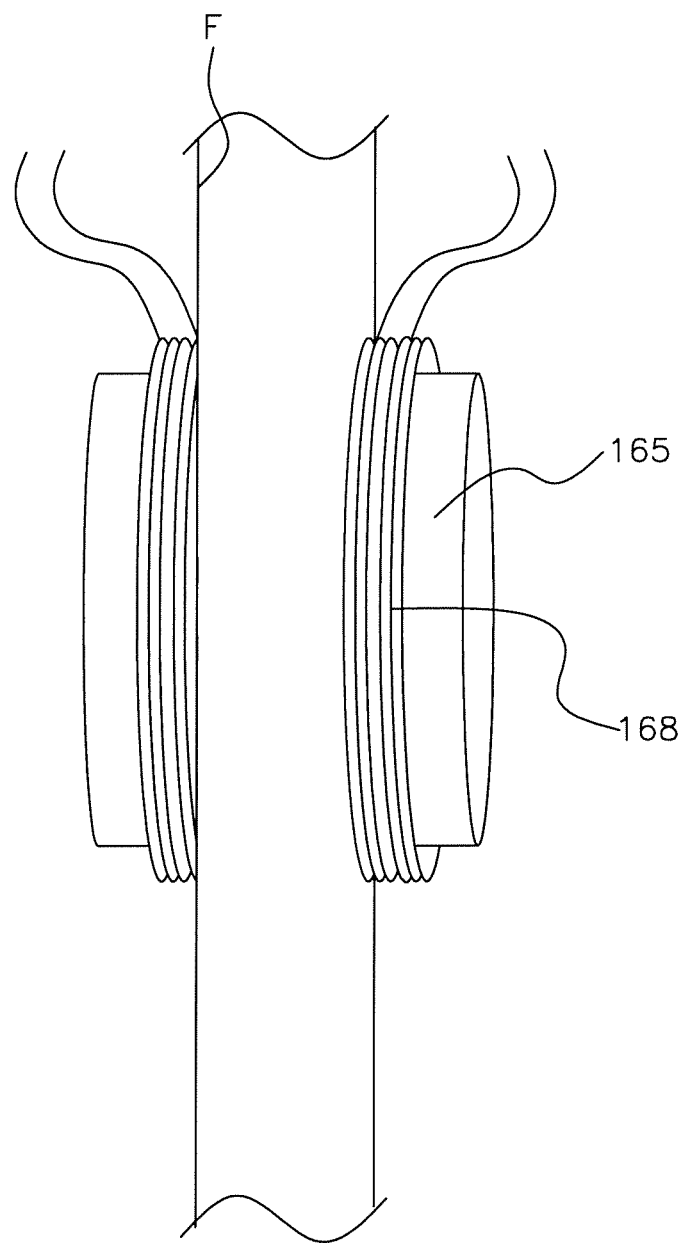
FIG. 31 is a view showing an example of an arrangement of coils and a refrigerant tribe of another embodiment (H).

For example, a coil 168 wound around a bobbin main body 165 may be disposed around the periphery of the accumulation tube F without being wound over the accumulation tube F, as shown in FIG. 31. The bobbin main body 165 is arranged so that its axial direction is substantially perpendicular to the axial direction of the accumulation tube F. Two bobbin main bodies 165 and coils 168 each are placed separately so as to sandwich the accumulation tube F.

Figure 32:
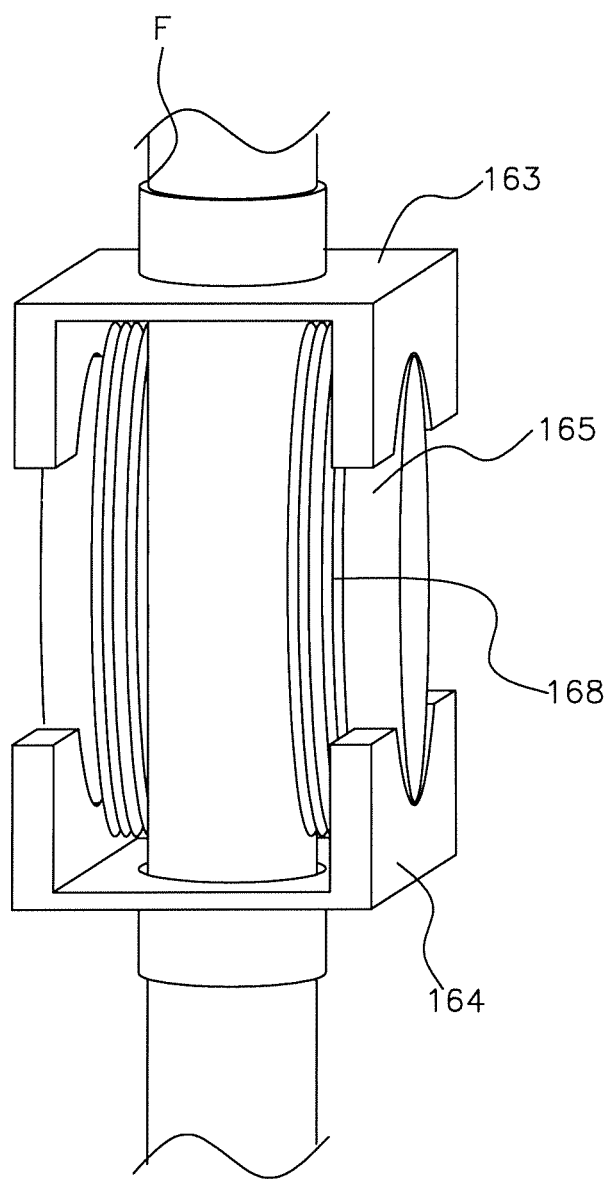
FIG. 32 is a view showing an example of arranging bobbin covers of another embodiment (H).

In this case, a first bobbin cover 163 and a second bobbin cover 164 which pass through the accumulation tube F may be arranged in a state of being fitted over the bobbin main body 165, as shown in FIG. 32, for example.

Figure 33:
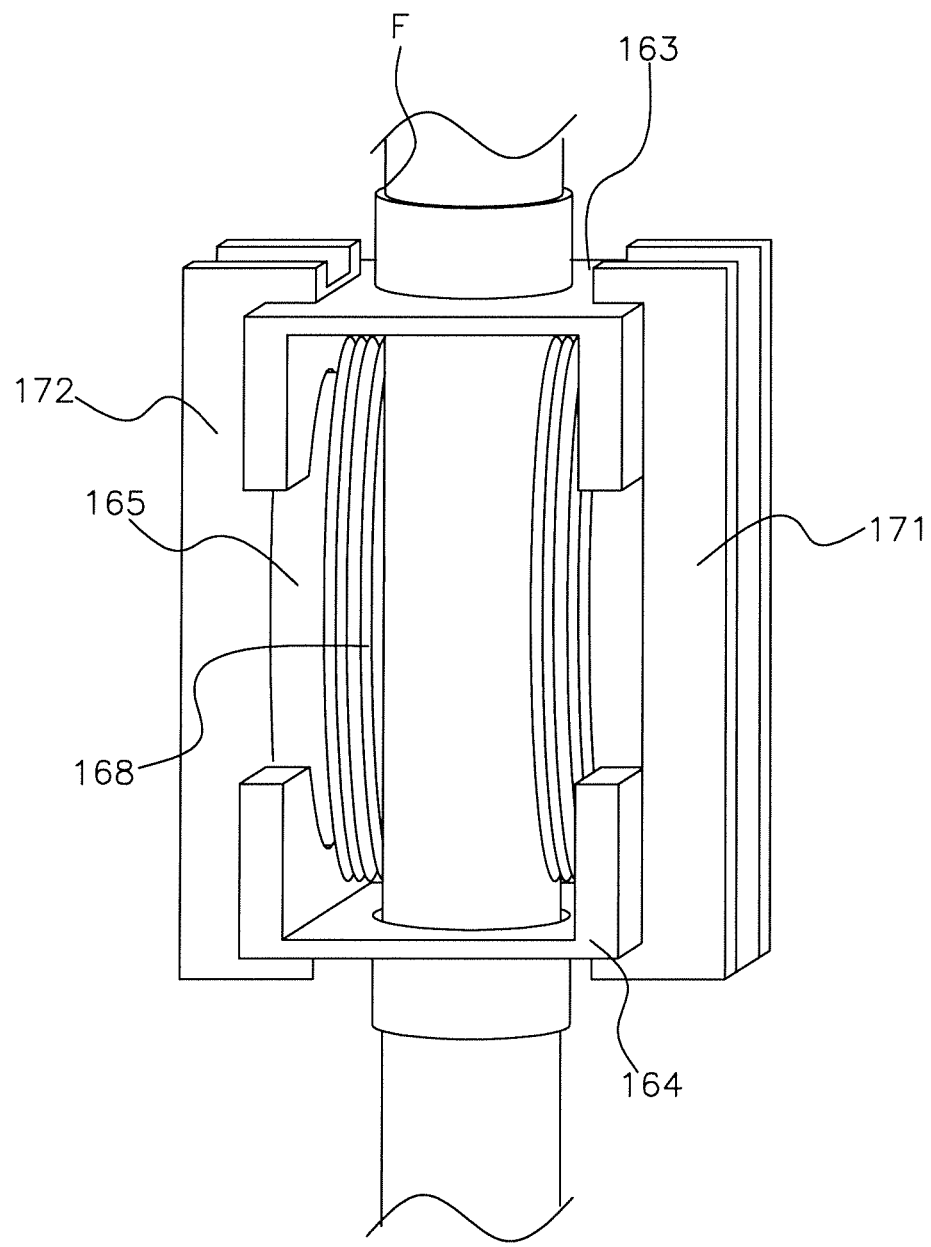
FIG. 33 is a view showing an example of arranging ferrite cases of another embodiment (H).

Furthermore the first bobbin cover 163 and the second bobbin cover 164 may be fixed in place by being sandwiched by a first ferrite case 171 and a second ferrite case 172, as shown in FIG. 33. In FIG. 33, an example is shown of a case in which two ferrite cases are arranged so as to sandwich the accumulation tube F, but they may be arranged in four directions similar to the embodiment described above. The ferrite may also be accommodated similar to the embodiment described above.

(I)

In the embodiment described above, an example was described of a case in which the air conditioning apparatus 1 has one indoor unit 4 and one outdoor unit 2.

However, the present invention is not limited to this example.

For example, the air conditioning apparatus may have a plurality of indoor units connected in parallel or in series with one outdoor unit. In this case, a priority ranking or the like pertaining to a sequence of increasing air discharge temperatures may be set for each indoor unit.

The air conditioning apparatus may also have a plurality of outdoor units connected in parallel or in series with one indoor unit. In this case, the target high pressure Ph can be more quickly reached, and the capability can be increased further.

Furthermore, the air conditioning apparatus may have a plurality of outdoor units connected in parallel or in series with a plurality of indoor units.

(J)

For the various controls in the embodiment described above, examples were described of cases in which processes are performed on the condition that a certain value be reached, cases in which processes are performed on the condition that a certain value be exceeded, cases in which processes are performed on the condition that a parameter be equal to a certain value or less, and cases in which processes are performed on the condition that a parameter fall below a certain value, for example.

However, the present invention is not limited to the conditions of the embodiment described above, and may be appropriately modified within a range in which conditions are mutually consistent. Specifically, the control described in the above embodiment, in which a condition stipulates that a certain value be reached, may be a control in which the condition is instead one stipulating that a certain value be exceeded. Otherwise, within a range in which the conditions are mutually consistent, instead of the condition that a certain value be exceeded, the condition may be that a certain value be reached; instead of the condition that a parameter be equal to a certain value or less, the condition may be that a parameter fall below a certain value; and instead of the condition that a parameter fall below a certain value, the condition may be that a parameter be equal to a certain value or less.

<Other>

Embodiments of the present invention were described above in several examples, but the present invention is not limited to these embodiments. For example, the present invention also includes combined embodiments obtained by suitably combining different portions of the above embodiments, within a range that can be carried out based on the above descriptions by those skilled in the art.

INDUSTRIAL APPLICABILITY

According to the present invention, warm air at the start of air warming can be quickly supplied by a simple configuration; therefore, the present invention is particularly useful in an air conditioning apparatus in which an air-warming operation is performed.

The invention claimed is:

1. An air conditioning apparatus comprising:
   a compressor;
   an indoor heat exchanger;
   an indoor fan;
   an expansion valve;
   an outdoor heat exchanger;
   a refrigerant-pressure-perceiving part arranged and configured to perceive pressure of refrigerant sent from the compressor to the indoor heat exchanger; and
   a control part configured to perform startup fan control in which
      the control part controls the indoor fan to remain stopped until the compressor goes from being at rest to starting up and the pressure perceived by the refrigerant-pressure-perceiving part reaches or exceeds a predetermined high-pressure threshold,
      the control part thereafter drives the indoor fan when the pressure perceived by the refrigerant-pressure-perceiving part reaches or exceeds the predetermined high-pressure threshold, and
      the control part thereafter repeats
         an action of reducing a flow rate of the indoor fan or stopping driving of the indoor fan when the pressure perceived by the refrigerant-pressure-perceiving part is equal to or less than a predetermined low-pressure threshold which is a lower value than the predetermined high-pressure threshold, and an action of increasing the flow rate of the indoor fan or initiating driving of the indoor fan when the pressure perceived by the refrigerant-pressure-perceiving part reaches or exceeds a predetermined pressure threshold which is a higher value than the predetermined low-pressure threshold and is a lower value than the predetermined high-pressure threshold.

2. The air conditioning apparatus according to claim 1, further comprising an outdoor temperature detector arranged and configured to detect outdoor air temperature; and an indoor temperature detector arranged and configured to detect indoor air temperature, the control part being further configured to perform the startup fan control only when a predetermined surrounding temperature condition is satisfied by a relationship between the temperature detected by the outdoor temperature detector and the temperature detected by the indoor temperature detector.

3. The air conditioning apparatus according to claim 2, wherein a temperature range in which the predetermined surrounding temperature condition is satisfied is a temperature range in which the temperature detected by the outdoor temperature detector is lower than the temperature detected by the indoor temperature detector, and a temperature range that satisfies the temperature conditions of being equal to or less than a predetermined limit indoor temperature, which is an indoor temperature within the range of the air-warming-operation-enabling temperature range, and being equal to or less than a predetermined limit outdoor temperature, which is an outdoor temperature within the range of the air-war ing-operation-enabling temperature range.

4. The air conditioning apparatus according to claim 3, further comprising an indoor-refrigerant-temperature-perceiving part arranged and configured to perceive temperature of refrigerant passing through the indoor heat exchanger, the control part being further configured to perform indoor heat exchange temperature control in which the startup fan control is not performed when the air-warming-operation-enabling temperature range condition is satisfied but the predetermined surrounding temperature condition is not satisfied, the indoor fan remains stopped until the compressor goes from being at rest to starting up and the temperature perceived by the indoor-refrigerant-temperature-perceiving part reaches or exceeds a predetermined indoor refrigerant temperature, and the indoor fan is driven from the time that the temperature perceived by the indoor-refrigerant-temperature-perceiving part reaches or exceeds the predetermined indoor refrigerant temperature.

5. The air conditioning apparatus according to claim 1, further comprising a supply air flow temperature detector arranged and configured to detect air temperature of an area into which air flow created by the indoor fan is to be supplied, the control part being further configured to receive information pertaining to a temperature set by the user, and in a state in which either no refrigerant is flowing from the compressor to the indoor heat exchanger or the compressor is being driven at a predetermined minimum frequency, the control part performs thermo on control in order to create a flow of refrigerant from the compressor to the indoor heat exchanger when a difference between the temperature detected by the supply air flow temperature detector and the set temperature exceeds a predetermined value, and the control part being further configured to not perform the startup fan control when the thermo on control is initiated.

6. The air conditioning apparatus according to claim 1, further comprising a timer arranged and configured to perceive a time elapsed since a time point when the compressor began to be driven and a refrigerant flow was created, the control part being further configured to begin to drive the indoor fan when the elapsed time perceived by the timer has reached a predetermined fixed startup time duration, even when the pressure perceived by the refrigerant-pressure-perceiving part has not reached or exceeded the predetermined high-pressure threshold.

7. The air conditioning apparatus according to claim 1, further comprising a discharge temperature detector arranged and configured to detect a temperature of refrigerant discharged from the compressor, the control part being further configured to initiate driving of the indoor fan when the temperature detected by the discharge temperature detector has reached or exceeded a predetermined discharge temperature, even when the pressure perceived by the refrigerant-pressure-perceiving part has not reached or exceeded the predetermined high-pressure threshold.

8. The air conditioning apparatus according to claim 1, wherein the compressor, is controllable by an inverter; and the air conditioning apparatus further comprises a current supply part arranged and configured to supply a current to the compressor; and a compressor-current-value detector arranged and configured to detect a current value associated with the current supply part, the control part being further configured to initiate driving of the indoor fan when the current value detected by the compressor-current-value detector has reached or exceeded a predetermined current value, even when the pressure perceived by the refrigerant-pressure-perceiving part has not reached or exceeded the predetermined high-pressure threshold.

9. The air conditioning apparatus according to claim 1, further comprising a magnetic field generator being further configured to generate a magnetic field used for induction-heating a refrigerant tube on an intake side of the compressor, and/or a member in thermal contact with refrigerant flowing through the refrigerant tube, the control part being further configured to perform the induction heating at least when the startup fan control is being performed.

* * * * *